US00RE47029E

(19) United States
(12) Reissued Patent
Hartman, II

(10) Patent Number: US RE47,029 E
(45) Date of Reissued Patent: Sep. 4, 2018

(54) MESSAGING SYSTEM AND METHOD WITH DEAD MAN SWITCHING

(71) Applicant: Richard William Hartman, II, Oak Point, TX (US)

(72) Inventor: Richard William Hartman, II, Oak Point, TX (US)

(21) Appl. No.: 15/421,589

(22) Filed: Feb. 1, 2017

Related U.S. Patent Documents

Reissue of:
(64) Patent No.: 9,235,547
Issued: Jan. 12, 2016
Appl. No.: 13/374,271
Filed: Dec. 20, 2011

U.S. Applications:
(60) Provisional application No. 61/459,931, filed on Dec. 20, 2010.

(51) Int. Cl.
*G06F 15/16* (2006.01)
*H04L 12/58* (2006.01)

(52) U.S. Cl.
CPC ..... *G06F 15/16* (2013.01); *H04L 51/14* (2013.01); *H04L 51/26* (2013.01); *H04L 51/30* (2013.01); *H04L 51/34* (2013.01)

(58) Field of Classification Search
CPC ..... G06F 15/16; H04L 51/14; H04L 51/26; H04L 51/30; H04L 51/34
See application file for complete search history.

(56) References Cited

U.S. PATENT DOCUMENTS

| | | | | |
|---|---|---|---|---|
| 6,856,599 | B1 * | 2/2005 | Kroon | 370/236 |
| 2008/0025230 | A1 * | 1/2008 | Patel et al. | 370/252 |
| 2010/0161743 | A1 * | 6/2010 | Krishnamurthi et al. | 709/206 |
| 2011/0093546 | A1 * | 4/2011 | Rubingh | 709/206 |

* cited by examiner

*Primary Examiner* — Joshua Campbell
(74) *Attorney, Agent, or Firm* — Edward L. White; Kerry D. Green

(57) ABSTRACT

A messaging system and method with dead man switching providing for hierarchical delivery of messages based on selected message hierarchy levels with controlled delivery/response timing is disclosed. The system and method incorporates a messaging host that communicates with a messaging source client that creates and prioritizes a message and targets address(es) for the message. This message is then transmitted to the target address(es) using a hierarchical transmission thread having set limits on response times for each address within the thread. Reception of the message by each target(s) produces visual and/or auditory notification at the target(s). Messages are automatically forwarded to remaining target(s) within the thread upon expiration of a timer should the target(s) fail to respond to the message within a predetermined time. Failure of the target(s) to respond to the message(s) is reported bi-directionally along the thread and forwarded to remaining target(s) in the thread.

181 Claims, 64 Drawing Sheets

0801

0700
Client
0711
Government
0712
MPLS
Provider
Network
0110
Laptop
0713
Smartphone
0714
Tablet Computer
0715
Firewall
0720
Certificate Server
0721
Proxy Server
0722
Web Server
0723
Firewall
0730
License Server
0731
Authentication Server
0732
Database Server
0733
Client
A DB
0734
Client
B DB
0735

Message Originator 1101
1102
Message Entry Interface
1100
Communication Process 1103
Message Text 1104
Parallel Message Transport 1105
Client Presentation Interface 1106
Client Presentation Interface 1107
Client Presentation Interface 1108
Cascade (Serial) Message Transport
1
2
3
1115
Client Presentation Interface 1116
Client Presentation Interface 1117
Client Presentation Interface 1118

Message Originator 1201
1202
Message Entry Interface
1200
Communication Process 1203
Message Text 1204
Cascade (Serial) Message Transport 1205
1
2
3
Client Presentation Interface 1206
Client Presentation Interface 1207
Client Presentation Interface 1208
Parallel Message Transport 1215
Client Presentation Interface 1216
Client Presentation Interface 1217
Client Presentation Interface 1218

*FIG. 19*

1900

```
PARALLEL(
        {911 FIRE},
        {911 RESCUE},
        CASCADE(
                {Internal Security},
                {Corporate Duty Officer},
                [not SUNDAY] {VP OPS})
                ),
        CASCADE(
                {HR PUBLIC RELATIONS},
                {HR PUBLIC RELATIONS ACTION TEAM},
                [not HOLIDAYS] {VP FINANCE}
                )
        CASCADE(
                {Continuing Excellence
                 Accident Investigation},
                {Accident Investigation Team},
                [WEEKDAYS] {VP Safety}
                )
        )
```

*FIG. 23*

*FIG. 22*

2200

2201

New Message Definition Form
(to be completed by message author)

Date:
Author Name:
Business Unit:
Department:
Area:
Encyrption Level:
Severity:
Urgency:
Number of Parallel Stops:
Number of Cascade Stops:
Maximum time before Auto-Forward for Cascade Stops:
Total of Message Stops:
Maximum Message Time in Hours:

Cascade Stop 1
2211
Time before Auto-Forward:
Primary Recipient Job Title:
Alt 1 Job Title:
Alt 2 Job Title:

Parallel Stop 1
2221
Primary Recipient Job Title:
Alt 1 Job Title:
Alt 2 Job Title:

Cascade Stop N
2212
Time before Auto-Forward:
Primary Recipient Job Title:
Alt 1 Job Title:
Alt 2 Job Title:

Parallel Stop N
2222
Primary Recipient Job Title:
Alt 1 Job Title:
Alt 2 Job Title:

4000

4100

4200

4500

4600

4800

4900

5000

5100

5200

5300

5400

5500

5800

6000

6300

6400

MESSAGING SYSTEM AND METHOD WITH DEAD MAN SWITCHING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

Applicants claim benefit pursuant to 35 U.S.C. §119 and hereby incorporates by reference Provisional Patent Application for "MESSAGING SYSTEM AND METHOD WITH DEAD MAN SWITCHING", Ser. No. 61/459,931, filed Dec. 20, 2010, and submitted to the USPTO with Express Mail on Dec. 20, 2010 with tracking number EB483477834US.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related to the field of computer messaging systems incorporating severity and urgency protocols to ensure delivery of time sensitive information to appropriate personnel or automated information systems. Included within the scope of this field is the ability to convert from a variety of mobile device messaging systems to computerized text and visa-versa, thus integrating smartphone/mobile device communications within the overall framework of computerized communications. Within this context the present invention promotes absolute delivery of information, within a client designated path and designated timeframe, and also incorporating auto-forwarding features and detection of offline receivers and/or receiver response timeouts.

DESCRIPTION OF THE PRIOR ART

The field of prior art associated with computer messaging includes the use of electronic mail (EMAIL) and text messaging (TEXT) that are both integrated into a wide variety of computer information frameworks. Both of these systems incorporate store-and-forward messaging technologies to route messages to a target destination from a messaging source, and generally rely on PULL of data from servers. While multiple recipients are possible in both existing paradigms, little if any automated feedback or chronological tracking of message transmission is performed in either system.

DEFICIENCIES IN THE PRIOR ART

Traditionally, these message transmission systems lack a high degree of security and can be "hacked" to uncover information contained within the messages. Furthermore, there is generally no assurance that once a message is sent that its intended recipients have received the message or that they have read it or acted on it. In situations where the information is of a critical nature and must be acted on promptly, often "broadcast" messages are issued to a number of individuals, hoping that one of these individuals will act on the information contained in the message to avert injury to or loss of human life or destruction of property, etc.

However, even with the use of broadcast messaging there is no assurance that the message will be received or acted on appropriately. For this reason, the prior art approaches to the handling of messages incorporating a scaled severity level and urgency level are insufficient to ensure proper action on the message. As such, the prior art fails to address this need within the computer messaging community.

Generally speaking, prior art technologies rely on PULL data techniques, rather than PUSHing data to the user terminal interface. This results in unacceptable delays in many circumstances involving time critical applications or events.

Traditional EMAIL systems permit the receiver to ignore the incoming message, or alternatively to fail to open the message or attachment. This can result in unacceptable delays in responding to critical events that must be addressed by management on an immediate basis. Additionally, there is generally no logging of message events and the failure of the recipient to deal with the message and its contents.

Within the context of messaging systems, the prior art does not generally teach the use of a secure and centralized messaging facility incorporating hierarchical guarantees of message reception and action by message recipients based on message severity and urgency.

OBJECTIVES OF THE INVENTION

The present invention, while not being limited by the following list, can in some embodiments achieve one or more of the following objectives:

- To provide a messaging system and method which has all of the advantages of the prior art and none of the disadvantages.
- To provide a messaging system and method that incorporates message severity levels.
- To provide a messaging system and method that incorporates message urgency levels.
- To provide a messaging system and method that incorporates customizable client specified severity and urgency levels.
- To provide a messaging system and method that provides for hierarchical message routing.

To provide a messaging system and method that provides for dead man switching to ensure routing of messages to proper individuals within a hierarchy.

To provide a messaging system and method that provides for timed message delivery.

To provide a messaging system and method that provides for absolute certainty of message delivery.

To provide a messaging system and method that provides PUSH data transmission to the message receiver.

To provide a messaging system and method that provides for logging of recipient activity associated with message reception.

To provide a messaging system and method that provides for logging of recipient activity associated with the message both upstream and downstream from the message recipients list.

To provide a messaging system and method that provides for mandatory action by the recipient on the message contents.

To provide a messaging system and method that provides for audible/visual status indicators of message reception.

To provide a messaging system and method that provides for active participation by the recipient in the message reception process.

To provide a messaging system and method that provides for maximum message delivery and response timing.

To provide a messaging system and method that provides for positive transmission of a message that cannot be stopped or redirected by the recipient.

To provide a messaging system and method that provides for secure message encryption and decryption during transmission to the recipient.

Other objects, features, and advantages of the present invention will become more readily apparent from the following detailed description of the preferred embodiment when considered with the attached drawings and appended claims.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention utilizes a "dead man" message switching methodology to ensure that messages sent to a particular recipient are indeed reviewed by the recipient. A given message is associated with a hierarchical target message address list that identifies a number of individuals and/or organizations that will sequentially receive the message if a higher priority individual on the list fails to respond to the message within a predetermined amount of time. In this fashion, the delivery of the message is always confirmed, regardless of the response status of the recipient. In this manner, critical messages can be forwarded to a sequential stream of responsible individuals and feedback can be received by the message source user to determine if the persons ultimately responsible for action on the message have indeed received the message and are acting on its contents.

The system and method described herein incorporate timed response triggers for each level of target user within the message targeting hierarchy to ensure that message latencies are appropriate both for the target individual and the overall delay in acting on the message. A variety of message severities and urgencies can be associated with the message to automatically modify the timing latencies associated with message response to ensure an overall optimum response to the message based on its declared importance.

The use of "dead man" switching to retransmit messages to other individuals within the target message hierarchy thread ensures a degree of assured message delivery and response not available with the prior art messaging methodologies. This functionality, in conjunction with secure message transmission and optional plug-in software and/or hardware modules, permits the present invention to provide a wide variety of time-critical and mission-critical message delivery mechanisms that are not addressed by the prior art.

BRIEF DESCRIPTION OF THE DRAWINGS

For a fuller understanding of the advantages provided by the present invention, reference should be made to the following detailed description together with the accompanying drawings wherein:

FIG. 19 illustrates an exemplary Boolean syntax that may be used in some preferred invention system/method embodiments as the basis for the routing decision matrix evaluation;

FIG. 22 illustrates an exemplary message definition form;

DESCRIPTION OF THE PRESENTLY PREFERRED EXEMPLARY EMBODIMENTS

Figure 1:
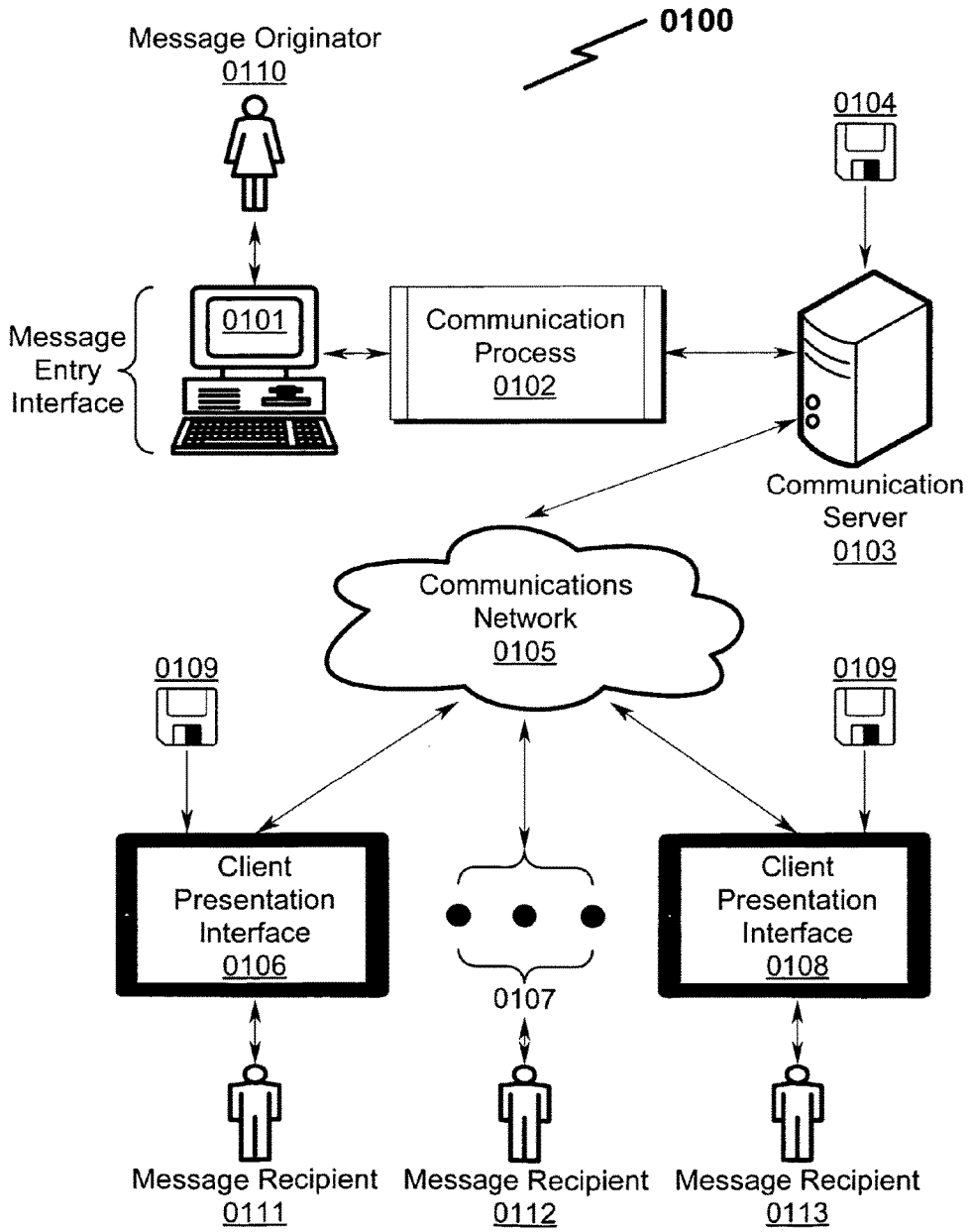
FIG. 1 illustrates a general preferred exemplary embodiment system architecture of the present invention.

While the present invention is susceptible of embodiment in many different forms, there is shown in the drawings and will herein be described in detailed preferred embodiment of the present invention with the understanding that the present disclosure is to be considered as an exemplification of the principles of the present invention and is not intended to limit the broad aspect of the present invention to the embodiment illustrated.

The numerous innovative teachings of the present application will be described with particular reference to the presently preferred embodiment, wherein these innovative teachings are advantageously applied to the particular problems of a MESSAGING SYSTEM AND METHOD WITH DEAD MAN SWITCHING. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Communications Network not Limitive

The present invention anticipates that many preferred embodiments may make use of the Internet to communicate messages and control structures among various system components. However, the present invention should be interpreted to broadly define the term "communications" to include all communication means including but not limited to the Internet. This definition also includes local or private networks that are not publicly accessible.

System Interface not Limitive

The present invention anticipates that many preferred embodiments may make use of personal computers and other networked devices with display screens to act as the system interfaces for human interaction within the context of the disclosed invention. However, the term "interface" as it applies to a human interface within the context of the present invention should be broadly interpreted to mean any means for communicating with an individual. This might (for example) include screen displays and the like as well as lights and other visual indicia, sirens, klaxons (and other audible indicia), as well as vibratory means. Generally speaking, the interface selected will depend on a wide variety of factors known to those of skill in the art depending on the environment in which the particular invention embodiment is applied. Generally speaking, it should be noted that many present invention preferred embodiments specifically anticipate that personal computers (PCs), standalone file servers, and mobile (wireless) telephones (including but not limited to smartphones, mobile devices, computer-operated phones, and the like) will operate as the message processing hosts and/or sources/targets within the context of this disclosure.

Severity/Urgency not Limitive

The present invention anticipates that messages may be routed and identified based on severity levels and/or urgency levels. However, the present invention anticipates that these two broad categories are not limitive of the classifications and identifications that may be given to a particular message. The present invention specifically anticipates that a wide variety of other message "tags" and classifications may be associated with a given message in order to ensure that it is routed to and acted on by appropriate individuals within the hierarchical target message thread.

Customizable Hierarchy/Status Levels not Limitive

The present invention anticipates that the generic "tags" illustrated above in the severity/urgency level description may be made fully customizable to meet client needs. As stated previously there is no limitation on two-level severity/urgency tagging of messages, the system/method may incorporate a plethora of customizable message category hierarchy levels, with each category hierarchy level containing one or more hierarchy status markers. The category hierarchy levels and the hierarchy status markers may be fixed or individually customizable.

Severity Levels not Limitive

The present invention anticipates that messages may be routed and identified based on severity levels comprising SEVERE, SERIOUS, MODERATE, MINOR, and/or ANONYMOUS classifications. The present invention specifically anticipates that this list of classifications may be larger or smaller than this list and teaches that this list is only exemplary of some preferred embodiments of the present invention. One skilled in the art will recognize that this list may be contracted or expanded in a wide variety of ways to address the messaging needs of a particular embodiment implementation.

Urgency Levels not Limitive

The present invention anticipates that messages may be routed and identified based on urgency levels comprising IMMEDIATE, URGENT, NEED SOON, INFORMATIONAL ONLY, and/or ANONYMOUS classifications. The present invention specifically anticipates that this list of classifications may be larger or smaller than this list and teaches that this list is only exemplary of some preferred embodiments of the present invention. One skilled in the art will recognize that this list may be contracted or expanded in a wide variety of ways to address the messaging needs of a particular embodiment implementation.

Encryption not Limitive

Many presently preferred embodiments utilize a variety of military grade 64-bit encryption algorithms that are commonly known to those skilled in the art, but one skilled in the art will recognize that longer encryption keys may be utilized and that there are a wide variety of encryption technologies available for use in this application, with no loss of generality in the teachings of the present invention.

Message Security not Limitive

Many presently preferred embodiments anticipate that custom software and/or other security measures may be installed at target system interfaces to ensure that messages received by these target system interfaces are held secure. This could include elements of physical security as well as software to prevent message copying (printing, screen shots, transfer to cut-and-paste buffers, etc.) from occurring and thus compromising message security. While many operating systems currently do not have this capability currently, the present invention anticipates that these restrictions may be lifted in the future.

The present invention teaches the use of a hierarchical message transmission thread to sequentially (or in parallel) send a message to a series of target system interfaces for presentation to end users. However, the system also anticipates the use of ancillary polling of target system interfaces to determine if they are in fact online/available, and if not, these target system interfaces can be eliminated (skipped) from consideration for message transfers.

Hierarchical Message Transmission Thread not Limitive

The hierarchical message transmission thread described herein may contain a plethora of target source interface addresses contained in a variety of physical formats and information pathway names. This list length is limited only by specific implementation of a particular embodiment and the present invention makes no limitation on this length. Furthermore, the response time values associated with each leg of the hierarchical message transmission thread may be individually set and are not necessarily uniform. The hierarchical message transmission thread may be augmented with conditional branching requirements to permit branching to other hierarchical message transmission threads based on requirements made by the message sourcing process.

Dashboard not Limitive

The present invention in some preferred embodiments utilizes "dashboards" to describe the graphical user interface to the messaging system/method detailed herein. This term should be broadly construed to incorporate any human interface device to a computer communications network, but is currently though to optimally encompass any form of GUI human and/or machine interface.

Color Indicia not Limitive

The present invention in some preferred embodiments utilizes a variety of colors that are associated with message severity and/or urgency classifications. While it is anticipated that some color combinations will be optimal for conveying message severity/urgency levels to the message recipients, no limitation on the range of color schemes is to be construed by the use of color in message presentation.

Message Fixation not Limitive

The present invention in many preferred embodiments utilizes a "fire and forget" methodology in transmission of messages in that once a message is transmitted, its content cannot be modified and its target destination delivery hierarchy cannot be modified. While the currently preferred embodiments prohibit message modification and/or changing of message recipients, some alternate embodiments anticipate that these features may be implemented in some alternately preferred embodiments.

Coherent Thread Delivery not Limitive

The present invention in many preferred embodiments assumes that the message delivery thread hierarchy is fully defined such that there is never a "message delivery failure" in the context of a transmitted message never reaching and being acknowledged by at least one message recipient. However, some alternative embodiments may utilize message hierarchy threads that permit "dead" messages to be acknowledged as "undeliverable" if none of the targeted message recipients are available or capable of acknowledging the message.

Message Delivery Failure not Limitive

The present invention in many preferred embodiments assumes that the transmitted message is properly delivered to a recipient such that a message delivery "failure" is only noticed to the message originator when (a) the message is auto-forwarded or (b) the message originator views (via a mouse or other instrument) the status of a given transmitted message. Other forms of message delivery "failure" are possible, providing for more robust status information to be relayed to the message originator (and possibly inter-stage message recipients). Thus, the present invention while preferring a limited message delivery "failure" definition, may incorporate a wide variant of status and reporting mechanisms to track messages transmitted by the message originator.

Message Logging not Limitive

The present invention in many preferred embodiments reports an auto-forwarded message to all previous message recipients in the message delivery hierarchy (including the message originator), as well as logging the auto-forward condition to a log file. While this form of auto-forward status notification it [though] *thought* to be optimal, the present invention does not limit the scope of auto-forward status to this particular type of notification.

File Attachment Methodology not Limitive

The present invention in many preferred embodiments stores file attachments on a central server and utilizes links to this server to permit message recipients to download and review these files, the present invention is not limited to this particular methodology of file attachment.

General System Architecture (0100)

The most general system overview of the present invention can be understood by the generalized system block structure illustrated in FIG. 1 (0100). In this generalized system structure, the message originator (0110) interfaces with a message entry interface (0101) under control of a communication process (0102) managed on a communication server (0103) that typically operates under control of software derived from a computer-readable medium (0104). Once a message has been entered by the message originator (0110) into the message entry interface (0101), it is then communicated using a communications network (0105) under control of the communications process (0102) and associated communications server (0103) to a remote client presentation interface (0106) for review/acceptance by a message recipient (0111).

This generalized system overview anticipates that there may be a plethora of client presentation interfaces (0106, 0107, 0108) each having one or more associated message recipients (0111, 0112, 0113). The premise behind the system as a whole is that the individual client presentation interfaces (0106, 0107, 0108) may or may not be available for message delivery. Additionally, the message recipients (0111, 0112, 0113) may be unavailable to review/accept the delivered messages. In either of these circumstances the transmitted messages must be acted on by appropriate message recipients (0111, 0112, 0113), so the communications process (0102) and associated server (0103) ensure that message delivery is completed to some message recipient (0111, 0112, 0113) in these circumstances with confirmation of message delivery delivered to the message originator (0110) via the message entry interface (0101) using modified message status indicators.

In some situations the communication process (0102) in order to ensure secure communications will operate independently of the message entry terminal (0101) and utilize the message entry terminal (0101) merely as a data entry portal to the message transmission system. One skilled in the art will recognize that the particular hardware interfaces illustrated in FIG. 1 (0100) are exemplary in nature and that any combination of wired and/or wireless message entry terminals (0101) and/or client presentation interfaces (0106, 0107, 0108) are possible with this generalized invention system structure.

As with the communication server (0103), the client presentation interfaces (0106, 0107, 0108) may incorporate software that controls the operation of these devices, with the software comprising computer instructions residing on non-transitory computer readable medium (0109). Each client presentation interface (0106, 0107, 0108) may be implemented using different hardware platforms and thus it is anticipated that the computer instructions residing on non-transitory computer readable medium (0109) may take a wide variety of forms depending on the hardware platform.

Structurally, the system illustrated in FIG. 1 (0100) can be described as a messaging system with dead man switching, comprising:

(a) message entry interface (0101);
(b) communication process (0102);
(c) communication server (0103);
(d) non-transitory computer readable medium incorporating computer instructions implementing the communication process (0104);
(e) communication network (0105); and
(f) client presentation interface (0106);

wherein the message entry interface (0101) accepts messages from a message originator (0110);

the messages are processed by the communication process (0102) under control of the communication server (0103) to form messages for transmission to a message recipient (0111);

the messages are transmitted over the communications network (0105) by the communication server (0103) to the client presentation interface (0106);

the client presentation interface (0106) presents the message to a message recipient (0111);

the communication server (0103) attempts transmission of the message to alternate client presentation interfaces (0107, 0108) and/or alternate message recipients (0112, 0113) if the message is undeliverable to the message recipient (0111); and the communication server (0103) confirms delivery of the message via the message entry interface (0101) to the message originator (0110).

Key to this description is the ability of the described invention to guarantee message delivery to the appropriate message recipient and appropriately inform the message originator of message reception and acknowledgement by the message recipient. This capability is essential to ensure that messages that are of a mission-critical and/or life-critical nature are appropriately received and acted upon by appropriate message recipients.

General Method Architecture (0200)

Figure 2:
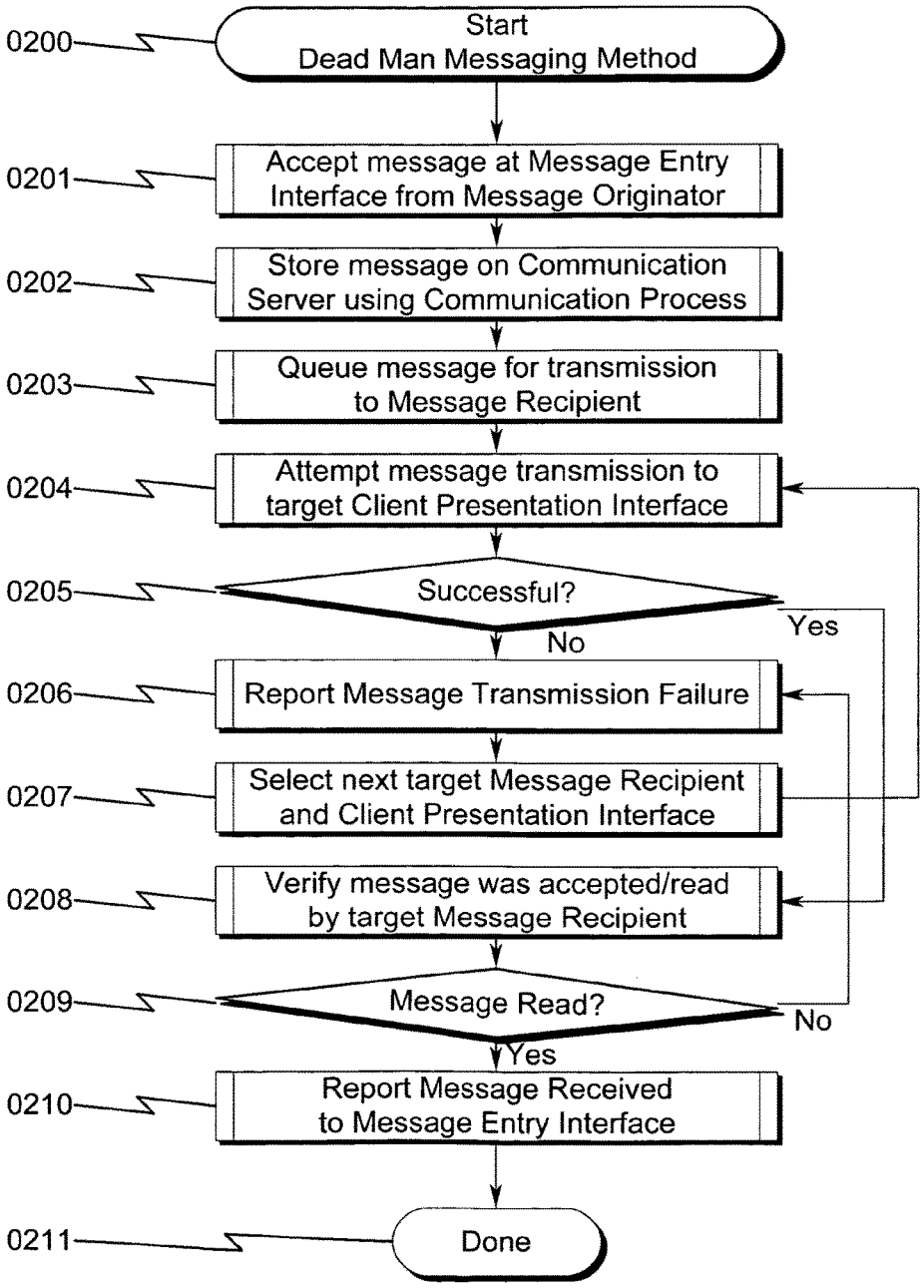
FIG. 2 illustrates a general preferred exemplary embodiment method architecture of the present invention.

Given the foregoing teachings of the present invention system components, the generalized method architecture for the present invention can be viewed as described in FIG. 2 (0200). In this context, the dead man messaging method comprises the following steps:

(1) Accepting a message at the message entry interface from a message originator (0201);
(2) Storing the message on a communication server using a communication process (0202);
(3) Queuing the message on the communication server for transmission to a message recipient (0203);
(4) Attempting to transmit the message to a target client presentation interface associated with a currently targeted message recipient (0204);
(5) Determining if the message transmission was successful, and if so, proceeding to step (8) (0205);
(6) Reporting a message transmission failure to the message entry interface (0206);
(7) Selecting an alternate next target message recipient and associated target client presentation interface and proceeding to step (4) (0207); and
(8) Verifying that the message was accepted/read by the target message recipient (0208);
(9) determining if the message was accepted/read by the target message recipient, and if not, proceeding to the step (6) (0209);
(10) reporting the message was received to the message entry interface (0210); and
(11) terminating the dead man messaging method (0211).

One skilled in the art will recognize that these method steps may be individually eliminated, augmented, modified, and/or rearranged without limiting the teachings of the present invention.

Figure 3:
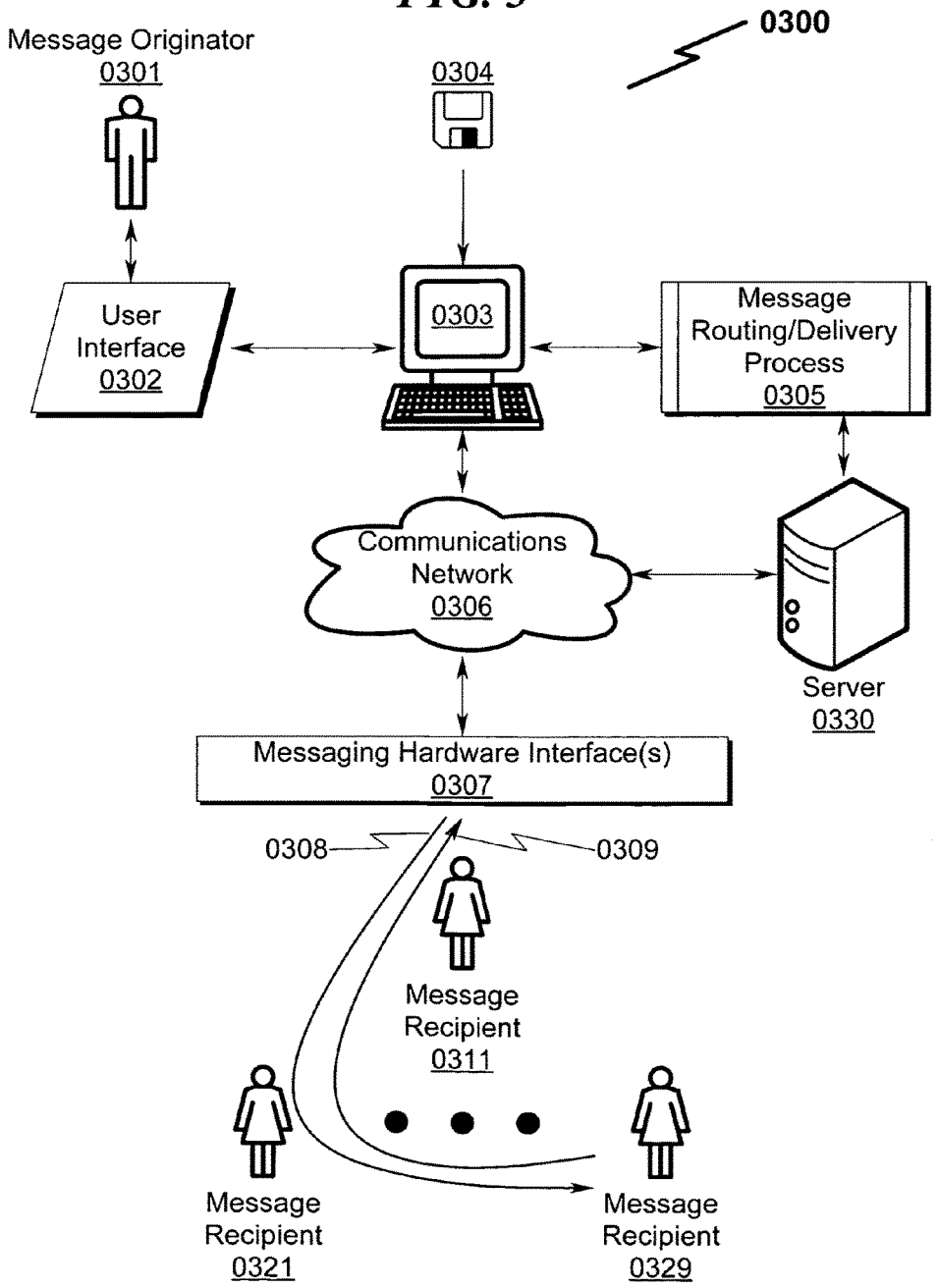
FIG. 3 illustrates a general preferred exemplary embodiment system overview of the present invention.

An alternate generalized system overview of the present invention is also depicted in FIG. 3 (0300), wherein the messaging system interfaces with a message originator (0301) that interacts with a software user interface (0302) running under control of a computer system (0303) with application software contained on a non-transitory computer readable medium (0304). The user interface (0302) collects message content and delivery information from the message originator (0301) and processes this via a message routing and delivery process (0305) through a communications network (0306) to a remote messaging hardware interface (0307). The messaging hardware interface (0307) presents the message information to one or more message recipients (0311, 0321, 0329) that may be configured in a linear vector (0311) or nested (0321, 0329) configuration.

The goal of the message routing/delivery process (0305) is to ensure that messages entered by the message originator (0301) through the user interface (0302) are properly delivered (0308) to the proper message recipient(s) (0311, 0321, 0329) with confirmation (0309) of message delivery, irrespective of the status of the messaging hardware interface (0307) at each of the message recipient (0311, 0321, 0329) locations. Communication protocols between the message routing/delivery process (0305) and the remote message hardware interfaces (0307) ensure that messages are delivered (0308) in a timely fashion, and if not properly acknowledged (0309), then transferred to alternate messaging hardware interfaces (0307) associated with alternate message recipients (0321, 0329).

This generalized system configuration anticipates that the message routing/delivery process (0305) may be distributed among several computer systems (some not shown in the diagram), with some scenarios utilizing the message terminal interface system (0303) as a "thin client" for remote server (0330) interface support.

Additionally, it should be noted that the messaging hardware interface (0307) may be presented individually to a wide variety of message recipients (0311, 0321, 0329) and may be configured in a wide variety of hardware systems, including those that support mobile applications.

Method Overview (0400)

Figure 4:
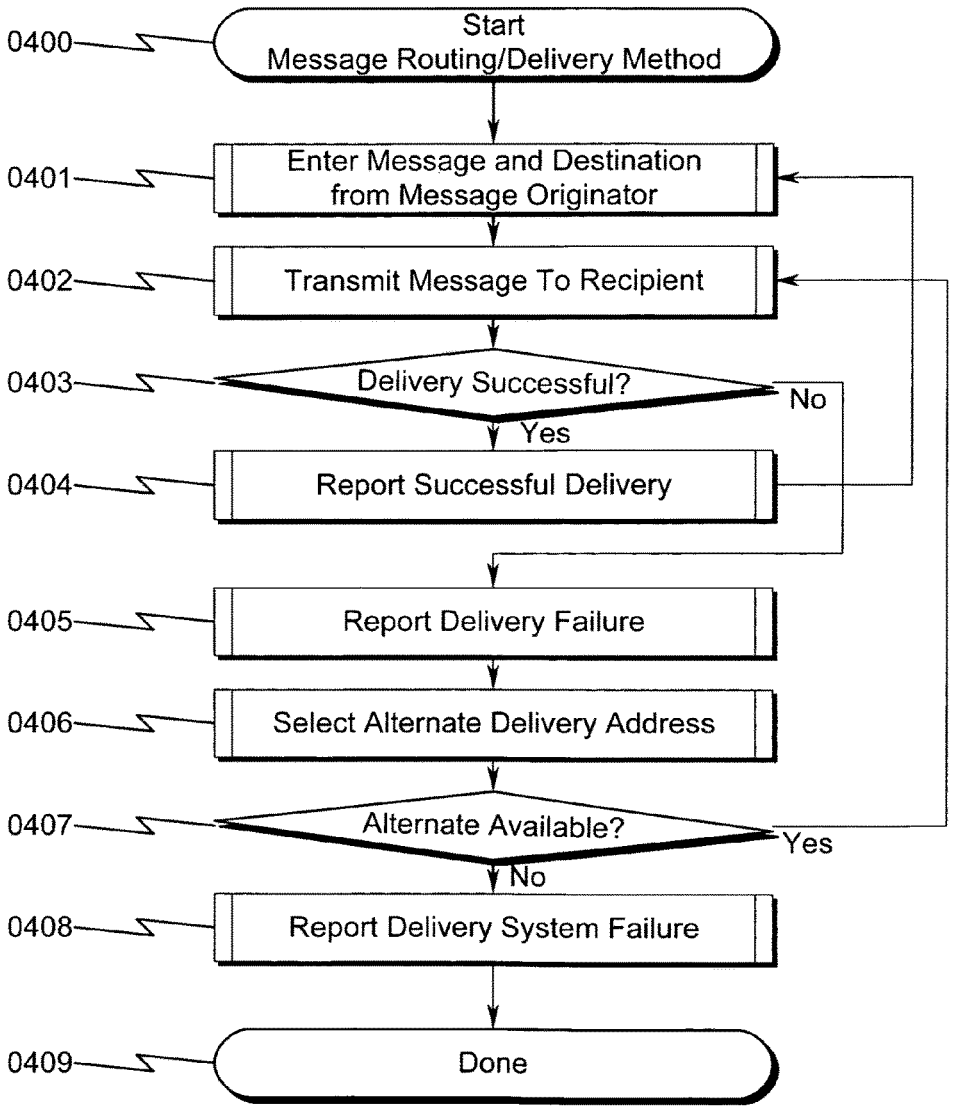
FIG. 4 illustrates a general preferred exemplary embodiment method overview of the present invention.

The above exemplary messaging system may implement a message routing/delivery method as generally illustrated in FIG. 4 (0400), wherein the messaging method comprises the following steps:

(1) A message and its target destination recipient are entered via a user interface by a message originator (0401);
(2) The message is transmitted to its current target recipient (0402);
(3) If the message delivery is unsuccessful, control passes to step (5) (0403);
(4) Successful message delivery is typically not reported to the message originator, and control passes to step (1) (0404);
(5) Message delivery failure via auto-forward is reported to the message originator (0405);
(6) An alternate delivery address and message recipient is selected based on message definition routing (0406);
(7) If an alternate message delivery address is available, control is passed to step (2) (0407);
(8) Otherwise, message delivery system failure is reported to the message originator process for optional review by the message originator (0408); and
(9) The message routing/delivery method is terminated (0409).

One skilled in the art will recognize that these method steps may be individually eliminated, augmented, modified, and/or rearranged without limiting the teachings of the present invention. While there are many methodologies to ensure proper delivery of messages from the message originator to the message recipient, the above methodology is only one of several preferred methods.

Top Level System Embodiment (0500)

Figure 5:
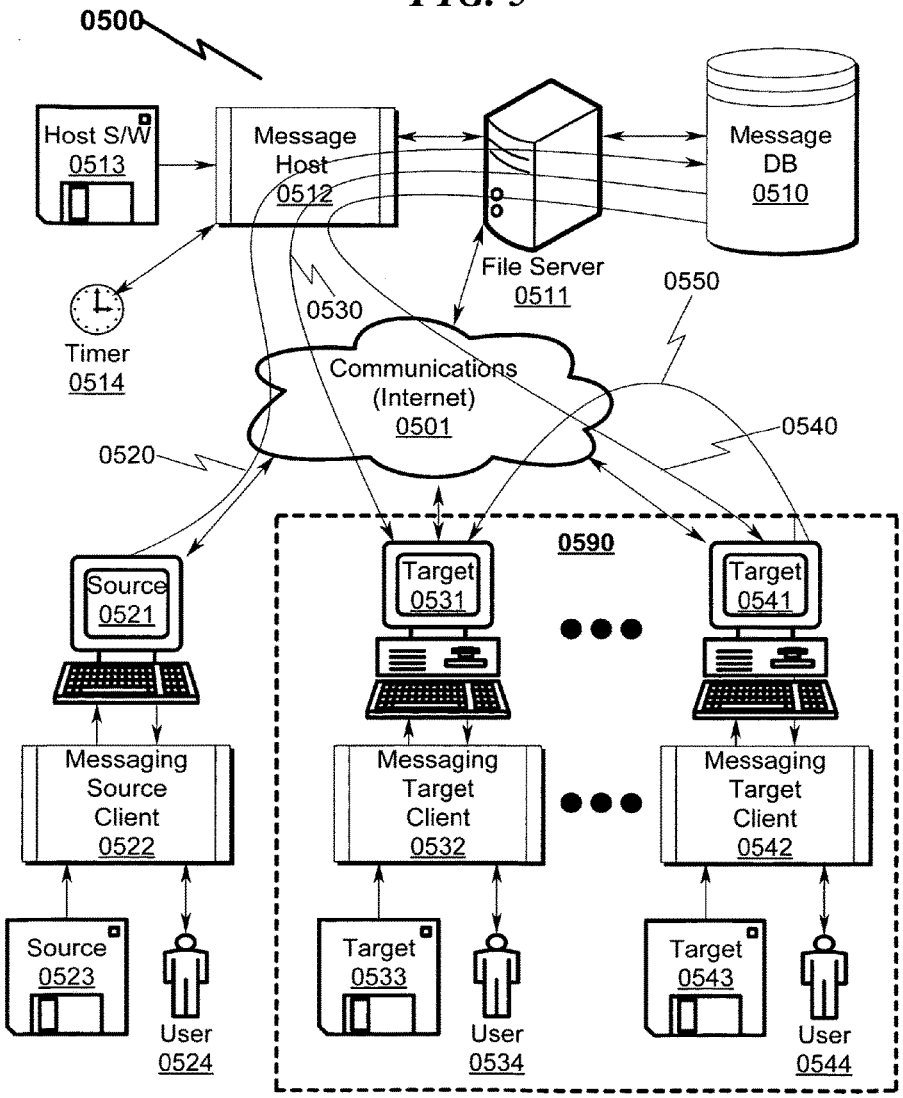
FIG. 5 illustrates a preferred exemplary embodiment top level system overview of the present invention.

The general system architecture of the present invention is illustrated in FIG. 5 (0500). The system generally comprises a message database (0510) serviced by a file server (0511) operating under control of message hosting software (0512) having computer readable software residing on a non-transitory computer readable medium (0513). The file server (0511) communicates (0501) with a messaging source interface (0521) under control of a messaging source client process application (0522) that may contain software residing on a non-transitory computer readable medium (0523). The messaging source interface (0521) collects messages from a user (0524) and transmits this information (0520) to the message host (0512) to the file server (0511) and into the message database (0510).

It should be noted that the message host (0512) and file server (0511) may represent a geographically and spatially diverse set of hardware and software, such that the system/method described herein could be implemented on a worldwide basis if necessary. This configuration would provide the capability of periodically polling each and every target system interface serviced by the system to interrogate its current availability/status. In this manner target system interfaces that are not available can be eliminated from consideration for message transfers.

The message information (0520) may be tagged with a variety of information regarding the severity and/or urgency of the message along with other information dictated by the user (0524). This information (0520) is then processed through a hierarchical message transmission thread that determines which target user should receive the message information (0520) and in what order they should receive the information.

The general information flow from the message database (0510) traverses through the hierarchical message transmission thread by first attempting to transmit the message information to the head of the thread, targeting a first message target system (0531) having target client software processes (0532) with the software residing on a non-transitory computer readable medium (0533). The message (0530) is presented to a first target user (0532), utilizing audio and/or visual methodologies within the target interface system (0531).

If the first target user (0534) fails to respond to the message (0530) within a predetermined time interval monitored by a message host timer (0514), the message host process (0532) notes this fact, notifies the source user (0524) via the source system interface (0521) under direction of the messaging source client (0522).

Failure of the first target user (0534) to properly respond to the message information (0530) causes the message (0530) to be retransmitted to the next user (0544) on the hierarchical message transmission thread via a new message (0540) directed at the next target system interface (0541) under management of message targeting client processes (0542) that are directed by software residing on a non-transitory computer readable medium (0543). Responses by the subsequent target system interface (0541) under management of message targeting client processes (0542) may be logged (0550) back to the preceding target system interface (0532) as well as logged in a message archive.

Should the secondary user (0544) fail to respond in a predetermined time specified by the message host timer (0514), the hierarchical message transmission thread is further traversed to determine the next available target system interface and associated target client software and target user. Thus, the process iterates throughout the hierarchical message transmission thread until some target user responds to the message. This message response is entered by the recipient and forwarded back to the message host and eventually the messaging source user (0524). A log maintaining all activity in this regard is provided for archival inspection and current review by the messaging source user (0524). In every instance, the failure of the target user to respond within a predetermined time is relayed via message to the messaging source user (0524).

The system as described may also incorporate a "pass thru" mechanism wherein the message target client (0532, 0542) permits the target user (0534, 0544) to comment on the message and pass it along for further inspection by other users in circumstances where the message is noted but cannot be acted on by a given user. This "pass thru"

functionality may also be augmented with a "conditional branching" functionality wherein the message is copied to a new thread of target users but allowed to also flow along its current target message thread based on activity of the recipient and conditional branching requirements defined by the message sourcing process. This scenario might be appropriate in situations where the message must be acted on by a particular operating group within the company, but the originator of the message realizes that a completely different operating group may also need to be notified of the message contents and act appropriately within their individual operating group.

General System Information Flow

The present invention can be generally described with respect to information flow among the components as follows, with the messaging system comprising:

(a) message database (0510);
(b) message file server (0511);
(c) message host process operating on the file server (0512); and
(d) non-transitory computer readable medium incorporating computer instructions comprising the message host process (0513);
(e) source message system interface (0521);
(f) source messaging client process (0522);
(g) non-transitory computer readable medium incorporating computer instructions comprising the source messaging client process (0523);
(h) target messaging system interface (0531);
(i) target messaging client process (0532); and
(j) non-transitory computer readable medium incorporating computer instructions comprising the target messaging client process (0533);

wherein the source messaging client process (0522) receives messages and message severity/urgency classifications from a user (0524) via the source messaging system (0521);

the source messaging system (0521) transmits the messages and message severity/urgency classifications to the message host process (0512) for storage on the message database (0510) via the message file server (0511);

the message host process (0512) transmits the message and the message severity/urgency classification to the target system interface (0531) via a communications medium (0501) for display by the target system interface (0531) under control of the target message process (0532);

the target message process (0532) responds to the message host process (0512) if the message is examined on the target system interface (0531) by a target user (0534);

the message host process (0512) waits a predetermined amount of time (0514) for the response to the message by the target user (0534) and if the predetermined time (0514) is exceeded, the message is retransmitted to another target system interface (0541) for inspection by another target user (0544); and the message host process (0512) reports to the source message process (0522) the status of attempts to deliver the message to each of the target systems (0531, 0541).

Figure 6:
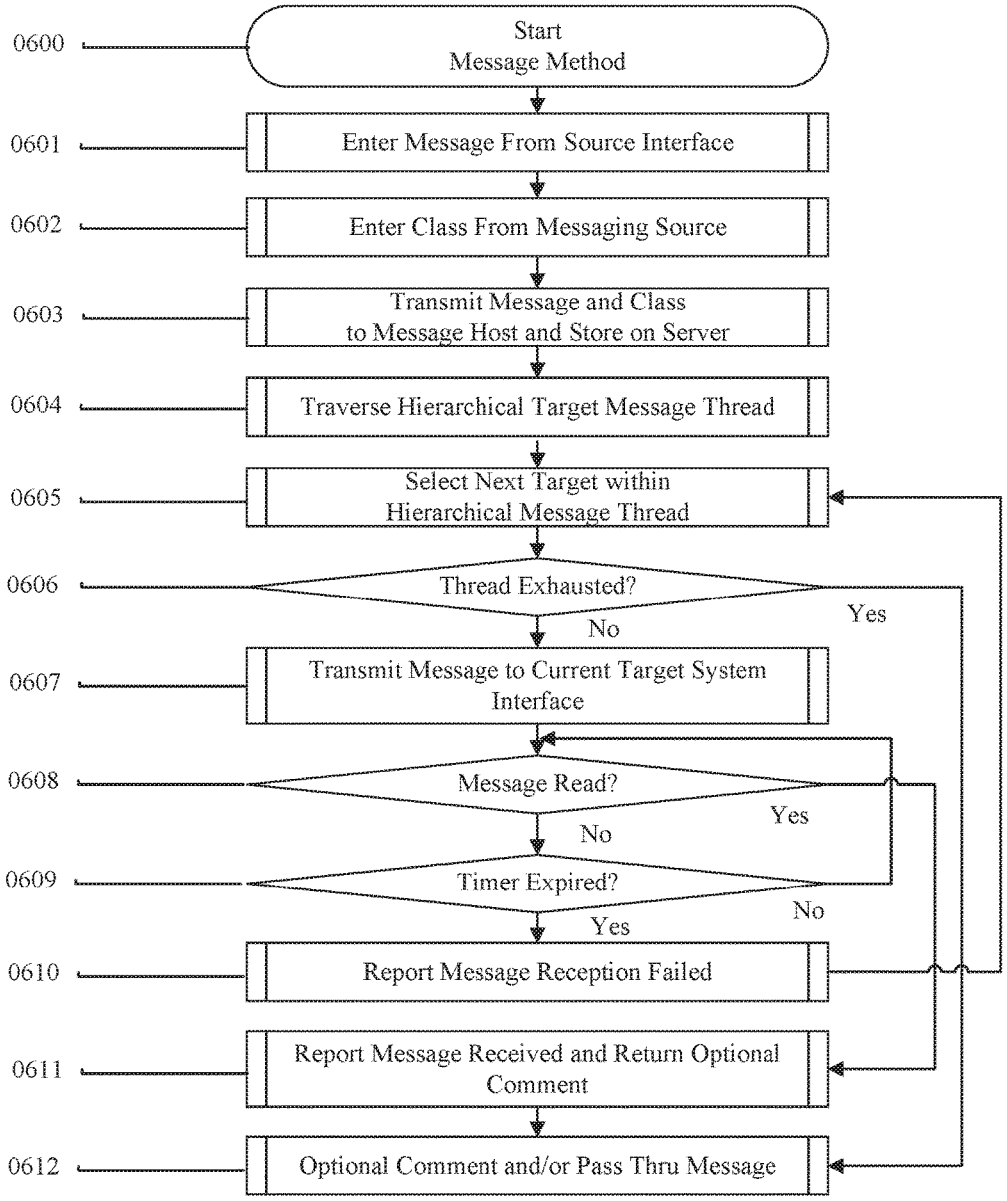
FIG. 6 illustrates a preferred exemplary embodiment top level method overview of the present invention.

One skilled in the art will recognize that the integration of the system diagram in FIG. 5 (0500) along with the flowchart in FIG. 6 (0600) yields this exemplary data flow description.

Top Level Method Embodiment (0600)

Given the foregoing teachings of the present invention system components, the generalized method architecture for the present invention can be viewed as described in FIG. 6 (0600). In this context, the messaging method incorporates a system comprising the following elements:

(a) message database (0510);
(b) message file server (0511);
(c) message host process operating on the file server (0512); and
(d) non-transitory computer readable medium incorporating computer instructions comprising the message host process (0513);
(e) source message system interface (0521);
(f) source messaging client process (0522);
(g) non-transitory computer readable medium incorporating computer instructions comprising the source messaging client process (0523);
(h) target messaging system interface (0531);
(i) target messaging client process (0532); and
(j) non-transitory computer readable medium incorporating computer instructions comprising the target messaging client process (0533);

wherein the source messaging client process (0522) receives messages and message severity/urgency classifications from a user (0524) via the source messaging system (0521);

the source messaging system (0521) transmits the messages and message severity/urgency classifications to the message host process (0512) for storage on the message database (0510) via the message file server (0511);

the message host process (0512) transmits the message and the message severity/urgency classification to the target system interface (0531) via a communications medium (0501) for display by the target system interface (0531) under control of the target message process (0532);

the target message process (0532) responds to the message host process (0512) if the message is examined on the target system interface (0531) by a target user (0534);

the message host process (0512) waits a predetermined amount of time (0514) for the response to the message by the target user (0534) and if the predetermined time (0514) is exceeded, the message is retransmitted to another target system interface (0541) for inspection by another target user (0544) irrespective of any reply by the first target user; and the message host process (0512) reports to the source message process (0522) the status of attempts to deliver the message to each of the target systems (0531, 0541);

with the method comprising the steps of:

(1) entering a message from the messaging source interface (0601);
(2) selecting a message severity/urgency classification from the messaging source interface (0602);
(3) transmitting the message severity/urgency classification to the message host and storing the message on the message database via the file server (0603);

(4) traversing a hierarchical target message thread to determine the targets for the message (0604);

(5) selecting the next message target within the hierarchical message thread (0605);

(6) determining if the hierarchical message thread is exhausted, and if so, proceeding to step [(10)] (*12*) (0606);

(7) transmitting the message to the currently selected target system interface within the hierarchical message thread (0607);

(8) determining if the message has been read by the currently selected target system interface within the hierarchical message thread, and if so, proceeding to step (11) (0608);

(9) determining if a target response timer has expired, and if not, proceeding to the step (8) (0609);

(10) reporting to the source messaging interface that message reception has failed and proceeding to the step (5) (0610);

(11) reporting status of message delivery to previous steps in the hierarchical thread [(0611); (12)] *and* reporting to the source messaging interface that the message has been received and returning any optional user comment ([0612] *0611*); and

[(13)] (*12*) optionally entering comments on the message and/or passing thru the message to the current or another hierarchical message thread [(0613)] (*0612*).

One skilled in the art will recognize that these method steps may be individually eliminated, augmented, modified, and/or rearranged without limiting the teachings of the present invention.

Exemplary System Network Layout (0700, 0800)

Figures 7, 8:
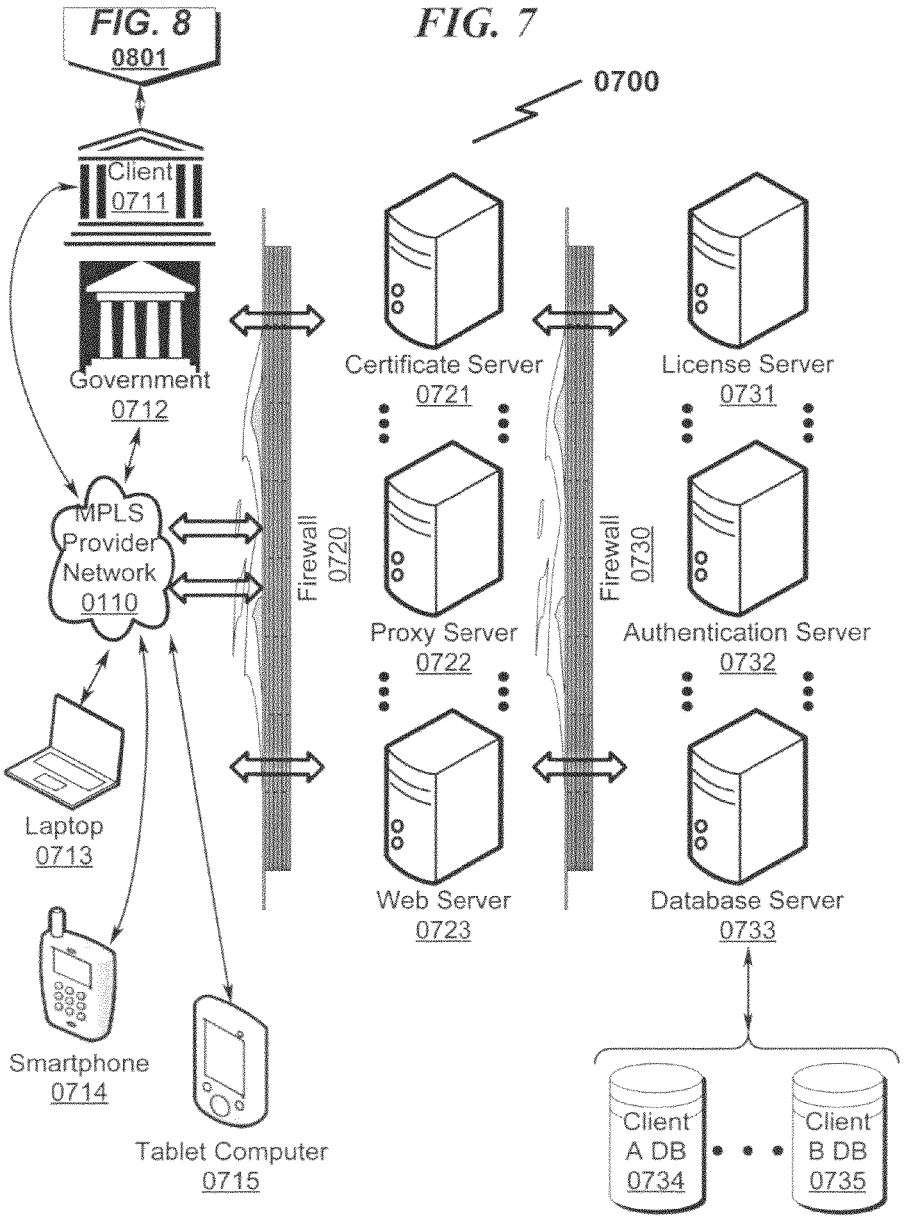
FIG. 7 illustrates an exemplary expanded system network layout for some preferred exemplary embodiments of the present invention.
FIG. 8 illustrates an exemplary expanded system network layout for some preferred exemplary embodiments of the present invention.
Figure 8:
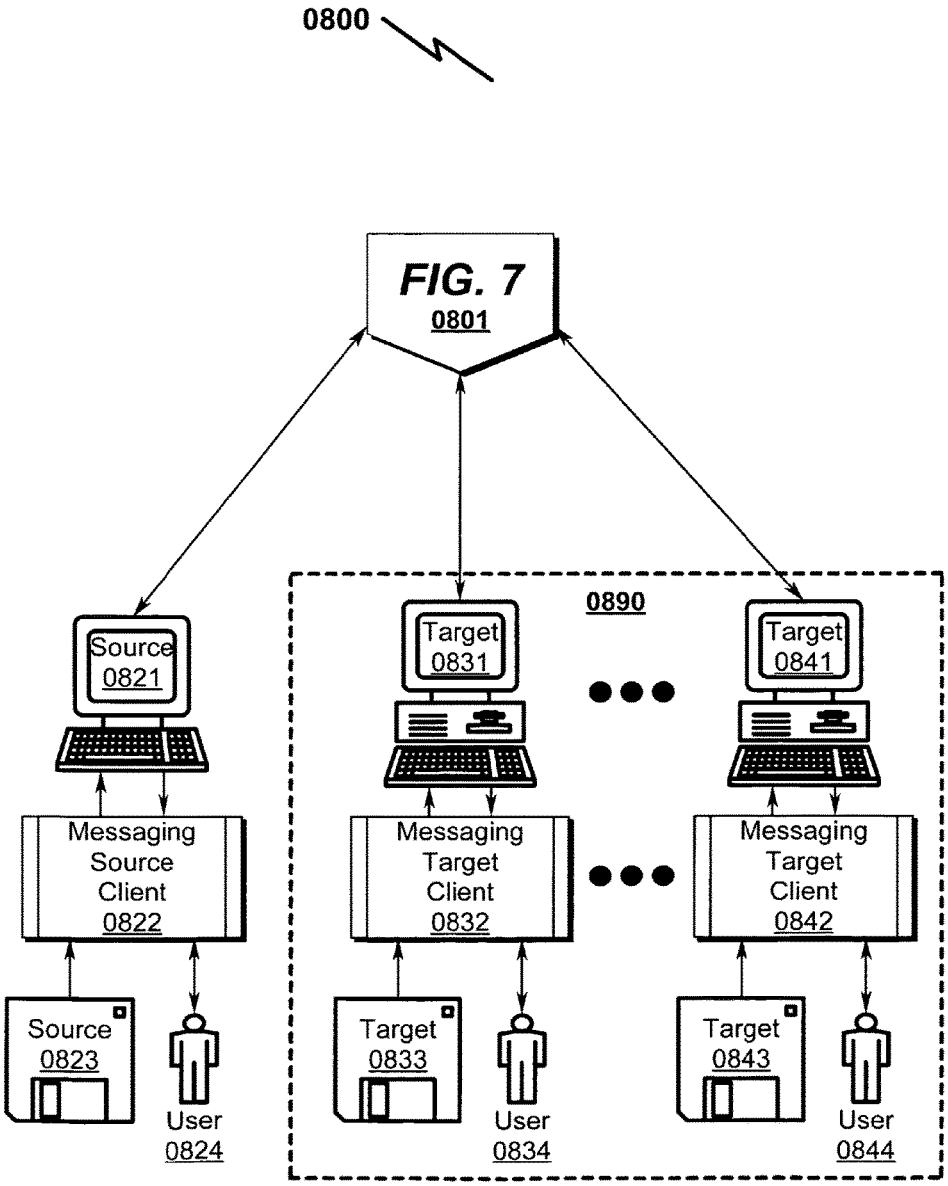

While many network communication topologies are possible to implement the present invention system/method, one preferred system network layout is described in FIG. 7 (0700) and FIG. 8 (0800), with the following typical elements of construction:

Client (0711)—This represents any client such as a large company or organization.

Government (0712)—This represents a government or not-for-profit organization.

Laptop (0713)—This represents any wireless client using a laptop to connect to the network.

Smartphone (0714)—This represents any smart device such as a smartphone or mobile device.

Tablet Computer (0715)—This represents any mobile computing device such as a tablet computer.

The Certificate Server (0721), Proxy Server (0722), and Web Server (0723) reside behind firewall 1 (0720) and provide the primary level of authentication and validation of licenses.

Certificate Server (0721)—Certificate servers validate, or certify, keys as part of a Public key infrastructure. Keys are strings of text generated from a series of encryption algorithms that allow secure communications for a group of users. Keys are created that *are* used for validation. The process creates a way ensure communications between clients and servers and be reasonably sure that others are not eavesdropping or assuming a false identity.

Proxy Server (0722)—The proxy server acts as an intermediary for requests from clients seeking resources from our databases. A client connects to the proxy server, requesting some service, such as a file, connection, web page, or other resource available from a different server. The proxy server evaluates the request according to its filtering rules. If the request is validated by the filter, the proxy provides the resource by connecting to the relevant server and requesting the service on behalf of the client. This would be a reverse proxy (or surrogate) that appears to clients to be an ordinary server. Requests are forwarded to one or more origin servers which handle the request. The response is returned as if it came directly from the proxy server providing another layer of protection to the back end (internal) servers which reside behind the secondary firewall.

Web Server (0723)—The Web server refers to either the hardware (the computer) or the software (the computer application) that helps to deliver content that can be accessed through the Internet. It serves as an interface between the servers behind the primary firewall and the backend servers (i.e., the proxy server and the database server).

The License Server (0731), Authentication Server (0732), and Database Server (0733) reside behind firewall 2 (0730) and provide the secondary level of authentication and validation of licenses.

License Server (0731)—This is the key server for software licensing that refers to a centralized computer software system which provides tokens, or keys, to client computers in order to enable licensed software to run on them. This server determines and controls the number of copies of a software program permitted to be used based on the license entitlements that our client(s) have purchased. This server provides licensing services to an enterprise computing environment. In essence it manages software licensing based on specific software product offerings.

Authentication Server (0732)—These servers provide authentication services to users or other systems via networking. Remotely placed users and other servers authenticate to such a server, and receive cryptographic tickets. These tickets are then exchanged with one another to verify identity. Authentication is used as the basis for authorization (determining whether a privilege will be granted to a particular user or process), privacy (keeping information from becoming known to non-participants), and non-repudiation (not being able to deny having done something that was authorized to be done based on the authentication).

Database Server (0733)—The database server is a computer system and associated software that provides database services to other computer programs or computers, as defined by the client-server model. Database management systems provide database server functionality, and function on a client-server model for database access. Such a server is accessed through the "back end" which runs on the server and handles tasks such as data analysis and storage. In this master-slave model, the database master servers are central and primary locations of data while database slave servers are synchronized backups of the master acting as proxies.

Client Database A (0734)—This is a dedicated database for one client (Client A).

Client Database B (0735)—This is a dedicated database for one client (Client B).

One skilled in the art will recognize that many other network communication topologies are possible when implementing the present invention without departing from the spirit of the invention.

Message Transport Methodologies

The present invention anticipates a wide variety of message transportation methodologies, with several of the preferred methodologies illustrated generally in FIG. 9 (0900), FIG. 10 (1000), FIG. 11 (1100) and described below.

Parallel Message Transmission (0900)

Figure 9:
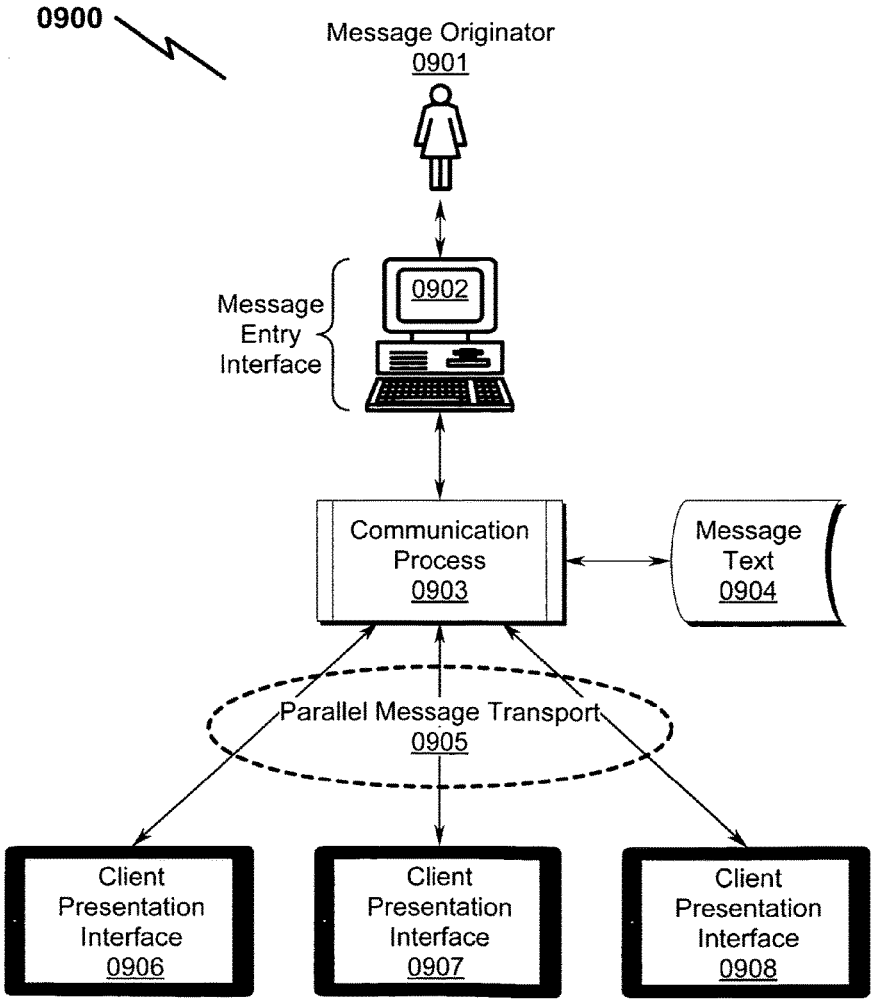
FIG. 9 illustrates an exemplary parallel message transport methodology useful in some preferred embodiments of the present invention.

As generally illustrated in FIG. 9 (0900), the present invention anticipates the use of parallel message transmission in the delivery of messages. In this case a message originator (0901) interacts with a message entry interface (0902) under control of a communication process (0903) to generate message text (0904) that is delivered using a parallel transport mechanism (0905) simultaneously to a number of client presentation interfaces (0906, 0907, 0908).

The message recipients associated with these client presentation interfaces (0906, 0907, 0908) are generally kept in a recipient list database under either individual identifications and/or distribution lists. Key to this transport mechanism is that the parallel message transportation algorithm (0905) "broadcasts" the message (0904) to all of the recipient client presentation interfaces (0906, 0907, 0908) without regard to priority for any given message recipient. While the communication with the client presentation interfaces (0906, 0907, 0908) may be bi-directional, the parallel transport mechanism (0905) considers the group of target recipients to be a single recipient for the purposes of scheduling the message (0904) transport.

Cascade (Serial) Message Transmission (1000)

Figure 10:
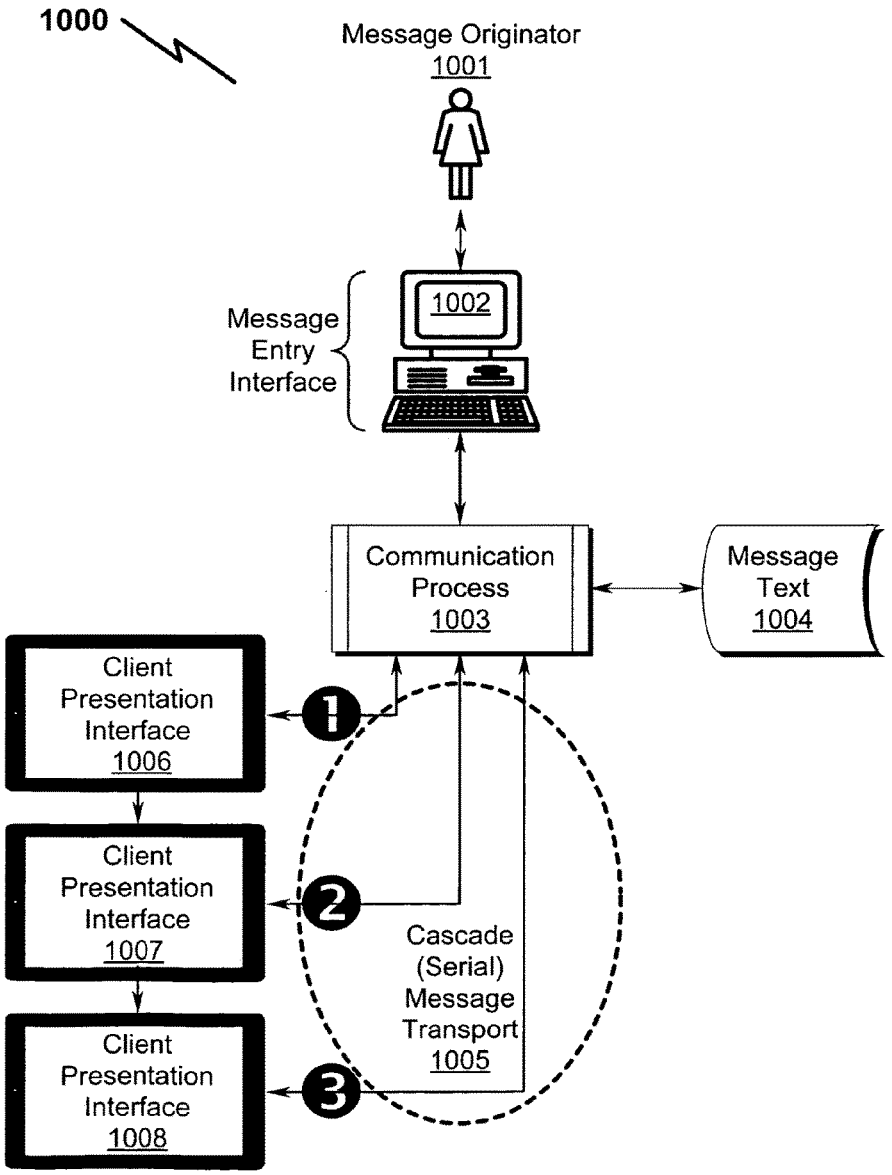
FIG. 10 illustrates an exemplary cascade message transport methodology useful in some preferred embodiments of the present invention.

As generally illustrated in FIG. 10 (1000), the present invention anticipates the use of cascade (serial) message transmission in the delivery of messages. In this case a message originator (1001) interacts with a message entry interface (1002) under control of a communication process (1003) to generate message text (1004) that is delivered using a cascade transport mechanism (1005) sequentially to a number of client presentation interfaces (1006, 1007, 1008) using a particular order of delivery.

This transport mechanism differs from parallel transport in that under parallel message transmission, all of the target client presentation interfaces (0906, 0907, 0908) receive the transmitted message, whereas in the case of cascade transmission only the first responding client presentation interface (1006, 1007, 1008) who accepts the message will receive the message, with the remaining client presentation interfaces (1006, 1007, 1008) not necessarily receiving the message. Should a given client presentation interfaces (1006, 1007, 1008) timeout on acknowledgment and/or reply to a given message (1004), the remaining client presentation interfaces (1006, 1007, 1008) in the serial cascade chain will be given the opportunity to accept, acknowledge, and respond to the message (1004). This particular method of message transport is especially applicable in situations where a rigorous chain-of-command is imposed on responding to messages, such as in the case of emergency management personnel and the like.

Mixed Mode Message Transmission (1100, 1200)

Figure 11:
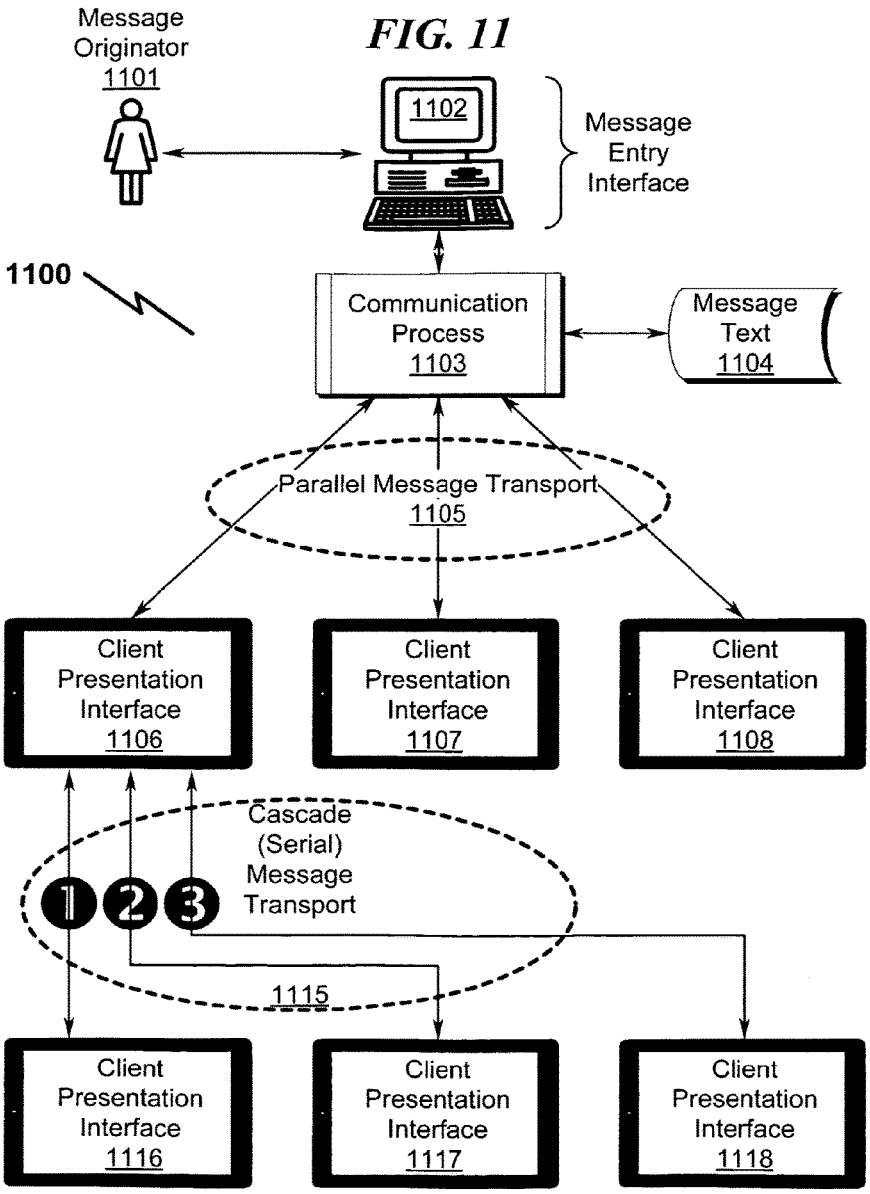
FIG. 11 illustrates an exemplary parallel/cascade message transport methodology useful in some preferred embodiments of the present invention.
Figure 12:
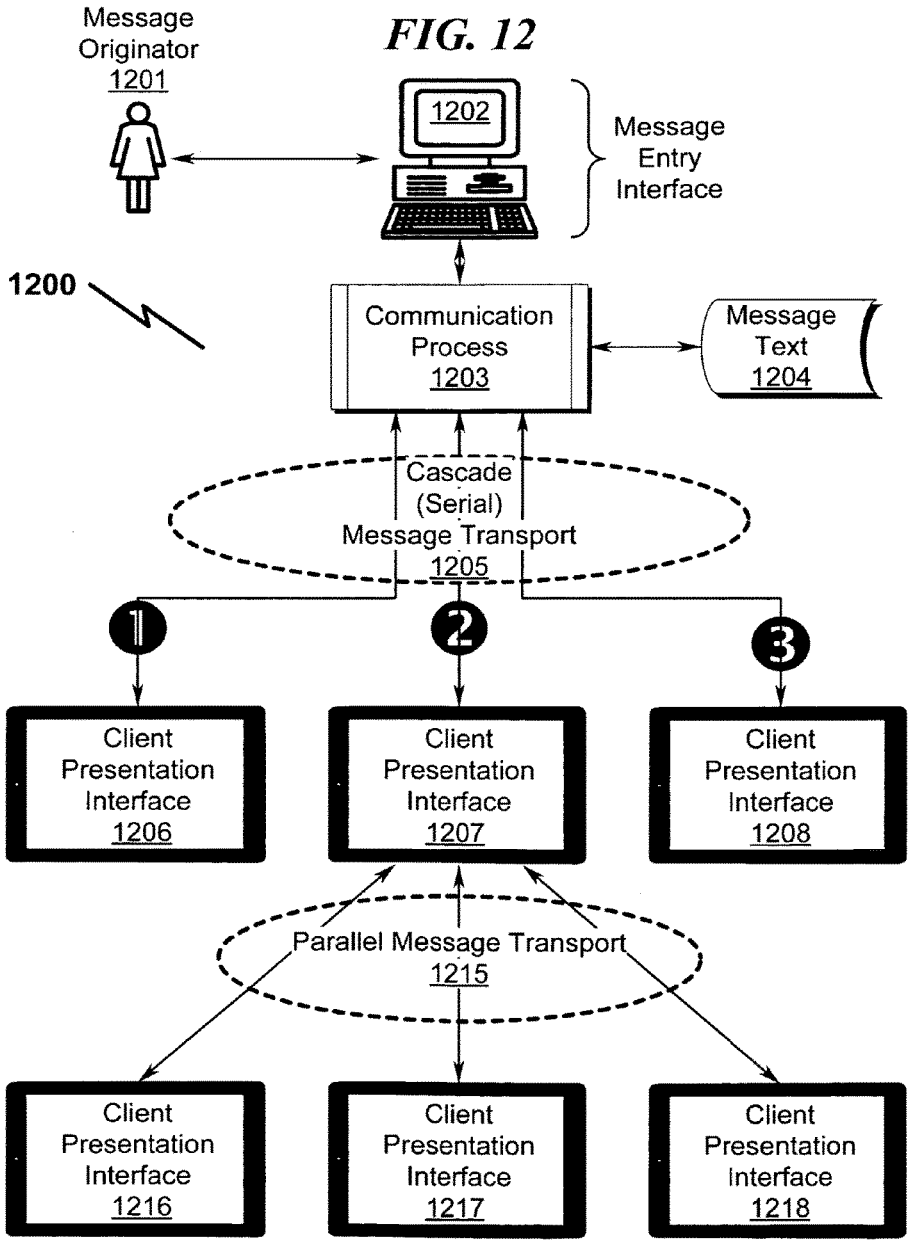
FIG. 12 illustrates an exemplary cascade/parallel message transport methodology useful in some preferred embodiments of the present invention.

As generally illustrated in FIG. 11 (1100) and FIG. 12 (1200), the present invention anticipates the use of mixed mode parallel/cascade and cascade/parallel message transmission methodologies in the delivery of messages. From these exemplary diagrams it can be seen that the following types of message transport are anticipated by the present invention:

Parallel message transport (FIG. 9 (0900));
Cascade message transport (FIG. 10 (1000));
Parallel/cascade message transport (FIG. 11 (1100));
Cascade/parallel message transport (FIG. 12 (1200));
Parallel/parallel message transport (equivalent to a terminal cascade branch that has a parallel transport mode branch);
Cascade/cascade message transport (equivalent to a terminal parallel branch that has a cascade transport mode branch).

One skilled in the art will recognize that these individual message transport modes and their variations can be combined in a wide variety of ways to cover an enterprise message distribution network in ways that are optimal to the both the reception and proper processing of messages that are of a property and/or life-critical nature.

Anticipatory Message Queuing (AMQ)

Conventional Message Delivery Overview (1300)

Under normal circumstances, the present invention processes messages by sequentially transmitting the message to addresses contained in a hierarchical target message address list. After each transmission, a predefined amount of time is allocated to determine if a response to the message has been received by the host message processor. If no response message is received (or if the response indicates that the message should be passed thru or passed around) the next address in the hierarchical target message address list is selected as the target for the message. This process continues until a successful response/action message is received from a targeted system interface.

Figure 13:
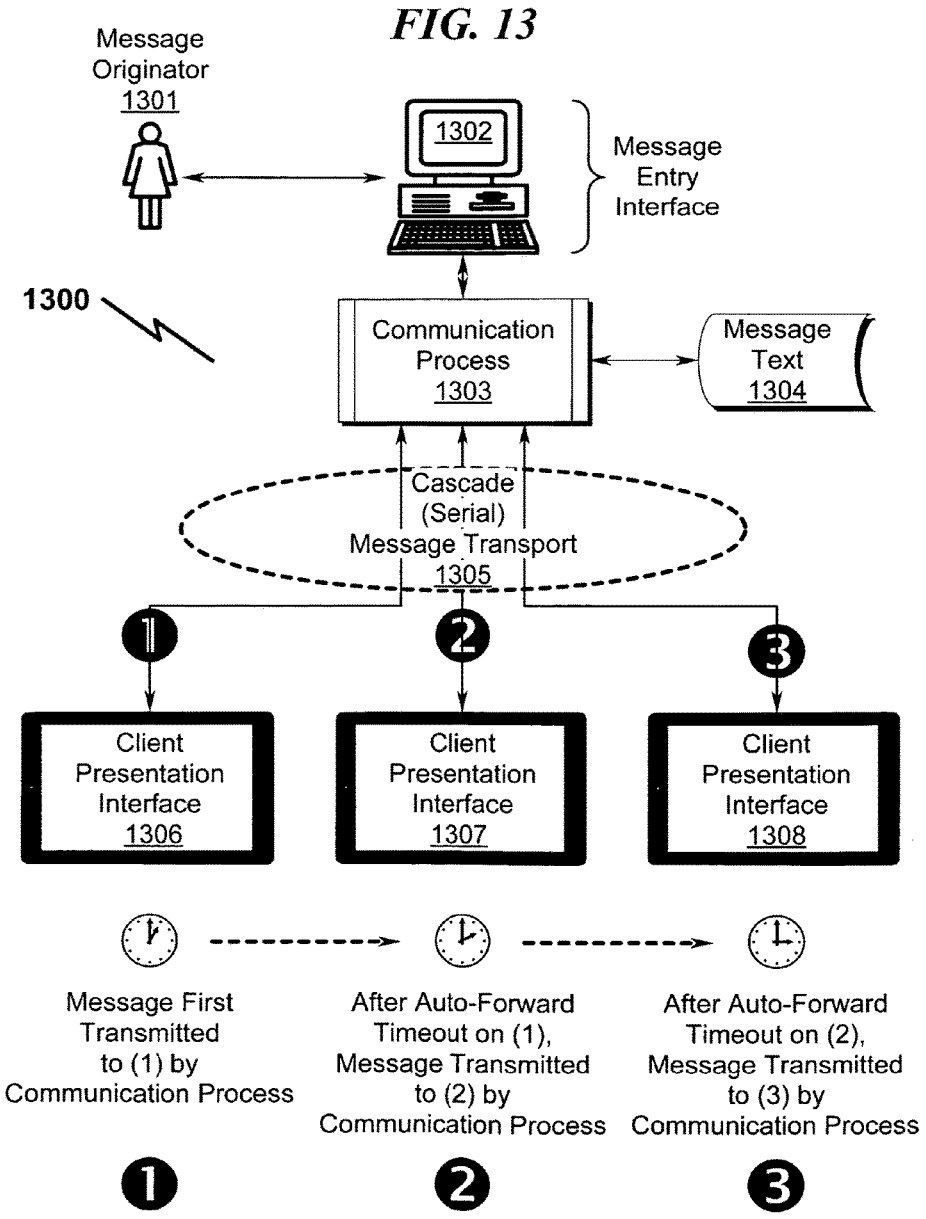
FIG. 13 illustrates a preferred exemplary embodiment of the present invention utilizing message delivery auto-forward timeouts.

This scenario can be seen by illustration in FIG. 13 (1300), wherein the cascade message transport (1305) first transmits the message to a first client presentation interface (1306) after which it is subsequently routed to a second client presentation interface (1308) and subsequently a third client presentation interface (1308) (assuming the first two client presentation interfaces (1306, 1307) auto-forward the message). There always exists a delay between the auto-forward timeout and the delivery reception of the message to the next downstream cascade message receptor. This additional delay is in addition to the auto-forward time and in some circumstances can be significant.

Anticipatory Message Queuing Methodology (1400)

Figure 14:
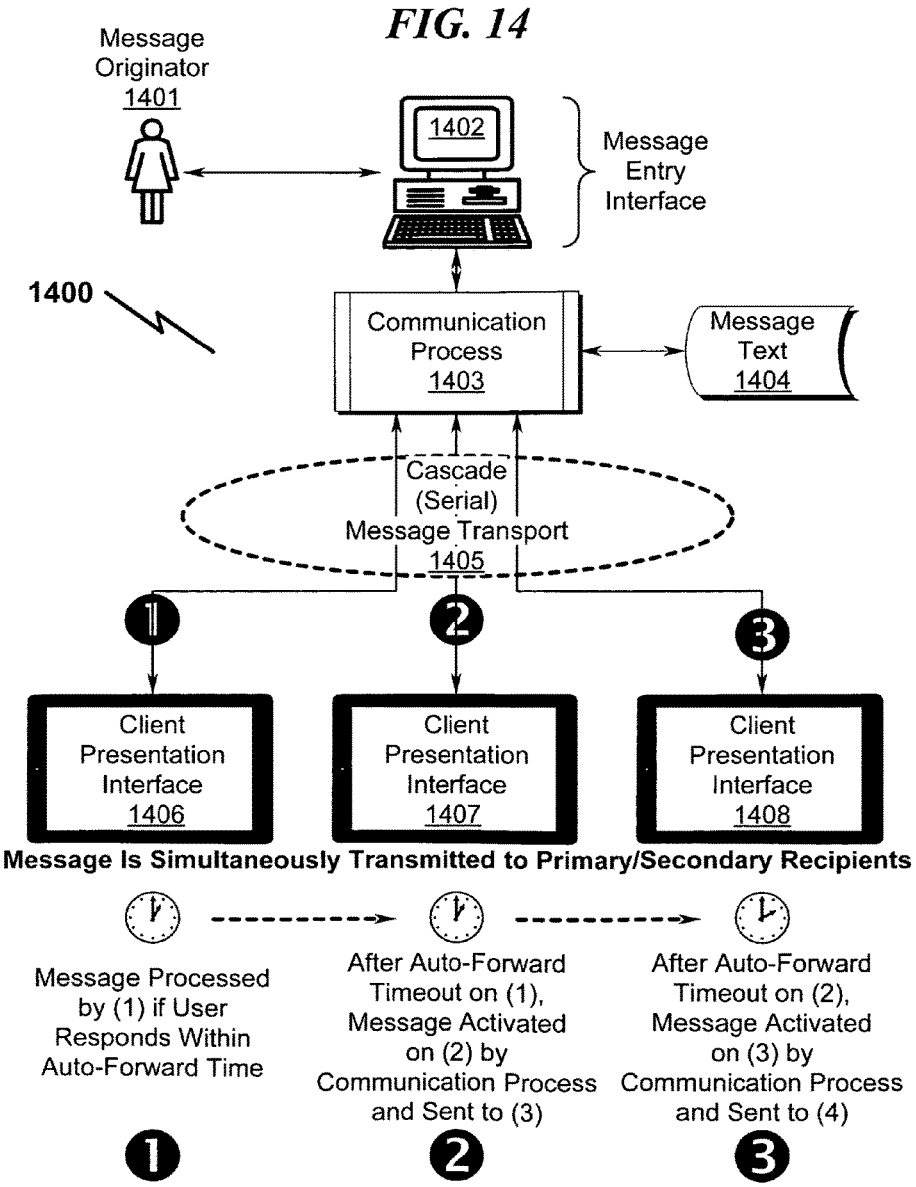
FIG. 14 illustrates a preferred exemplary embodiment of the present invention utilizing anticipatory message queuing (AMQ)

The present invention also teaches several augmented versions of this message delivery system collectively termed "anticipatory message queuing." As generally illustrated in FIG. 14 (1400), under this modification, each time a message is sent to a target system interface (1406), the same message is sent to the next target system interface (1407) addressed by the hierarchical target message address list. This anticipatory message is tagged as "preliminary" and not immediately processed by the subsequent target system interface (1407). Should the current target system interface (1406) fail to respond within a predetermined time interval, the message host process can merely send an activation message to the subsequent target system interface (1407) to trigger processing of the previously received message. Thus, this message delivery architecture distinguishes between a message being "received" and being "active" on the current target system interface.

Alternative Anticipatory Message Queuing Methodology (1500)

Figure 15:
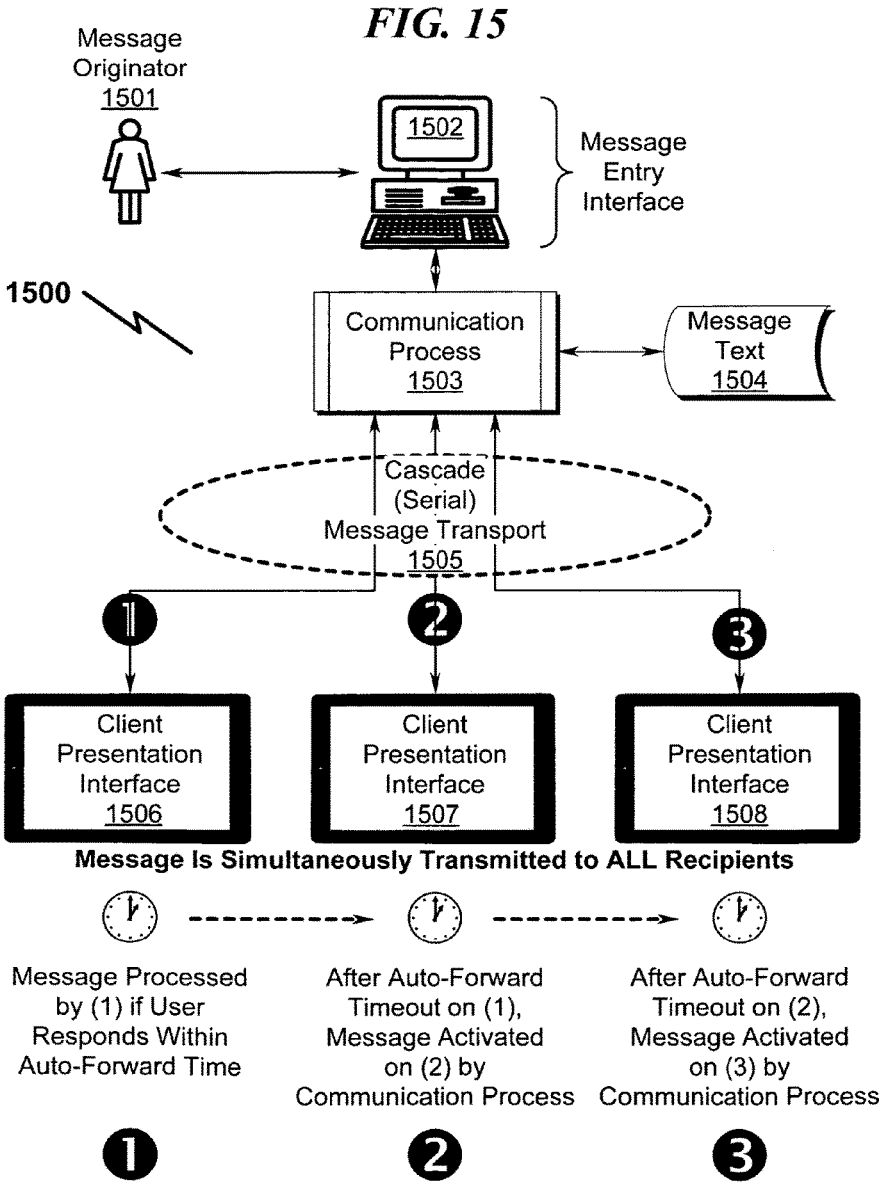
FIG. 15 illustrates an alternate preferred exemplary embodiment of the present invention utilizing anticipatory message queuing (AMQ)

An alternative to the AMQ methodology of FIG. 14 (1400) is illustrated in FIG. 15 (1500), wherein the message is simultaneously transmitted to ALL target system interfaces (1506, 1507, 1508) and then triggered as "active" by the communications process (1503) if the previous system interface timed out and auto-forwarding is mandated. The advantage of this approach is the fact that intermediate next-target communications can occur for ALL potential system targets without the need for waiting for an auto-forward condition to occur. Given that it might take a substantial time for the initial target communications to take place, this reduction in overhead can be significant.

Autonomous Anticipatory Message Queuing Methodology (1600)

Figure 16:
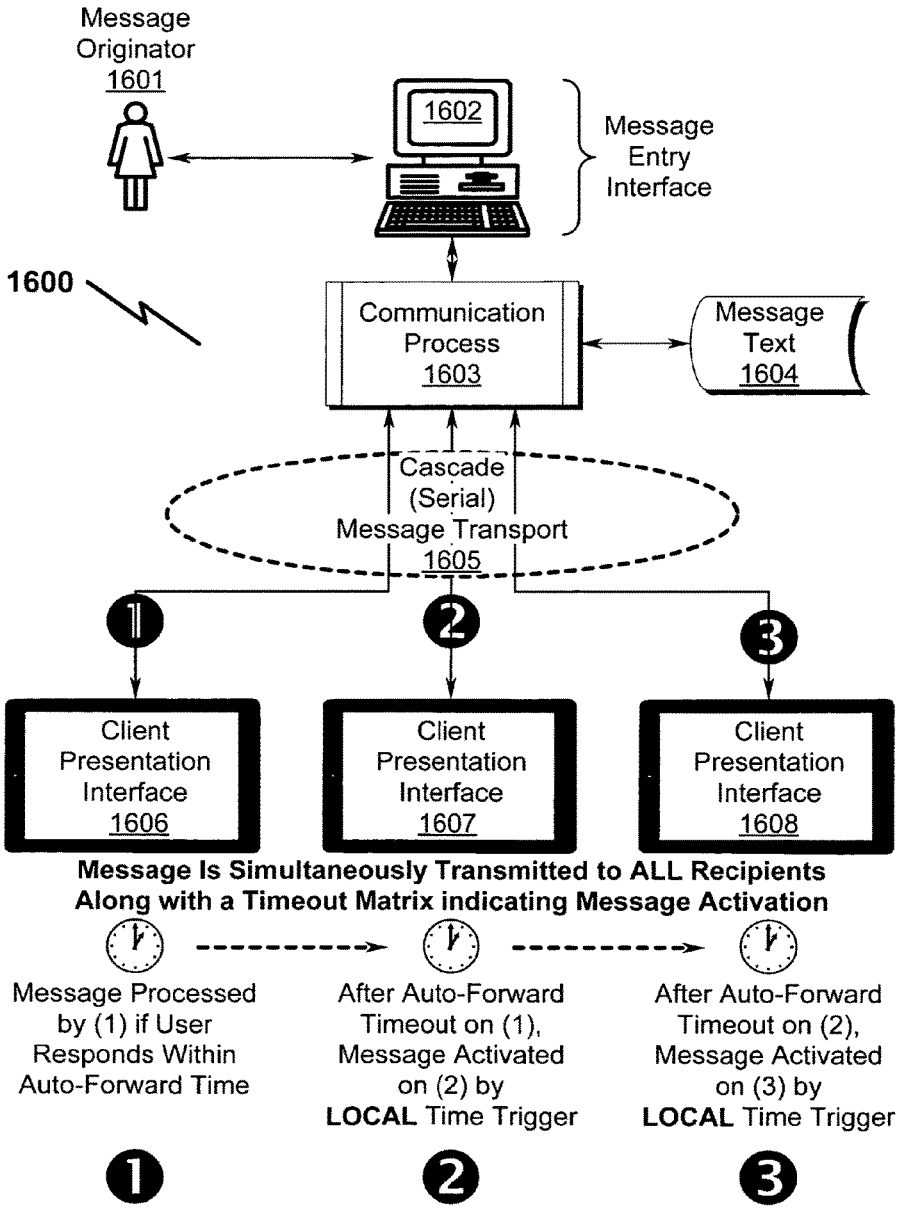
FIG. 16 illustrates an autonomous preferred exemplary embodiment of the present invention utilizing anticipatory message queuing (AMQ)

An improved alternative to the AMQ methodology of FIG. 15 (1500) is illustrated in FIG. 16 (1600), wherein the message is simultaneously transmitted to ALL target system interfaces (1606, 1607, 1608) along with timing information to determine when the previous system interface will have timed out. These two pieces of information permit the message to be flagged as "pending" on each target interface and then triggered as "active" locally if not stopped by the communications process (1603) or a communication from an upstream target system interface.

The advantage of this approach is that it anticipates a catastrophic failure of the communications process (1603) such that a broadcast to the entire network of possible target system interfaces will still proceed as usual should one of the target recipients be unavailable or if there is a failure of any target system interface hardware. In this fashion, the system integrates a level of "distributed failover" to allow major system components to fail while still providing robust message delivery capabilities.

Anticipator Message Queuing Advantages

This technique has the following advantages:

The message processing latency in the overall system is decreased, as the subsequent target system interface can perform all preprocessing on the message during the delay time associated with the timer from the previous target system interface. This can be useful in situations where decryption time on the message is significant.

During the time delay period associated with the current target system interface, the host message process can determine if the subsequent target system interface is even available. If it is not, then there is no time wasted in polling this target system interface for a user response, and the host message process can proceed to the next address in the hierarchical target message address list.

Users associated with the subsequent target system interface can be put on notice that they may be requested to act on a message shortly and that this message is currently pending based on a recipient farther up the message hierarchy list. In time critical applications, this forewarning of an impending message requiring immediate action could be critical in providing a timely response to the message contents.

One skilled in the art will recognize base on the above teaching that the present invention could utilize a multi-stage anticipatory queuing technique where multiple target system interfaces below the current hierarchy level are simultaneously notified of a pending message and put on alert that pending results further up the chain they will be required to act on the message in a timely manner. This would be very useful in situations where lower level subordinates within a management group would be expected to activate and deal with a time critical safety issue after an upper level manager has been informed of the situation and given the chance to comment on a proposed action plan.

Message Routing by Decision Matrix

Calendar-Based Routing

The present invention anticipates that the timeouts associated with message retransmission to alternate target system interface(s) may be based in part on specific calendar information, such as time-of-day, day-of-week, holiday and vacation schedules and the like. However, some preferred embodiments of the present invention significantly extend this capability to include dynamic decision routing as detailed below.

System Overview (1700)

Figure 17:
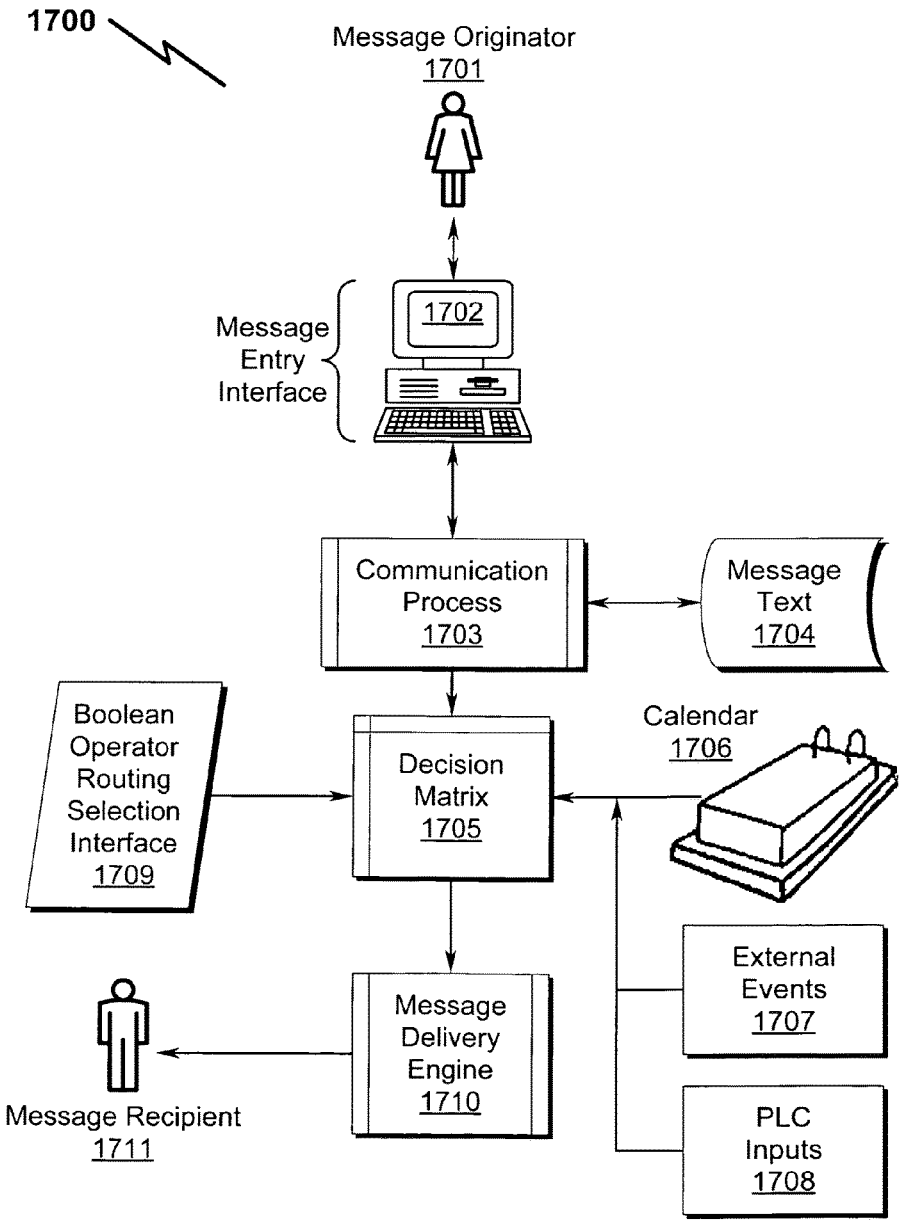
FIG. 17 illustrates an exemplary system embodiment illustrating the use of a decision matrix to determine message routing.

As mentioned previously, some preferred embodiments of the present invention anticipates the use of calendars and other timing information to provide dynamic message routing in some circumstances. One such system implementation of this concept is illustrated in FIG. 17 (1700), wherein the message originator (1701) interacts with the message entry interface (1702) and communications process (1703) as normal to generate a text message (1704), but message delivery routing is determined by a decision matrix (1705) that may have a variety of inputs, including but not limited to calendars (1706), external real-time events (1707), PLC inputs (1708), etc.

These decision inputs may be referenced by a user interface (1709) incorporating a Boolean operator routing selection syntax to select which routing targets are associated with a given condition relating all of the external inputs to the decision matrix (1705). The decision matrix (1705) will then determine the proper routing destination and type for a given message and state of external conditions in order to properly adjust message routing for the particular environment in which the message is being delivered. Once the message routing decision has been made, a message delivery engine (1710) associated with the communications process (1703) to actually deliver the message to the message recipient (s) (1711).

This dynamically adjustable event-driven message routing capability permits a wide range of adaptability to be incorporated into the messaging system that drastically increases the capability to adjust for daily, weekly, monthly, seasonal, and other cyclic events that are not capable of being accounted for with strict message delivery protocols.

Method Overview (1800)

Figure 18:
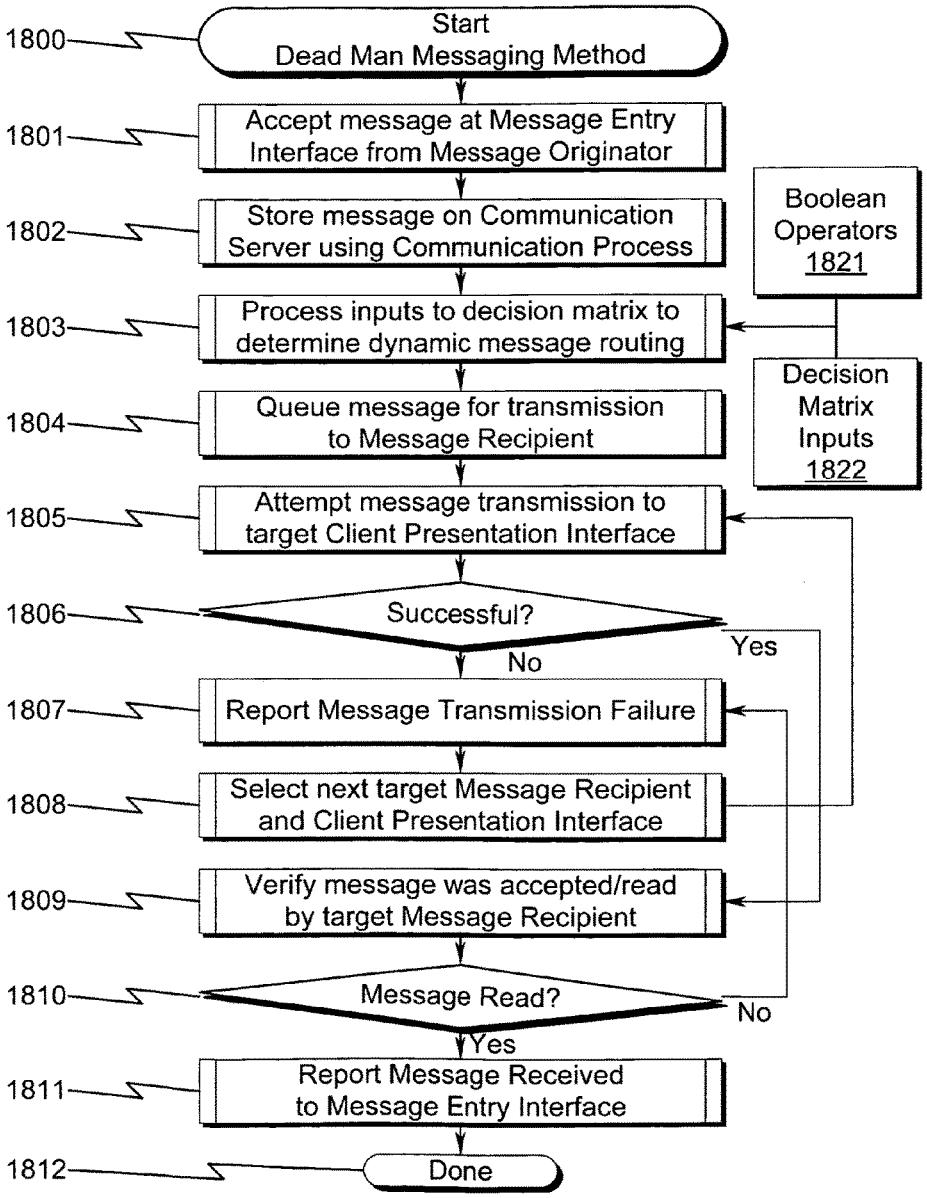
FIG. 18 illustrates an exemplary method embodiment illustrating the use of a decision matrix to determine message routing.

The method associated with the above detailed decision matrix routing system includes the following steps as generally illustrated in FIG. 18 (1800):

(1) entering a message from the messaging source interface (1801);

(2) selecting a message severity/urgency classification from the messaging source interface (1802);

(3) process inputs to the routing decision matrix (Boolean operator routing selection interface inputs (1821) applied to external decision matrix inputs (1822)) to determine the dynamic message routing (1803);

(4) transmitting the message severity/urgency classification to the message host and storing the message on the message database via the file server (1804);

(5) traversing a hierarchical target message thread to determine the targets for the message (1805);

(6) selecting the next message target within the hierarchical message thread (1806);

(7) determining if the hierarchical message thread is exhausted, and if so, proceeding to step (11) (1807);

(8) transmitting the message to the currently selected target system interface within the hierarchical message thread (1808);

(9) determining if the message has been read by the currently selected target system interface within the hierarchical message thread, and if so, proceeding to step (12) (1809);

(10) determining if a target response timer has expired, and if not, proceeding to the step (9) (1810);

(11) reporting to the source messaging interface that message reception has failed and proceeding to the step (4) (1811);

(12) reporting status of message delivery to previous steps in the hierarchical thread (1812);

(13) reporting to the source messaging interface that the message has been received and returning any optional user comment (1813); and

(14) optionally entering comments on the message and/or passing thru the message to the current or another hierarchical message thread (1814).

One skilled in the art will recognize that these method steps may be individually eliminated, augmented, modified, and/or rearranged without limiting the teachings of the present invention.

Exemplary Boolean Operator Routing Selection Syntax (1900)

A simple example of how the Boolean operator routing selection syntax may be implemented is generally illustrated in FIG. 19 (1900). This syntax matches that of the simple message routing diagram illustrated in FIG. 23 (2300), with the exception that various Boolean operators and conditions have been incorporated ([not SUNDAY], [not HOLIDAYS], [WEEKDAYS]) to indicate that calendar-specific limitations have been placed on the transmission of messages to the indicated individuals.

One skilled in the art will recognize that the Boolean syntax depicted in FIG. 19 (1900) can be easily implemented as a GUI to permit CAs to easily create highly complex decision trees associated with message delivery. As stated previously, the ability to obtain DYNAMIC inputs and make message delivery decisions based on these inputs is also a useful feature of this technique. For example, conditions such as [BOILER DOWN] or [AMBULANCE AVAILABLE] and the like provide some input into the nature of how dynamic this message transport decision matrix can become.

Message Encryption

While transmission of the messages between the message host (0512) process and the individual message clients (0522, 0532, 0542) may occur in a wide variety of ways, the present invention anticipates that many preferred exemplary embodiments may utilize encryption of the messages to ensure message security both within the context of the individual computer servers (0511, 0521, 0531, 0541), but also during transmission over the communications medium (0501).

Message Logging

The present invention anticipates that as part of the message transmission facility present in each of the source (0522) and target (0532, 0542) processes there will exist a logging function to record the user responses to message inquiries and also copy the message response up the message hierarchy delivery chain so that persons up the chain are fully notified of lower level subordinate responses to message inquiries. Many preferred exemplary embodiments of the present invention will incorporate message logging to (a) a message archive, (b) as a forwarding message to the next target system interfaces, and (c) to the preceding target system interface.

Exemplary Menu Item Message Level Classifications

While the present invention anticipates a wide variety of classifications may be associated with a given message, the following list may be suitable for many preferred exemplary embodiments of the present invention that incorporate a menu selection of message classification:

LIFE CRITICAL/MISSION CRITICAL

CRITICAL—Non-Immediate life threatening but with a significant life/monetary imperative.

URGENT—but with a Moderate life/Monetary imperative.

CORRECTIVE ACTION/AUDIT.

CONTINUOUS IMPROVEMENT/SUGGESTION.

INFORMATION TRANSFER such as Capital Improvement Project release, or Project status reports, etc.

ANONYMOUS REPORTING. This option provides the opportunity to report any information to a specified client representative without fear of reprisal. The system/method described herein will have knowledge of the reporting individual's identity, but this identity will only be breached under stringent requirements provided by the client.

One skilled in the art will recognize that these menus message severity/urgency classification levels are only exemplary and can be contracted or expanded within the scope of a particular implementation without loss of generality in the teachings of the present invention.

Exemplary Severity Level Classifications

While the present invention anticipates a wide variety of severity level classifications may be associated with a given message, the following list may be suitable for many preferred exemplary embodiments of the present invention:

SEVERE—Related to fire and/or personal injury.

SERIOUS—Related to critical communications.

MODERATE—Related to immediate communications.

MINOR—Related to informational communications.

ANONYMOUS—Related to anonymous communications with sender's identification blocked from all recipients. This option provides the opportunity to report any information to a specified client representative without fear of reprisal. The system/method described herein will have knowledge of the reporting individual's identity, but this identity will only be breached under stringent requirements provided by the client.

One skilled in the art will recognize that these classification levels are only exemplary and can be contracted or expanded within the scope of a particular implementation without loss of generality in the teachings of the present invention.

Exemplary Urgency Level Classifications

While the present invention anticipates a wide variety of urgency level classifications may be associated with a given message, the following list may be suitable for many preferred exemplary embodiments of the present invention:

IMMEDIATE—An event or action is occurring requiring immediate management attention.

URGENT—An event or action requiring urgent management attention.

NEED SOON—An event or action requiring management attention.

INFORMATIONAL ONLY—An event or action has occurred—informational only.

ANONYMOUS—Related to anonymous communications with sender's identification blocked from all recipients.

One skilled in the art will recognize that these classification levels are only exemplary and can be contracted or expanded within the scope of a particular implementation without loss of generality in the teachings of the present invention.

Exemplary Anonymous Message Processing

The present invention anticipates that a message may be submitted anonymously. In these circumstances the identity of the sender must be hidden from the recipients, but in some critical situations this anonymity must be breached. Thus, anonymous messages are handled in the following manner:

The sender's identification blocked from all recipients unless a most senior level manager with specific authority uses a "single use management key" that will unlock the sender's identity.

This key will reside with the message hosting system and must be requested in writing, from a known source, sent to a known address.

There will be a substantial fee associated with each key, both for its creation and storage, to deter use of these keys in other than critical situations.

One skilled in the art will recognize that this use of anonymous reporting can be contracted or expanded within the scope of a particular implementation without loss of generality in the teachings of the present invention.

Preferred Exemplary Embodiment Characteristics

Many preferred exemplary embodiments of the present invention will exhibit the following characteristics and features:

At the expiration of a target user response timer the system will auto-forward the message.

The messaging source client process will only permit predefined specific users fields to be manipulated, and only to a pre-set point. Once a message has left a target system interface, only those portions which may be open to the next stop recipients' may be manipulated.

In general, the message may not be (a) printed, copied, screen shot, or stored in any other form for reprinting; (b) re-directed, or caused to have its routing changed once the message is sent, by the originator; (c) de-encrypted buy anyone other than the recipients', unless a master executive key is used, and an auto record of that action placed in the logging archive.

A strong (Internal File) encryption system is generally used for message storage and transmission.

The encryption/un-encryption should optimally be both single file and batch file capable.

All message system correspondence generated "may" be sent to clients external to the messaging system, and therefore in this specific event, the correspondence cannot be encrypted.

Each message once transmitted will be archived (including bi-directional transmittals), providing a message paper trail.

Message archives should index messages by title/header and content making retrieval possible.

Configuration of software on a computer system should ONLY be completed by a designated person who has the proper software encoded credentials. It should allow on-site as well as remote program configuration.

The end user will generally need sufficient training in the use of the software.

Delivery of system software components should be provided in a standalone format over the Internet or within Client's internal networks or within conventional smartphone/mobile device telephone networks.

One skilled in the art will recognize that this list is not exhaustive of the features of many preferred embodiments of the present invention.

System Administration by Certified Administrator (CA)

System Administration by Certified User (2000)

Figure 20:
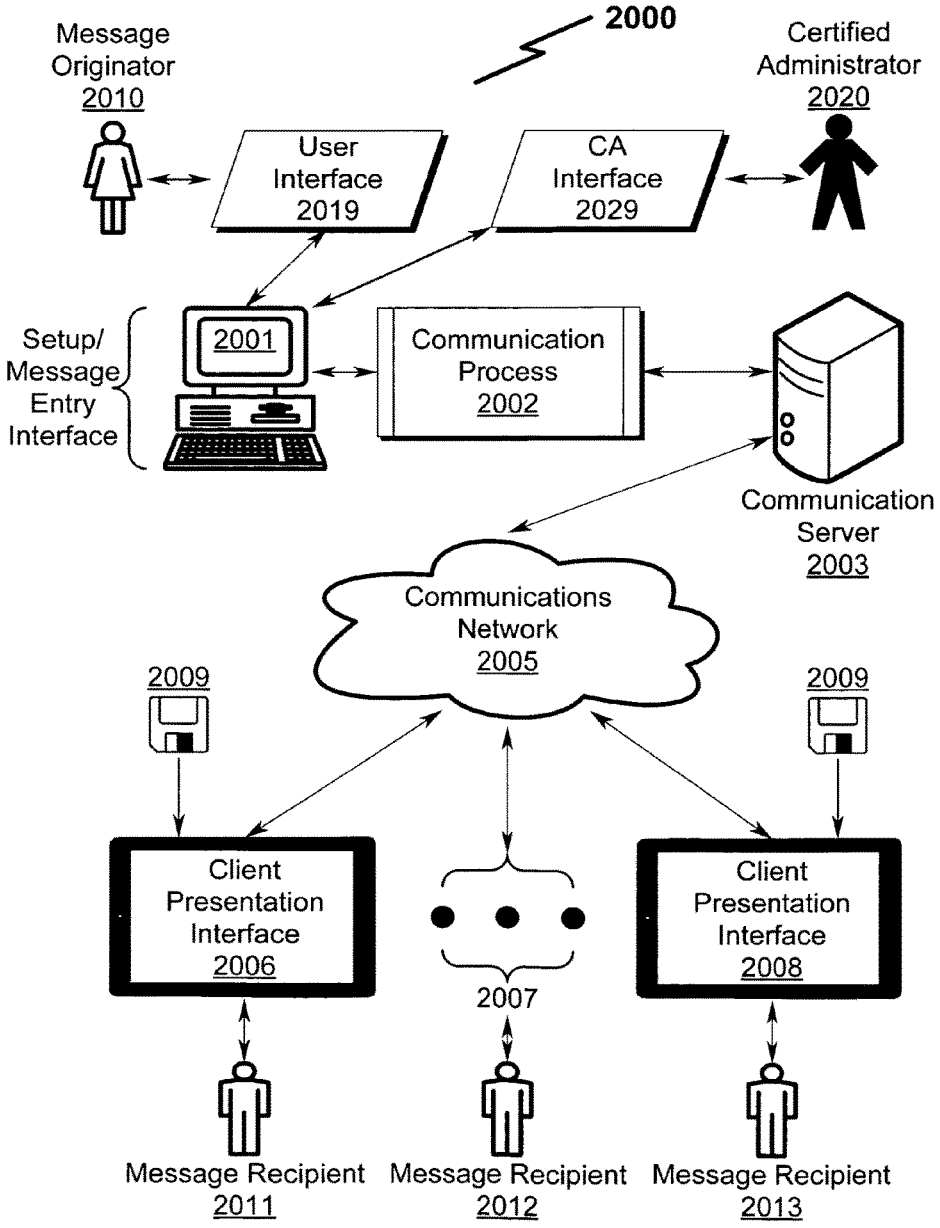
FIG. 20 illustrates a preferred system embodiment employing a CA/user management architecture.

Optimal embodiments of the present invention anticipate that the messaging system will be managed by a Certified Administrator (CA) or messaging system "super user" that is responsible for setting messaging policies and enforcing standards within the overall messaging system framework. A typical system architecture employing this framework is generally illustrated in FIG. 20 (2000), wherein both the message originator (2010) and Certified Administrator (2020) each have their corresponding user interfaces (2019, 2029) into one or more setup/message entry interfaces (2001) that are under control of the overall communications process (2002) as discussed herein.

Key to this implementation is that the Certified Administrator (CA) can manage user messaging accounts and set internal messaging policies to control the overall behavior of the message delivery system, as well as authorize levels of message delivery by a given user, etc. The CA (2020) also has the responsibility of accepting and implementing Message Definition Forms that describe various types of canned messages, their delivery protocols, and actions to be taken in the event of various disasters or other property/life threatening events.

Message Generation/Security Architecture Overview (2100)

The disclosed messaging system/method incorporates a high degree of both reliability and security, and part of this architecture requires in many preferred embodiments the use of a "Certified Administrator (CA)" to implement details of the system functionality and regulate access to the internals of the messaging system/method. The control structure implementing this architecture is generally illustrated in FIG. 21 (2100).

Figure 21:
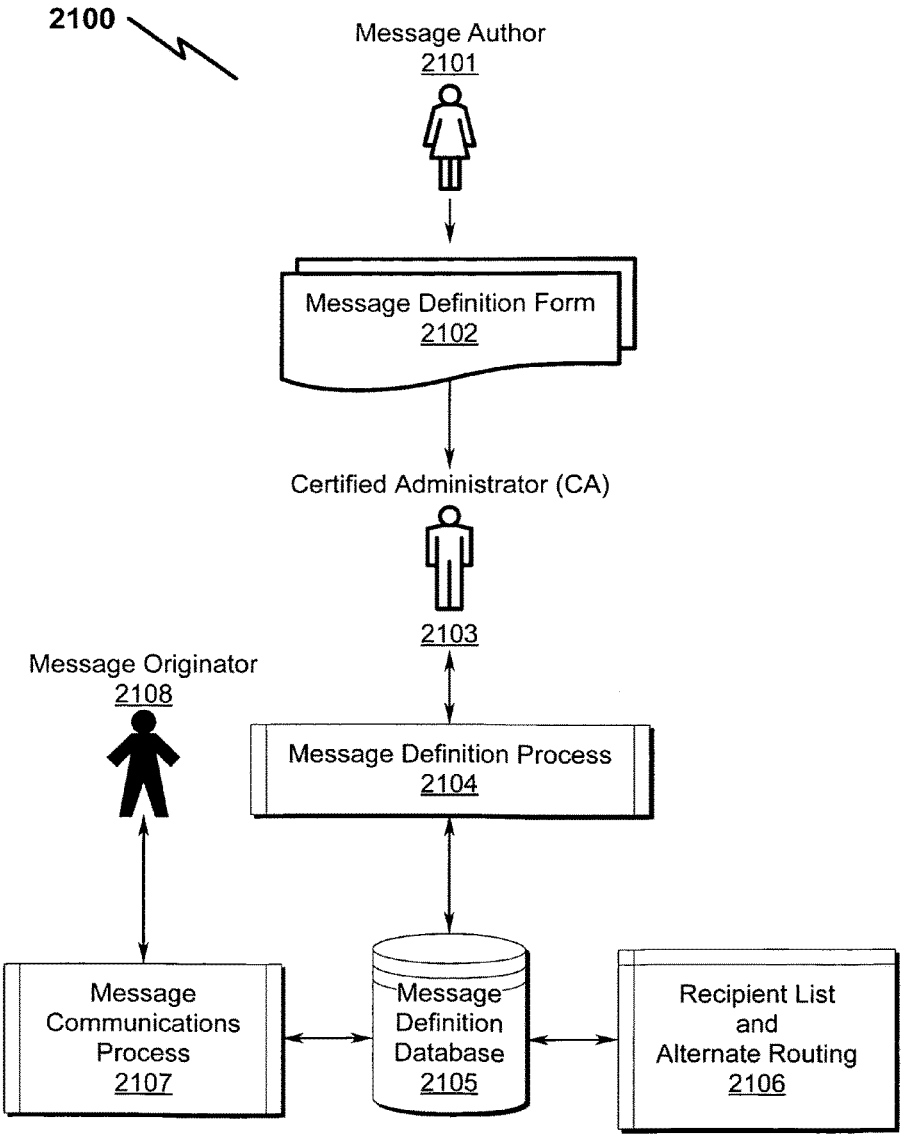
FIG. 21 illustrates a preferred exemplary message definition architecture used in some preferred embodiments of the present invention.

Referencing FIG. 21 (2100), the messaging system is driven by message authors (2101) that generate requests for messages on a message definition form (2102) (which may be in the form of a paper form or an electronic equivalent). These message definition forms (2102) describe in detail the type of message to be transmitted, under what circumstances the message is to be transmitted, and the block of simultaneous recipients (parallel simultaneous transmission) and/or singularly sequential recipients (serial step-by-step transmission). Note that this message distribution methodology may incorporate a combination of serial and/or parallel branch transmissions in this distribution methodology.

Once the message definition form (2102) has been completed, it is reviewed by a CA (2103) who then enters this message information into a message definition process (2104) to define a message definition database (2105) describing the exact message characteristics and the message distribution tree methodology. This message definition database (2105) will incorporate both a recipient list and alternate routing information (2106) to ensure that the message is properly acted on by an appropriate individual in the chain of command.

Once the message definition database (2105) has been properly modified by the message definition process (2104) under control of the CA (2103), this information can be used by the message communications process (2107) interacting with a message originator (2108) to ensure proper delivery of the message to appropriate message recipients in the chain of command.

By formalizing the structure of the message definition database (2105) with the use of message definition forms (2102) that are reviewed and authorized by the CA (2103), both security and integrity of the messaging system are maintained.

Message Definition Form Example (2200, 2300)

An example of a Message Definition Form and associated cascade/parallel stop information dialogs is generally illustrated in FIG. 22 (2200). Here the new message definition form (2201) indicates a typical interaction with the message author in defining the message characteristics and architecture of message delivery. Associated with this message delivery architecture will be a variety of cascade (2211, 2212) and/or parallel (2221, 2222) message stop definition dialogs that will define the specific techniques used to distribute the message among the various selected message recipients.

Figure 23:
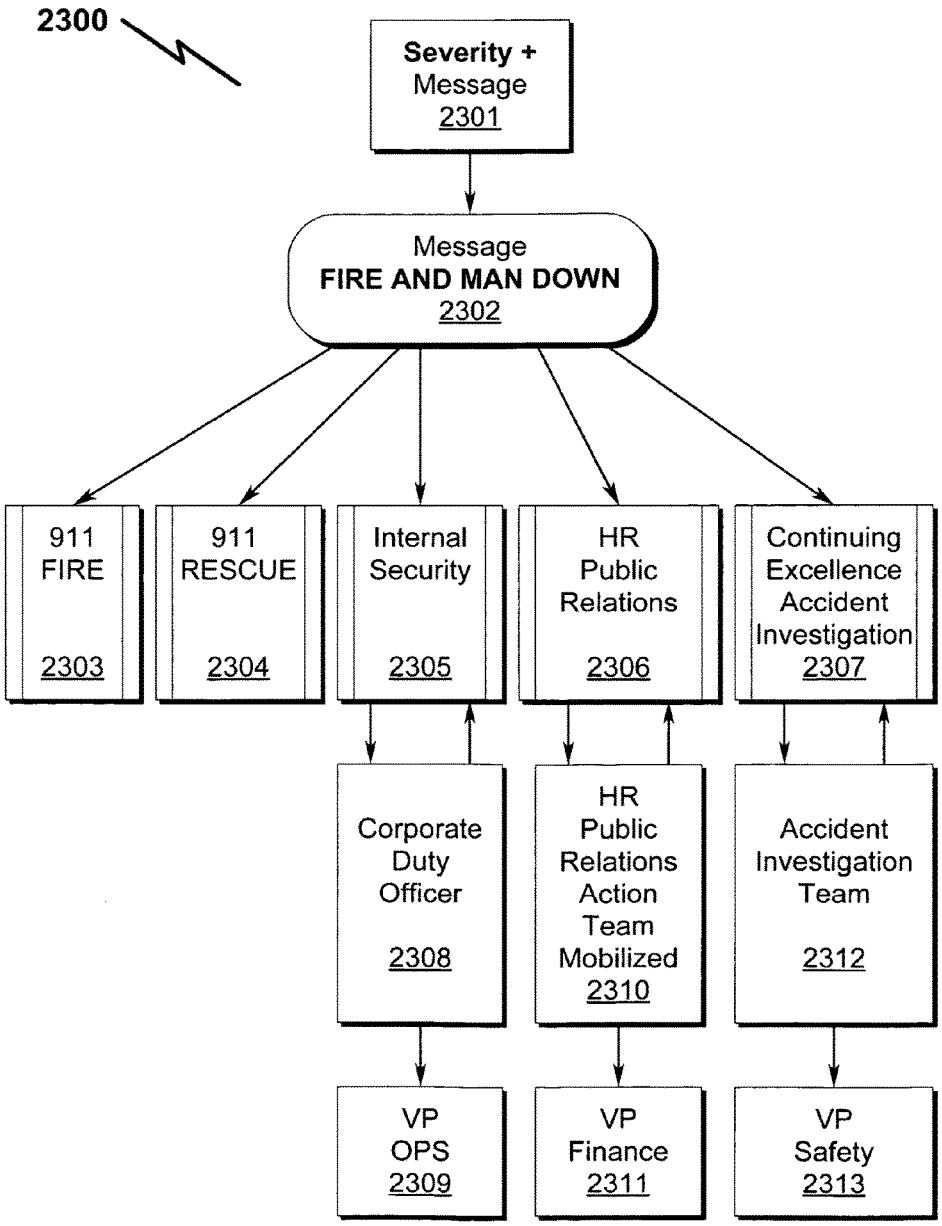
FIG. 23 illustrates an exemplary message delivery hierarchy map used in generating a message definition form.

A typical example of a message delivery architecture is illustrated in FIG. 23 (2300), wherein a Severity+message (2301) is generated to indicate a FIRE AND MAN DOWN (2302). This message is broadcast (in parallel transmission mode) to 911 FIRE (2303), 911 RESCUE (2304), INTERNAL SECURITY (2305), HR PUBLIC RELATIONS (2306), and CONTINUING EXCELLENCE ACCIDENT INVESTIGATION (2307). Within these groups, serial cascade message transmission is directed towards individual chains of recipients within the various organizations (CORPORATE DUTY OFFICER (2308), VP OPS (2309); HR PUBLIC RELATIONS ACTION TEAM (2310), VP FINANCE (2311); ACCIDENT INVESTIGATION TEAM (2312), VP SAFETY (2313)). In this manner the message is properly broadcast to both the BREADTH and DEPTH necessary to address the critical situation, without necessarily waiting on any particular message recipient to act independently of the remaining message recipients.

While the message delivery architecture of FIG. 23 (2300) is typical of what can be achieved with the present invention, it is not limitive, as any combination of parallel/cascade and cascade/parallel message transmission architectures are possible using the message delivery definitions defined by the message definition form.

Certified Administrator (CA) Login Interface (4100)

Figure 41:
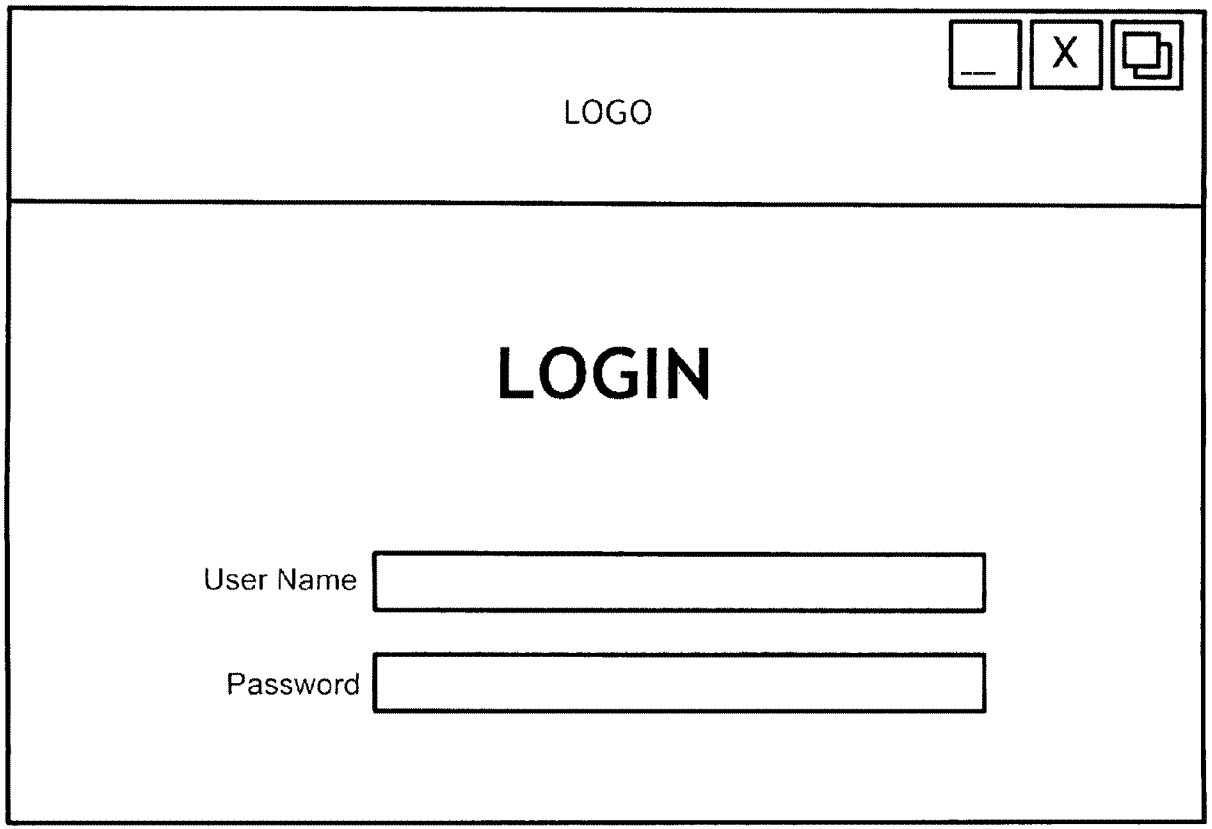
FIG. 41 illustrates an exemplary login screen useful in some preferred embodiments of the present invention.

As generally illustrated in FIG. 41 (4100), the CA follows the same logon procedure as a general messaging user.

Certified Administrator Client Secured Login (4200)

Figure 42:
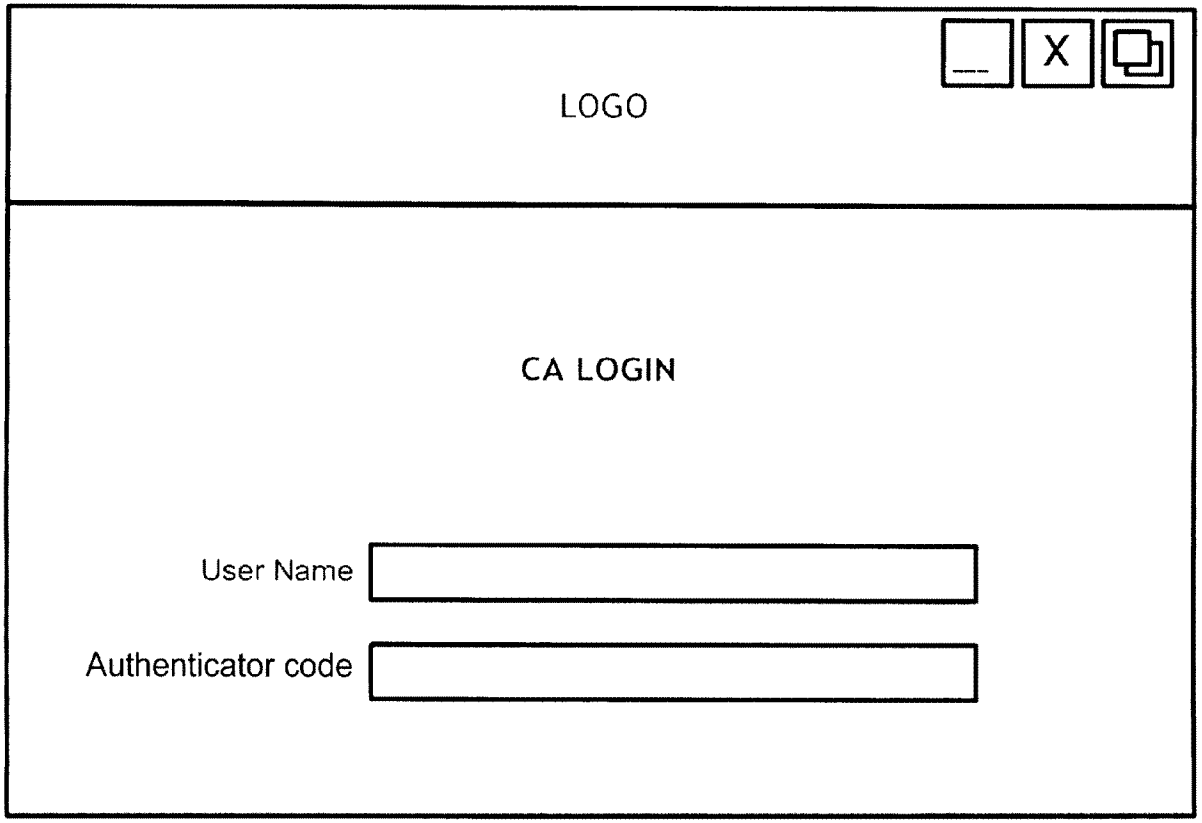
FIG. 42 illustrates an exemplary CA authentication screen useful in some preferred embodiments of the present invention.

When authentication is validated and any appropriate licenses are validated the software will present the certified administrator login screen as generally illustrated in FIG. 42 (4200). In the space provided Certified Administrator (CA) enters password and authentication code. The following steps are then performed:

- The messaging system software issues a "watch for warning code" to determine if any abnormal system conditions are associated with the login procedure.
- If no warning code is found and authentication is valid software is authorized to present certified administrator (CA) dashboard.
- If no warning code is found and authentication is invalid software is to present login screen.
- CA will have two additional retries to login for a total of three tries at which time the system will lock out any further attempts to login and notify the CA that they need to contact their CA to correct the problem.
- If warning code entered notify per message definition form and continue to allow unrestricted number of retries.

The CA takes action based on message definition form furnished, to create system messages for later use by message originators.

Certified Administrator Post Login Steady State (4300)

Figure 43:
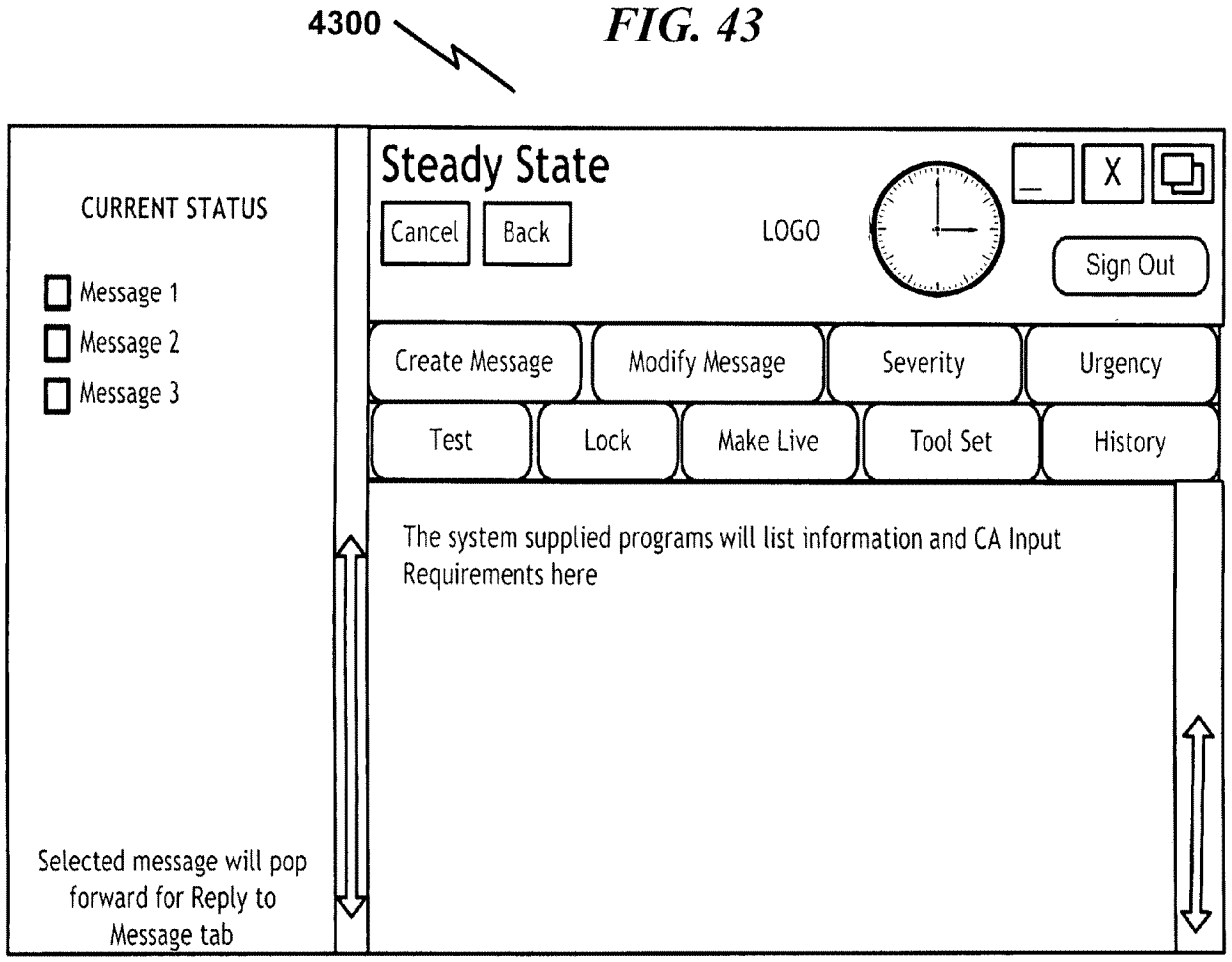
FIG. 43 illustrates an exemplary CA steady state screen useful in some preferred embodiments of the present invention.

When authentication is validated for the CA, a system dialog menu as generally illustrated in FIG. 43 (4300) is presented to the CA, from which he/she can select appropriate functions to define and test messages and delivery threads.

Create System Message (4300)

The present system/method anticipate a variety of options for the CA to create system messages, including special considerations where the message creation is interrupted while creating a system message. In these circumstances options are available as a drop down from the Create System Message, Create User Message Tabs, and Modify Message Tab. These options include:

- Back—unwind one menu level;
- Cancel—cancel the operation;
- Save—Retain a copy of the message definition form in system;
- Edit—Open a copy of a saved message for editing.

The general outline for message creation by the CA is as follows:

- From dashboard the CA selects the 'Create Message' tab and from the drop down selects 'Make Live' and selects 'Do not make live'. Select the Do Not Make Live Button.
- From the dashboard select the Tool Set Tab. From the drop down select 'Show Message ID'. CA enters Severity Number and Urgency number into "Review Message ID for the Severity_____ and Urgency_____. Doing this verifies that the message severity number and urgency number is or is not currently in use. The CA then reads the "Review Message ID Report", on the dashboard.
- From the dashboard the CA selects Create System Message—Do not make live, and place a check mark in the box for YES for message severity and urgency to be locked.
- From the dashboard the CA selects the Lock Tab and from the drop down pick LOCK tag severity, and enters severity number. Tag Severity_____LOCK, and then click "LOCK" to lock it.
- From the dashboard the CA selects the Lock Tab and from the drop down picks LOCK tag urgency, and enter urgency number. Tag Urgency_____LOCK, and then click "LOCK" to lock it.

The CA next selects Create Message Tab then Create System Message Tab.

The system now presents the 'Create Message Stop' drop down to either create a Cascade (serial) or Parallel (broadcast) Message blocks. The decision on which block to create in what order is given by the Message Definition Form.

If parallel messaging is desired, from the drop down box select parallel message. For each parallel message enter primary recipients and alternate recipients for that message stop from the message definition form provided. Use the "another" key to add additional parallel recipients for that message stop. When this message stop is completed, proceed using information provided on the message definition form the next message stop. If all stops are completed proceed to test.

If cascade serial messaging is desired, the CA selects the box indicating cascade message. Enter time to auto forward for that message stop. Enter primary recipients and alternate recipients for that message stop from the message definition form provided. Use the "another" key to add additional cascade recipients for that message stop. When this message stop is complete move to next message stop using information provided on the message definition form for the next message stop. If all completed proceed to test.

If the Create System Message is a combination of both parallel and cascade create the message stop-by-stop from the message definition form using the parallel then the cascade instructions above.

When all data entry is complete and verified, the CA selects 'Proceed to Test'.

The CA will then be presented with the Test Tab options and will select either: Select Method 1 which runs internal test only; or Select Method 2 which alerts recipients that a test message will be sent.

The CA runs the selected test.

The CA reviews Test Results displayed and verifies that the test message completed or failed. If test message failed, the CA determines the failure and make corrections. Notate changes and comments on the message definition form. Rerun test. If the test passed notate on message definition form the date created and time. File a copy of this new system message created in the file in the CA Office and send a copy of the completed new system message form back to the message author.

From dashboard the CA selects the 'Create Message' tab and from the drop down select 'Make Live' and then selects 'Make Live'. The CA then selects the Make Live Button.

From the dashboard the CA selects Create System Message, Make Live, and places a check mark in the box for yes for message severity and urgency to be Unlocked.

From the dashboard the CA selects the Unlock Tab and from the drop down pick Unlock tag severity, and enters severity number. Tag Severity_____Unlock, and then clicks "Unlock" to unlock it.

From the dashboard the CA selects the Lock Tab and from the drop down pick Unlock tag urgency, and enter urgency number. Tag Urgency_____Unlock, and then clicks "Unlock" to unlock it.

The CA opens each Severity and Urgency Tab; verifies that the new Severity and Urgency Numbers are present in the Menus and not grayed out.

If either of the above conditions are not present, or are incorrect—then correct until they are.

Create User Message (4400)

Figure 44:
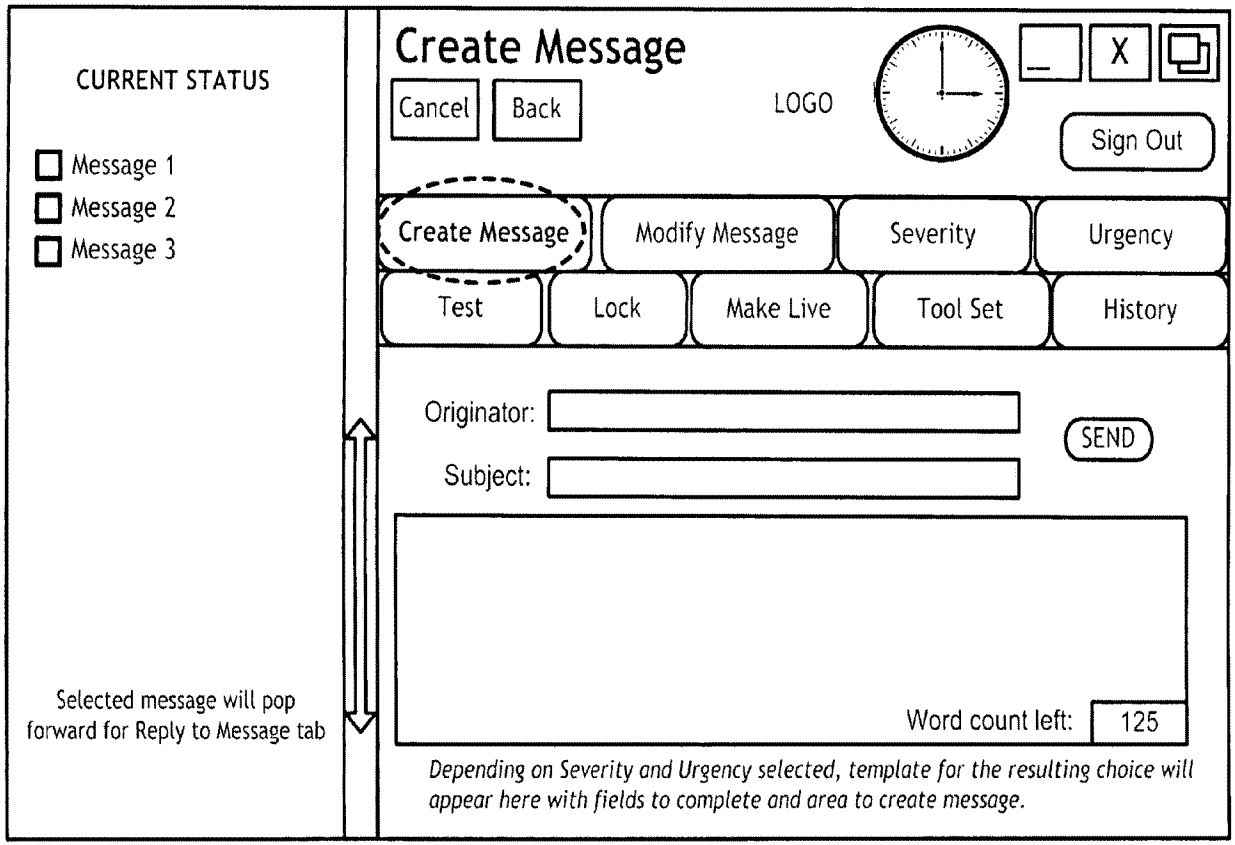
FIG. 44 illustrates an exemplary CA Create Message screen useful in some preferred embodiments of the present invention.

As generally illustrated in FIG. 44 (4400), the CA may also create user messages. The general flow for this procedure is as follows:

The Dashboard displays the Current Status of existing messages in the left-hand window and allows for the creation of or a reply to a message (providing that the auto-forward timer has not expired).

Figure 45:
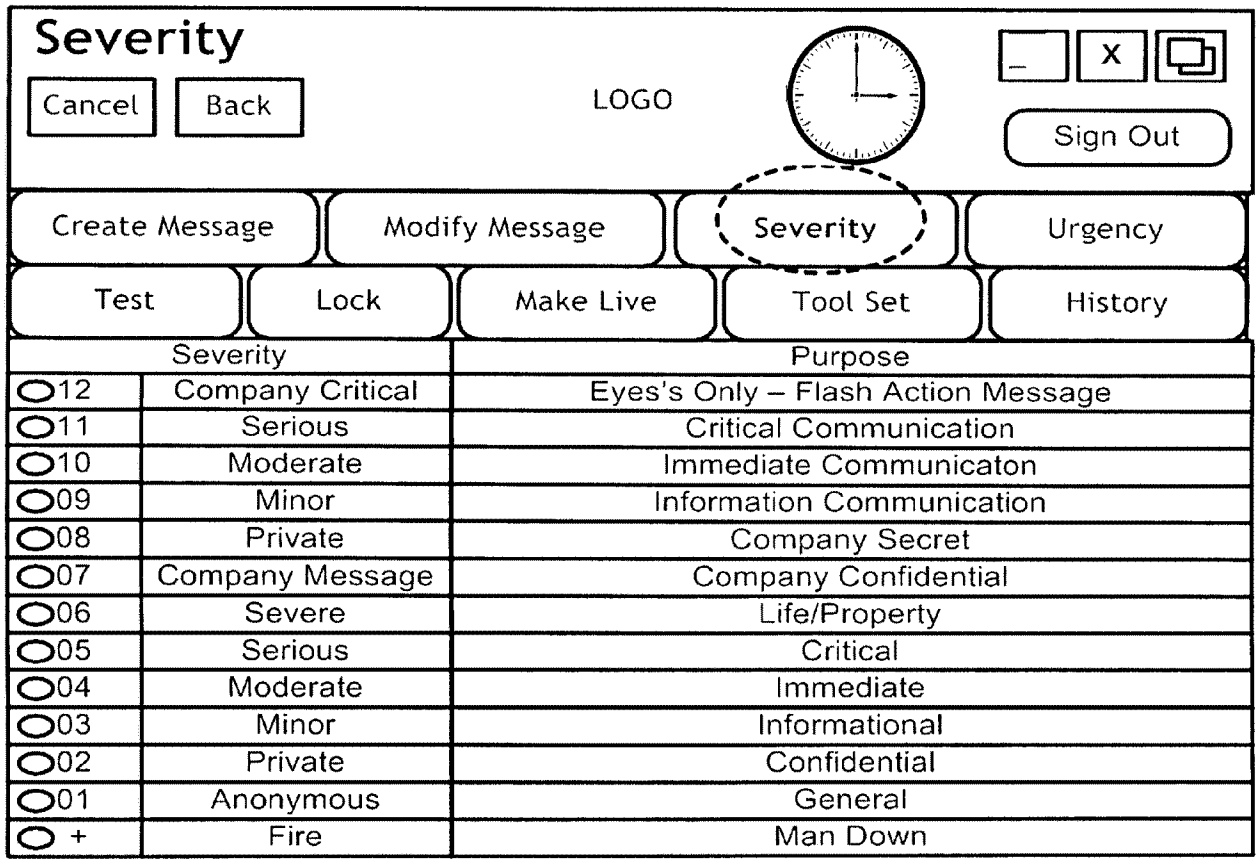
FIG. 45 illustrates an exemplary CA Severity screen useful in some preferred embodiments of the present invention.

To create the message, the CA selects the Create Message tab then from the drop down select Create User Message from the Dashboard, which will the present the CA with the following system driven menus:

Severity (FIG. 45 (4500))—The CA will be presented with the Severity Menu where the appropriate Severity for the message is selected. Note: The back button can be used to return to the previous menu. The cancel button can be used to cancel the message.

Figure 46:
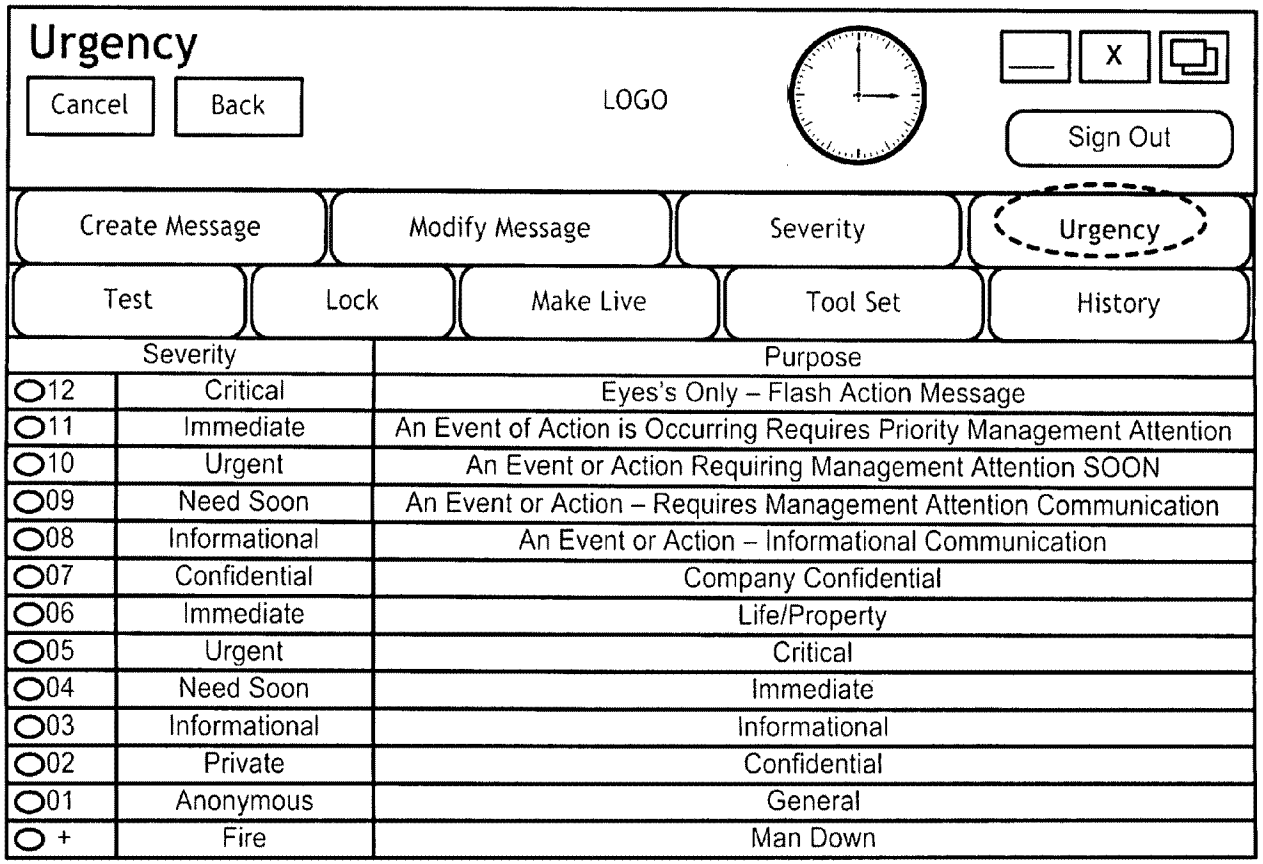
FIG. 46 illustrates an exemplary CA Urgency screen useful in some preferred embodiments of the present invention.
Figure 47:
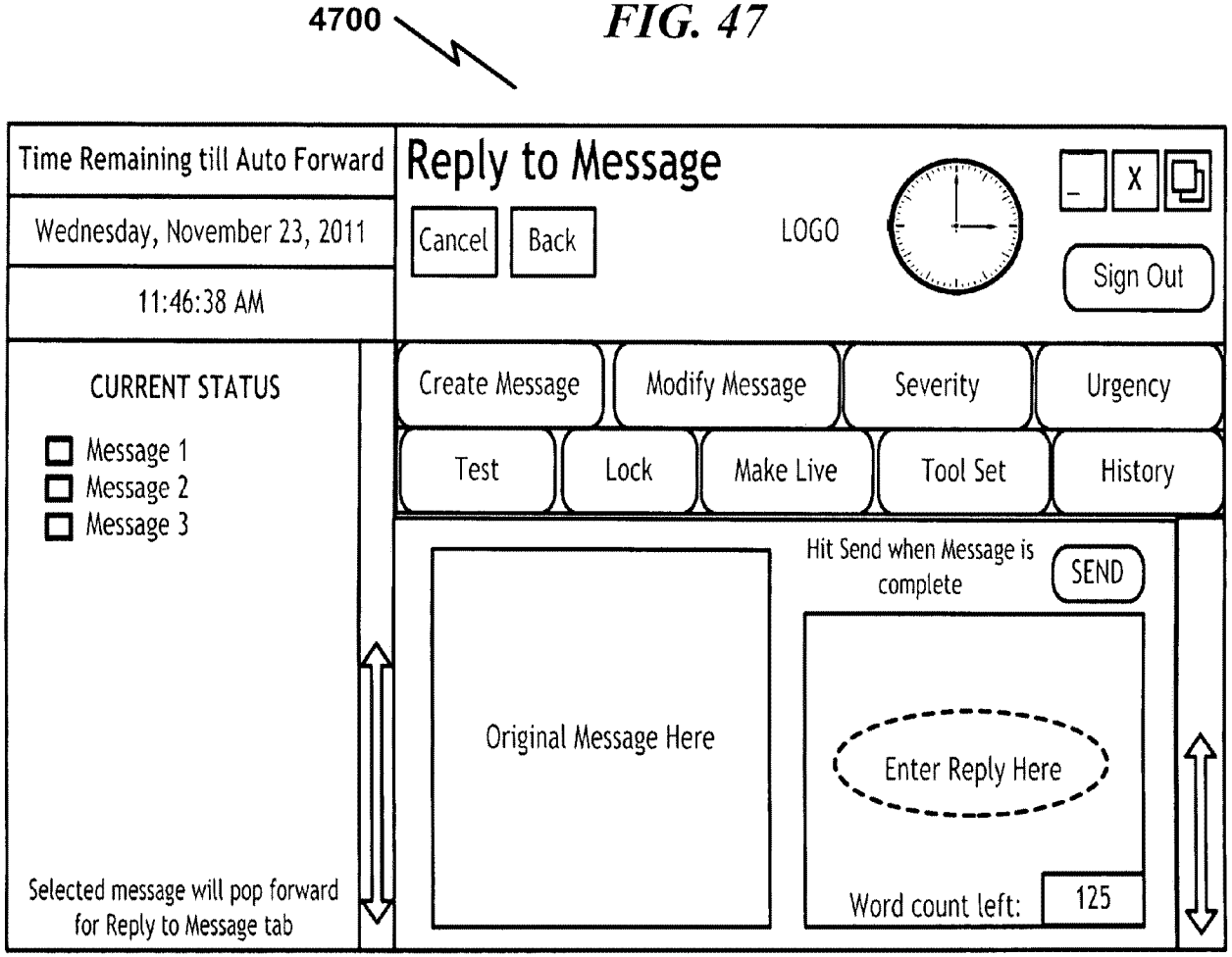
FIG. 47 illustrates an exemplary CA Reply To Message screen useful in some preferred embodiments of the present invention.

Urgency (FIG. 46 (4600))—The CA will be presented with the Urgency Menu where the appropriate Urgency for the message is selected.

Once the Severity and Urgency are selected the CA will then enter the text to Create User Message.

The system will now present the CA with the system driven menus, reference to the system menus described above. Within this context, the Originator enters their name, and enters the message in the available box.

Once the message is complete, and has been reviewed, the CA selects SEND. Note: in many preferred embodiments all messages are limited to a maximum of 125 words for Originator and each subsequent reply area.

The originator's encrypted message will be sent to designated recipients and the message will appear in the Current Status window to the left of the dashboard in its Severity steady state color.

A copy of the message will be sent in parallel to the message archive and to the designated recipient(s).

When multiple messages exist in the current status section, by hovering the mouse over the message, a 'snapshot' of the message in notation form showing the originator and message title will appear. (Additional information is possible to be displayed and is configurable by the client.)

CA New Message Arrival and Reply (4700)

As generally illustrated in FIG. Z7 (4700), the CA may accept and respond to messages. Here the CA must be logged into the system to receive and reply to messages. Upon receipt of a new message the entire dashboard will flash in the alternating color of the severity of the message color and a background color as well as make an alert sound upon arrival.

The dashboard may continue to flash in the alternating color of the message severity color and background color and continue to play the alert tones until the message receipt has been acknowledged by clicking on the dashboard.

After clicking the dashboard the new incoming message will appear in the Current Status column at the top position and will flash in the alternating color of the severity color and background color of the message at a nominal rate of two times per second, and will continue to do so until the auto forward timer has reached zero. If the CA takes no action the message will be auto forwarded to the next message stop recipient and the message will now stop flashing and be in the steady-state color of the Severity for that message. The CA will no longer have the ability to reply to message.

If the CA wishes to examine any message located under the current status section they only need to hover the mouse over the message and an abbreviated amount of information will be displayed including the time remaining till auto forward.

From the CA dashboard select the Modify Message Tab and from the drop down select Reply to Message tab and then click the message you wish to reply to in the Current Status section of the dashboard.

Certified Administrator Reply to Message

The CA may read the Originator Message and any and all replies prior to a given message stop in the area 'Originator Message Here' then write a reply in the "Enter Reply Here' section. When finished and satisfied with the response the send button is selected by the CA.

Confirmation that the message was sent occurs when the message appears in the current status section and is its steady state color of the Severity of that message.

CA Message History (4800)

Figure 48:
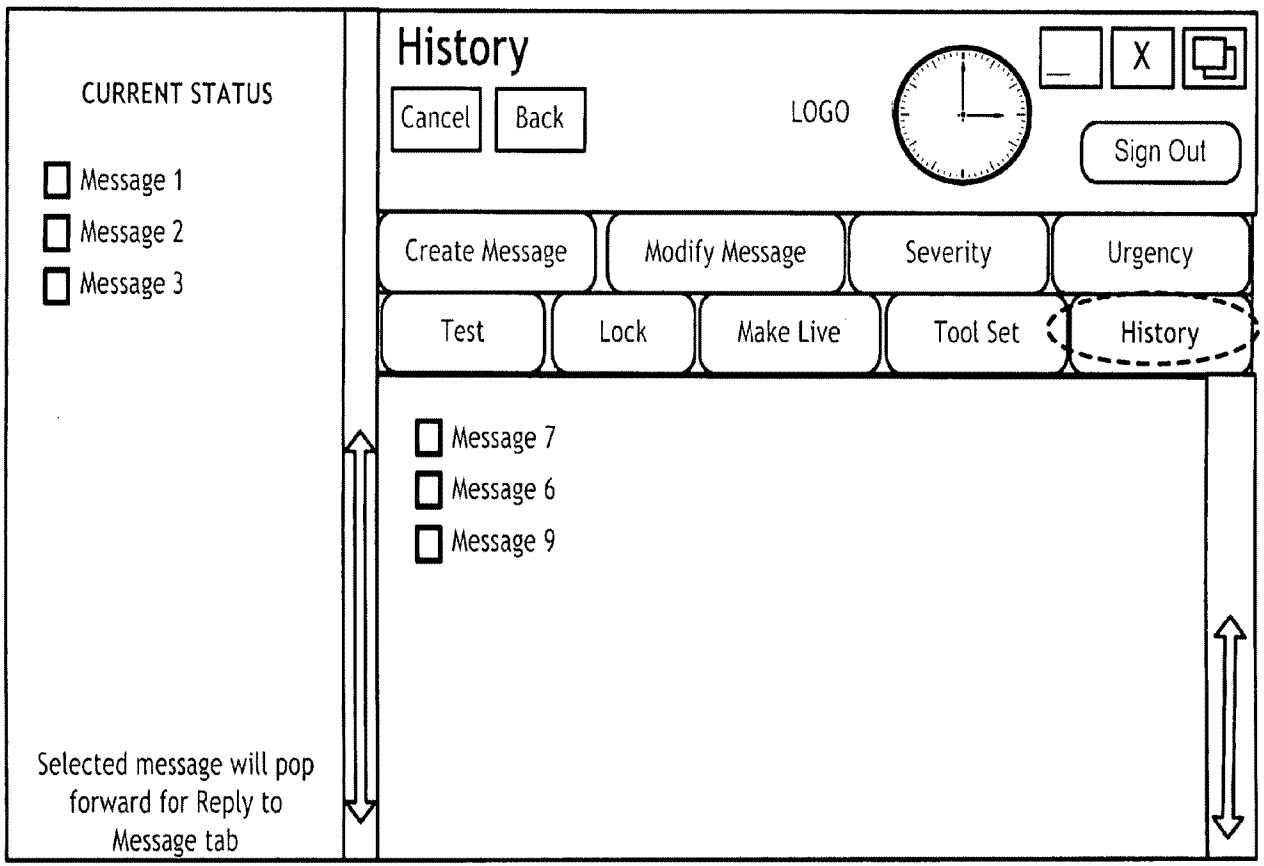
FIG. 48 illustrates an exemplary CA History screen useful in some preferred embodiments of the present invention.

As generally illustrated in FIG. 48 (4800), the CA may obtain historical information on messages by selecting the appropriate dialog box entry on the dashboard.

CA Reading a Message Update

When a message reply is received the message will appear in the Current Status column and will flash at a rate of one time per second in the alternating color of the severity and background color for the severity for that message. This is a visual indication that a message reply has been received and is ready for viewing by the user. The message will continue to flash until the user selects the message or until that message has reached its final stop.

If the CA wishes to examine any message located under the current status section he only needs to hover the mouse over the message and an abbreviated amount of information will be displayed including the time remaining till auto forward.

After the message has reached its final destination/is complete, it will become viewable under the History Tab for a nominal time of five business days. It will then be removed and optimally archived on a message archival storage system.

Certified Administrator Read Message

The CA can select messages in the Current Status window by clicking on the check box to the left of the message subject. The dashboard will change to that of FIG. 48 (4800). The area marked 'Original Message Here' will display the entire message including the originator and each message stop(s) that entered a reply and was forwarded to the next message stop.

From the CA dashboard under the Current Status Section and click the message you wish to read. When the CA is finished reading the selected message they can close the message dialog box that displays the selected message, by selecting the 'Finished Reading' Button. The dashboard will now revert back to the steady-state and the message will return to the steady-state color for that message severity and remain in the Current Status section of the dashboard.

When multiple messages exist in the current status section, by hovering the mouse over the message, a 'snapshot' of the message in notation form showing the originator and message title will appear. Additional information is possible to be displayed and is configurable by the CA client.

CA Administration of User Information (4900, 5000, 5100, 5200)

Figure 49:
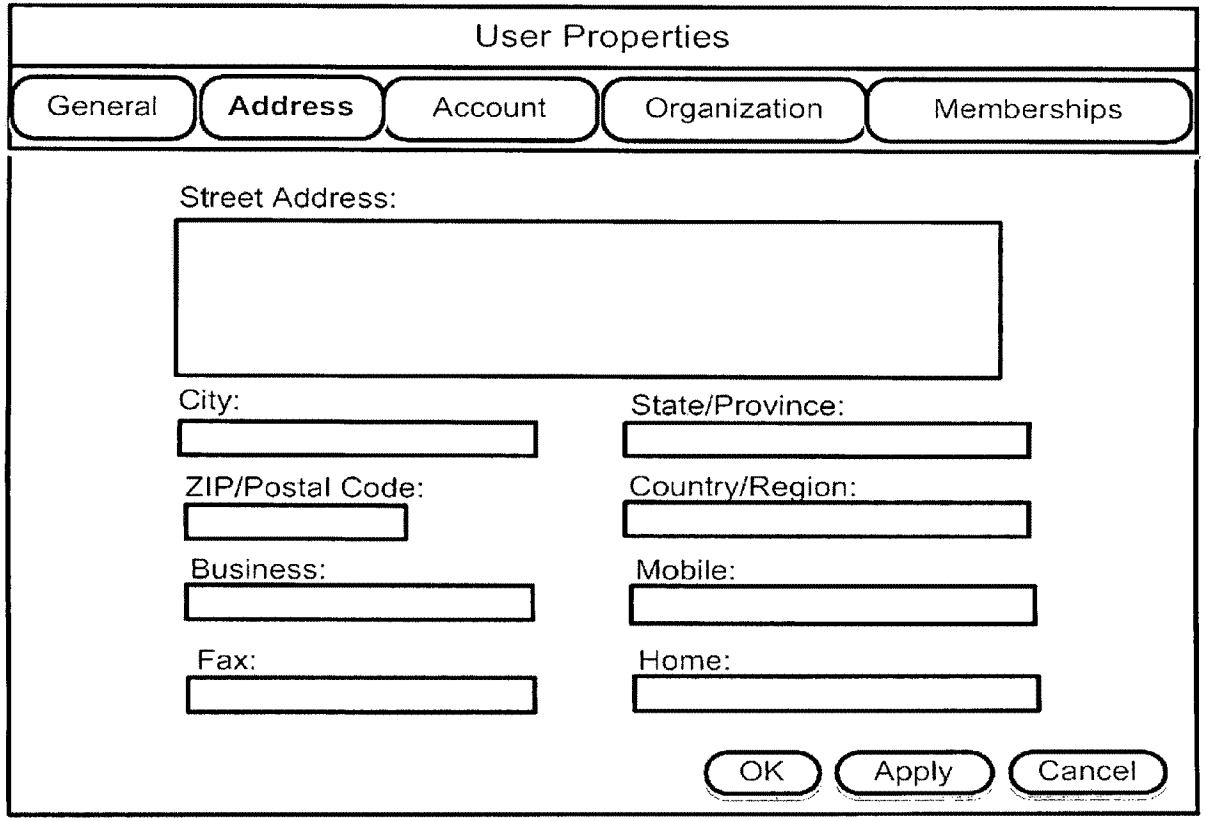
FIG. 49 illustrates an exemplary user definition dialog used in some preferred embodiments of the present invention.
Figure 50:
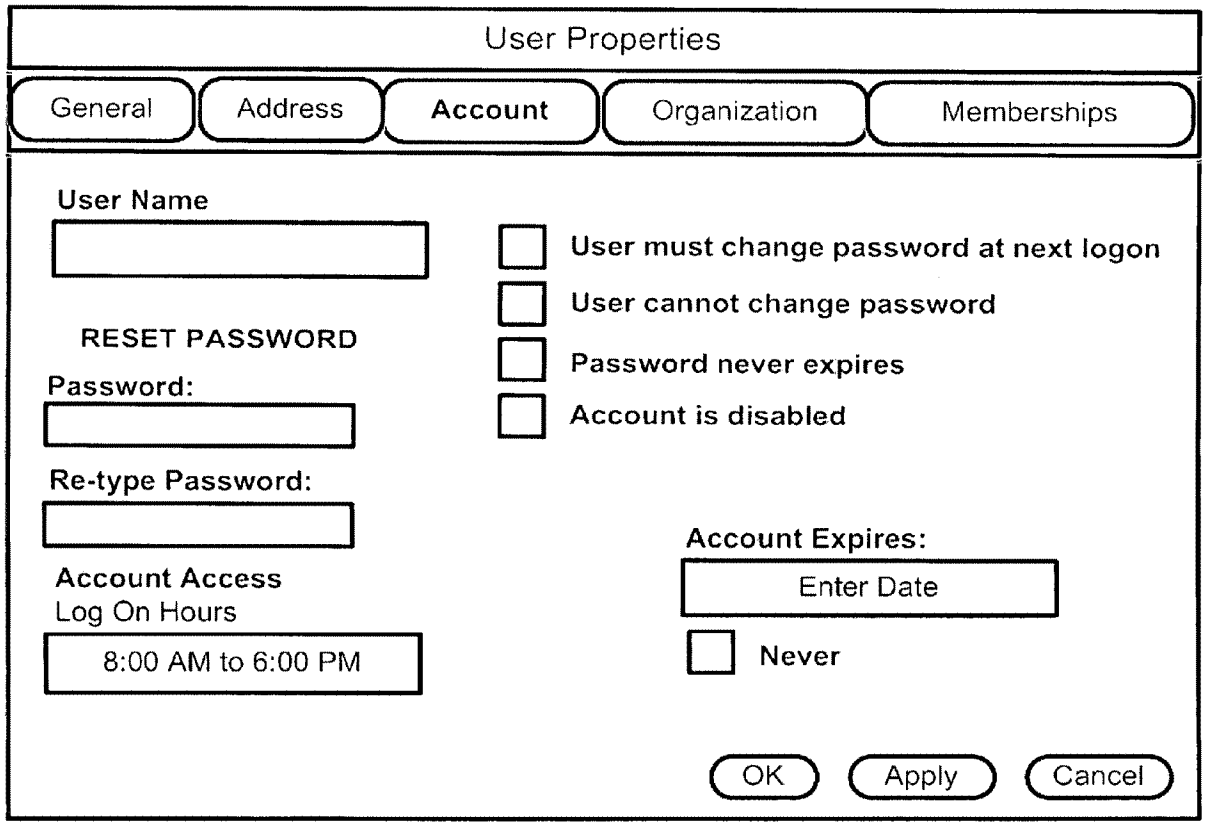
FIG. 50 illustrates an exemplary user definition dialog used in some preferred embodiments of the present invention.
Figure 51:
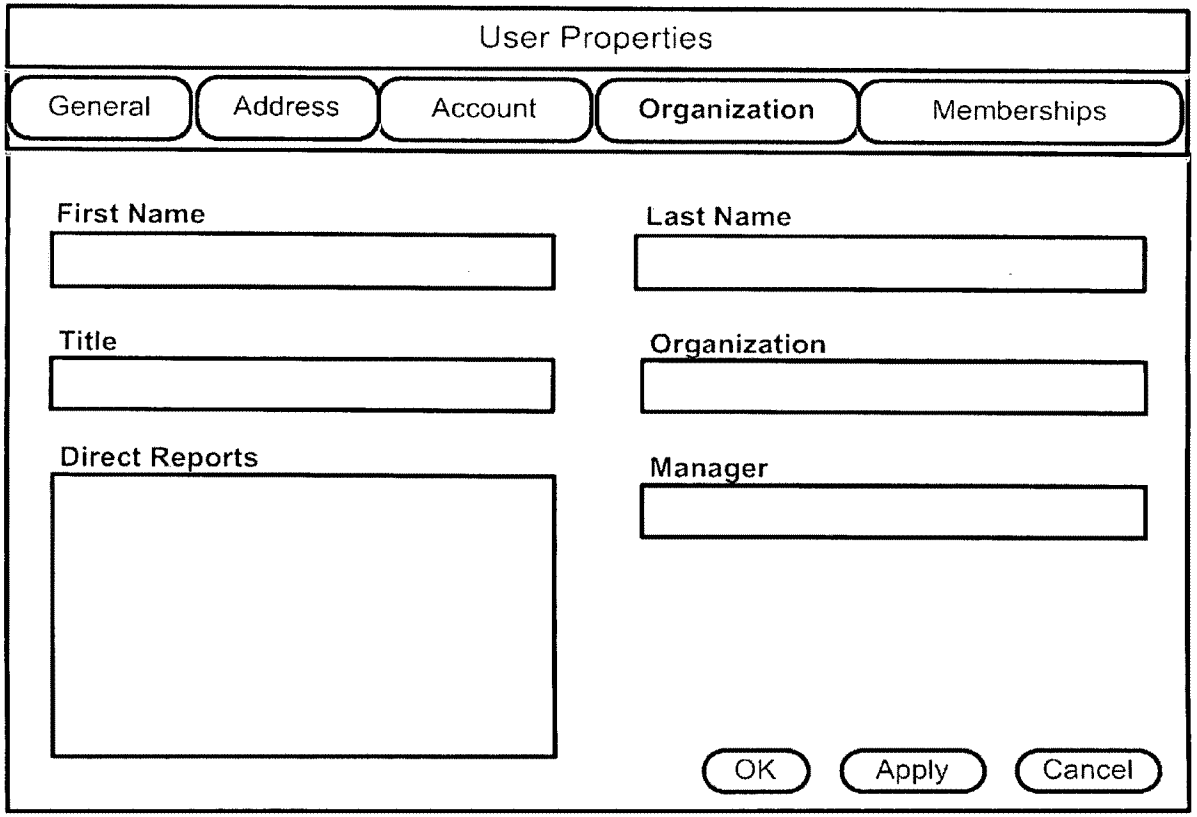
FIG. 51 illustrates an exemplary user definition dialog used in some preferred embodiments of the present invention.
Figure 52:
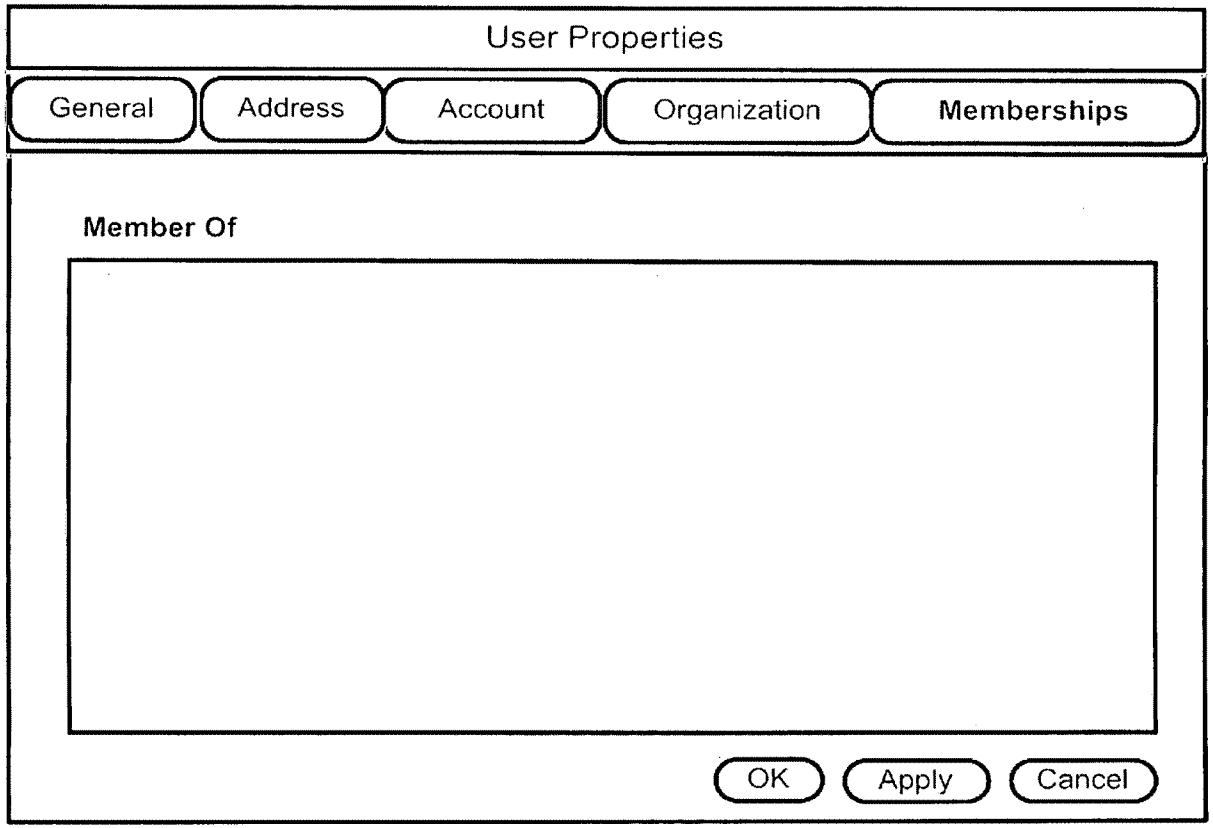
FIG. 52 illustrates an exemplary user definition dialog used in some preferred embodiments of the present invention.

The CA interface may in many preferred embodiments utilize a variety of dialog box configurations as generally illustrated in FIG. 49 (4900), FIG. 50 (5000), FIG. 51 (5100), and FIG. 52 (5200) to define the characteristics of individual users and also information regarding potential message recipients.

User Login/Message Interface Dialog Sequence (2400) Overview

Figure 24:
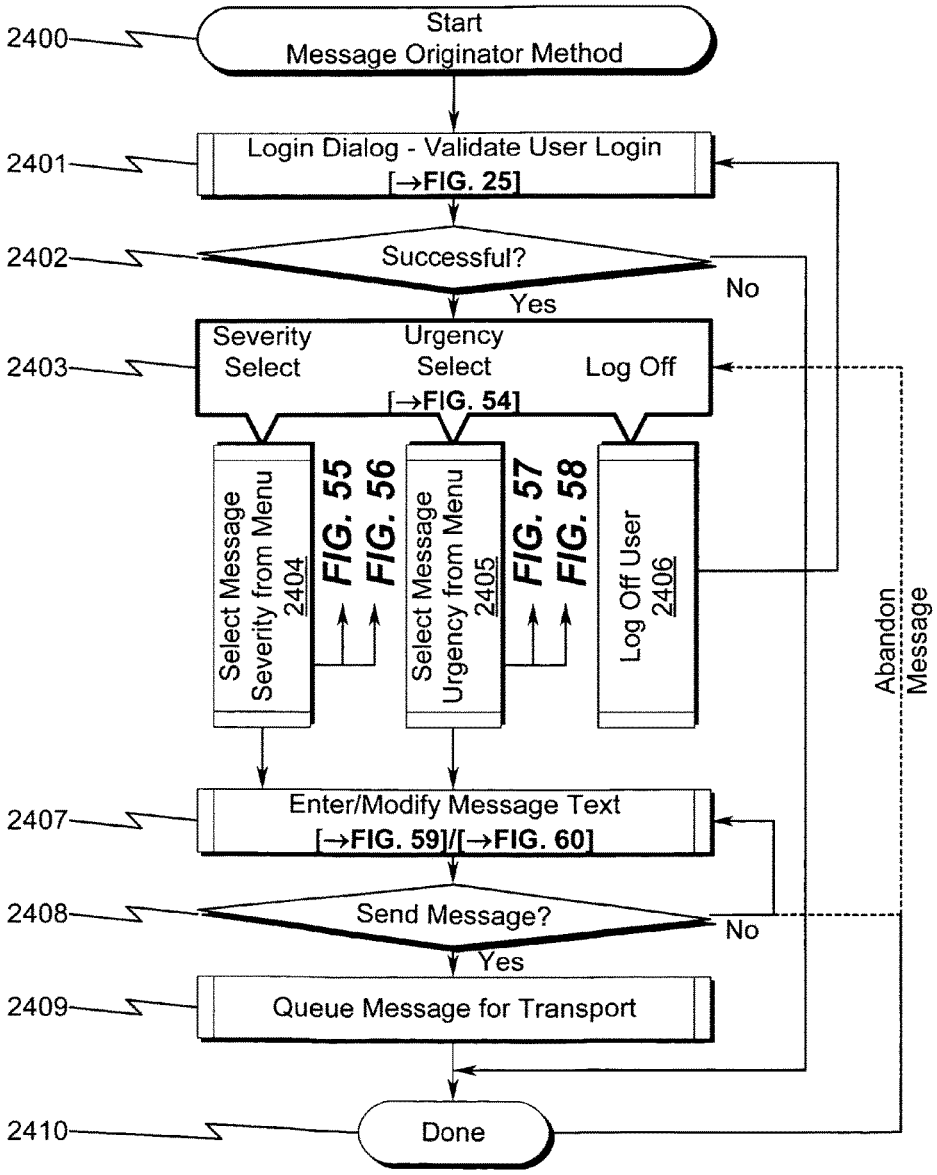
FIG. 24 illustrates an exemplary message originator method used in some preferred embodiments of the present invention.
Figure 54:
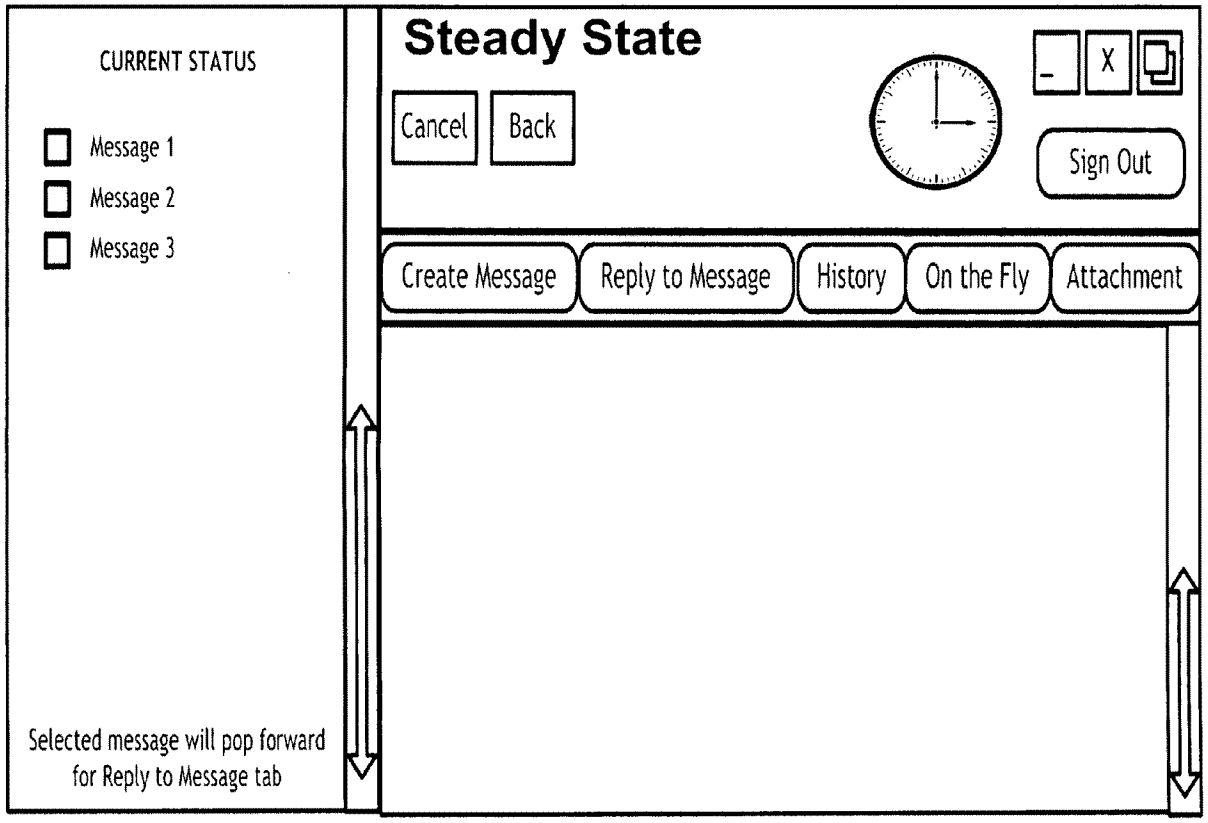
FIG. 54 illustrates an exemplary steady state messaging dashboard dialog screen useful in some preferred embodiments of the present invention.
Figure 55:
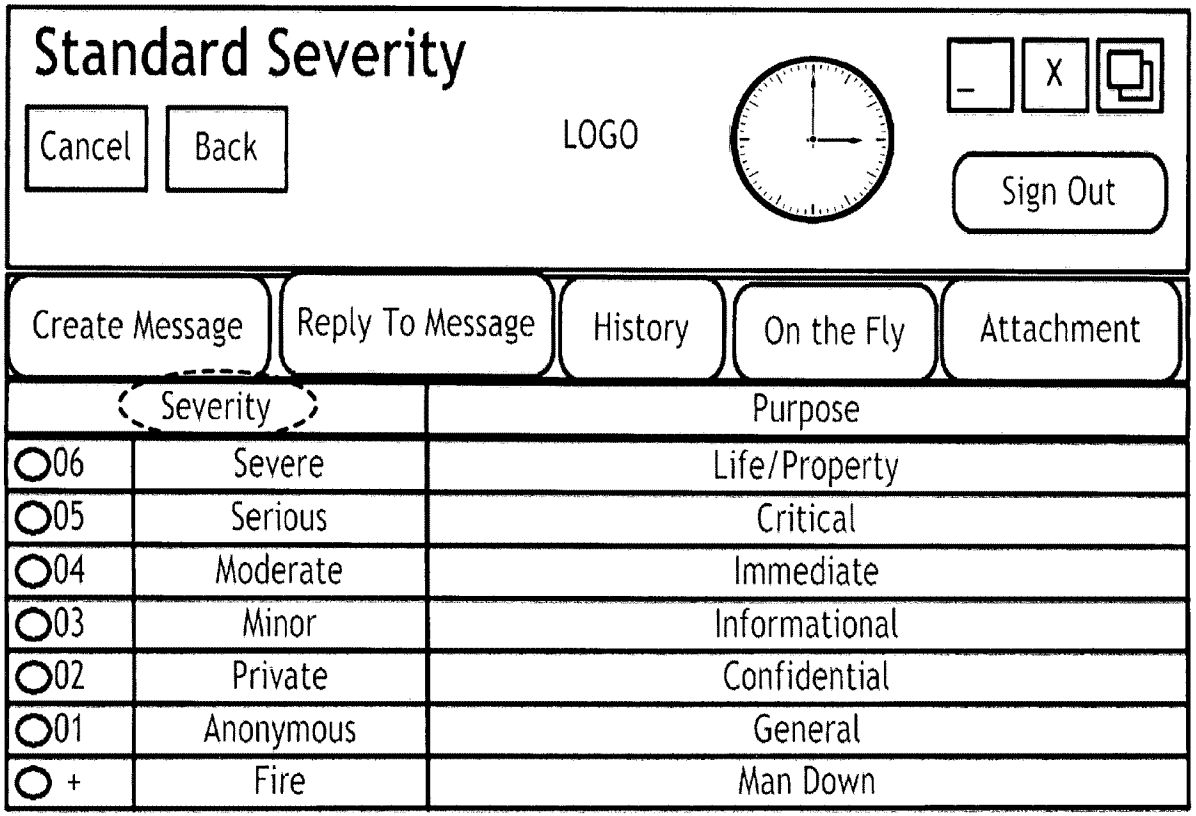
FIG. 55 illustrates an exemplary standard severity dashboard dialog screen useful in some preferred embodiments of the present invention.
Figure 56:
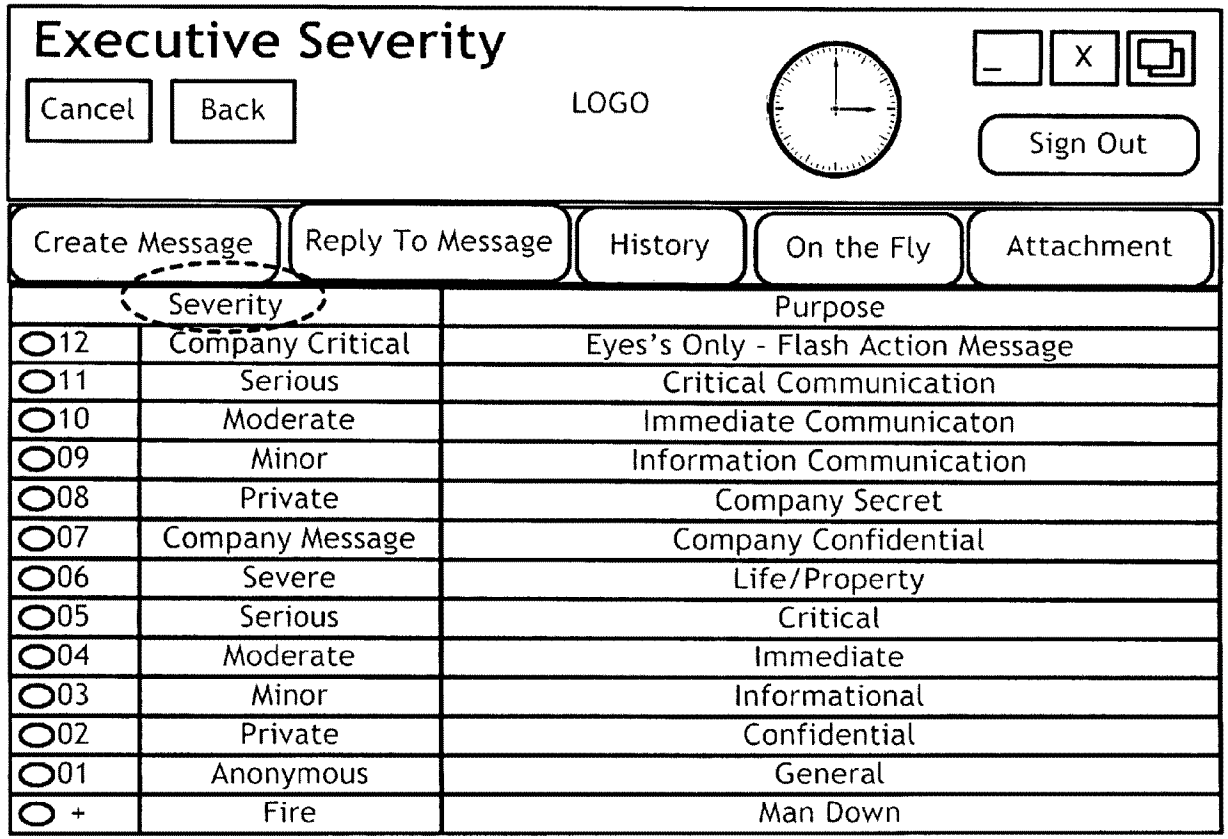
FIG. 56 illustrates an exemplary executive severity dashboard dialog screen useful in some preferred embodiments of the present invention.
Figure 57:
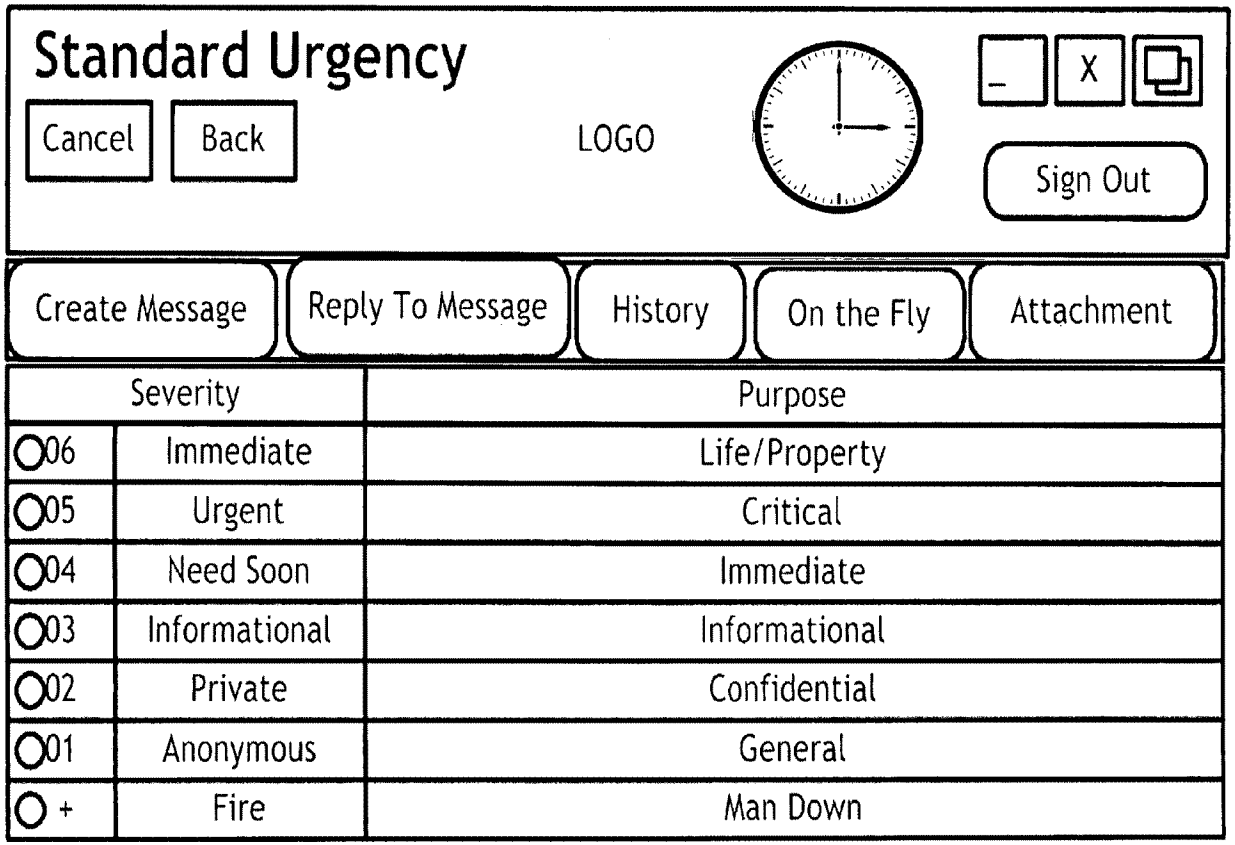
FIG. 57 illustrates an exemplary standard urgency dashboard dialog screen useful in some preferred embodiments of the present invention.
Figure 58:
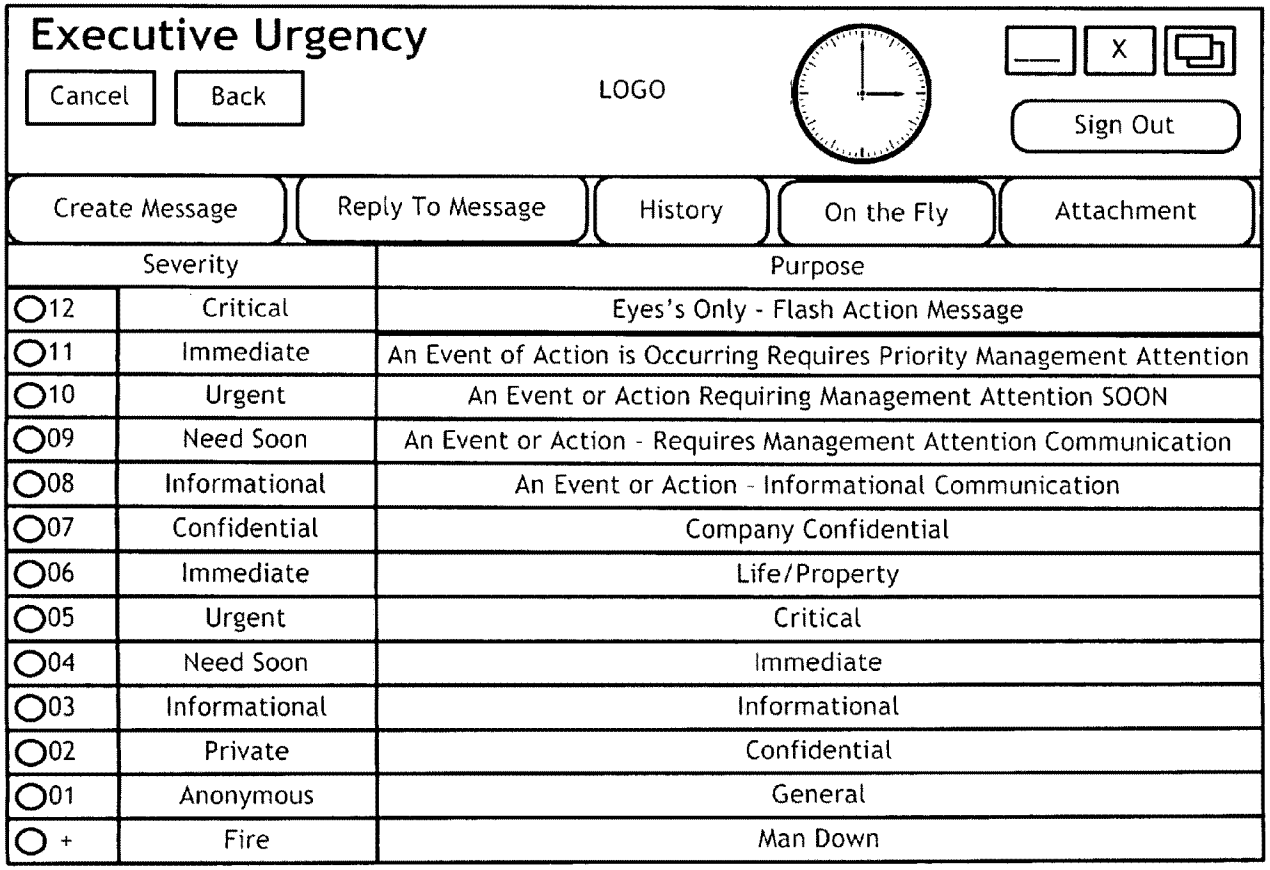
FIG. 58 illustrates an exemplary executive urgency dashboard dialog screen useful in some preferred embodiments of the present invention.
Figure 59:
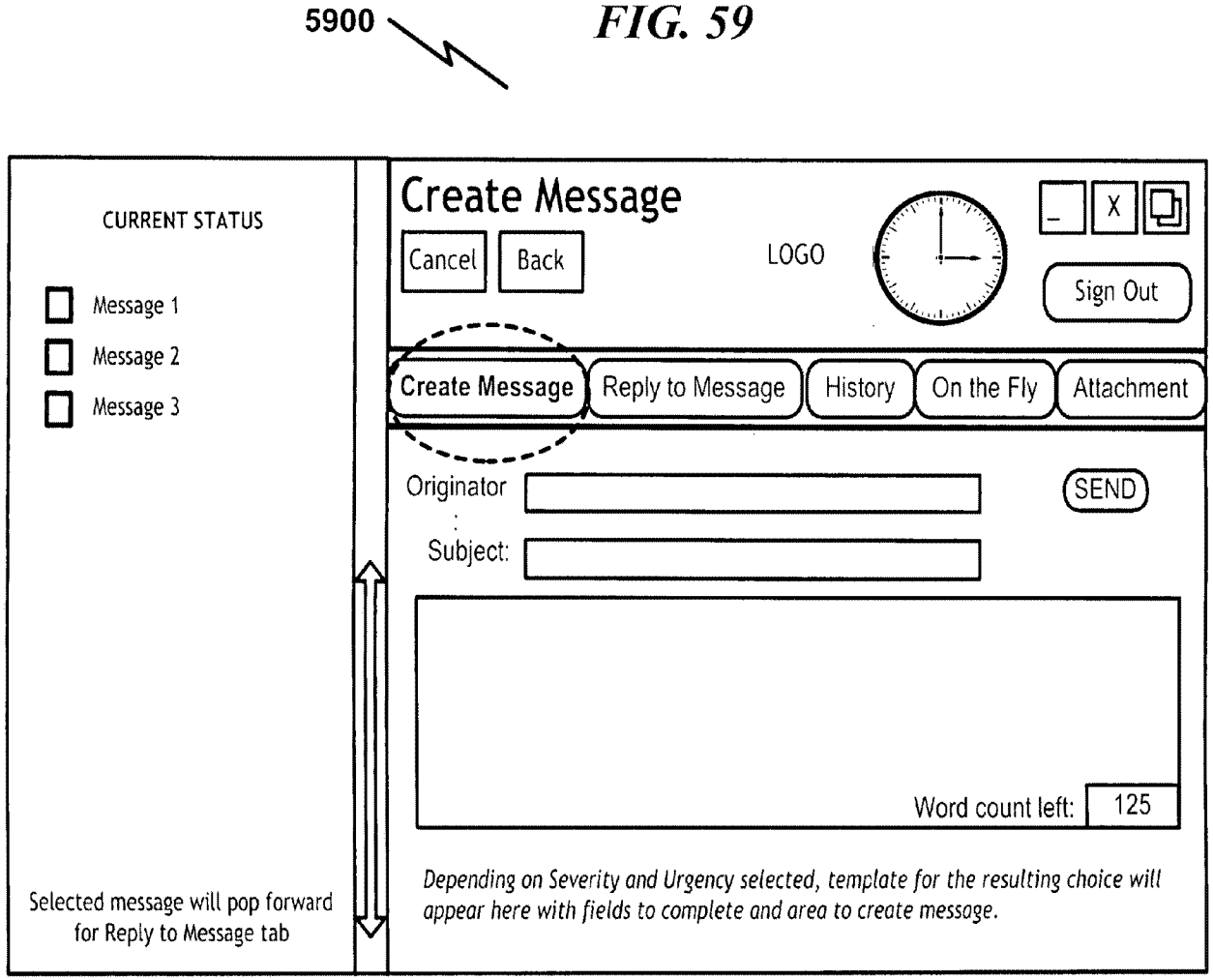
FIG. 59 illustrates an exemplary Create Message dashboard dialog screen useful in some preferred embodiments of the present invention.
Figure 60:
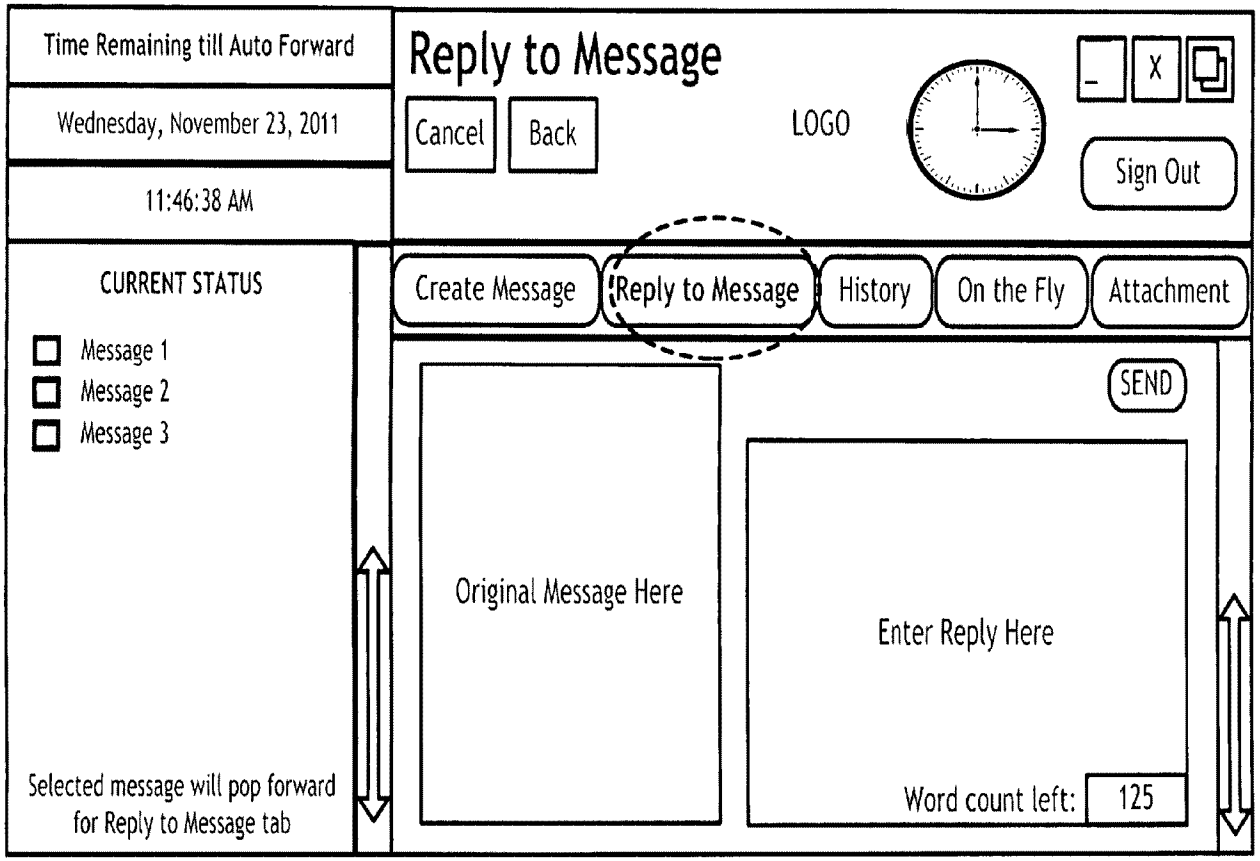
FIG. 60 illustrates an exemplary Reply To Message dashboard dialog screen useful in some preferred embodiments of the present invention.
Figure 61:
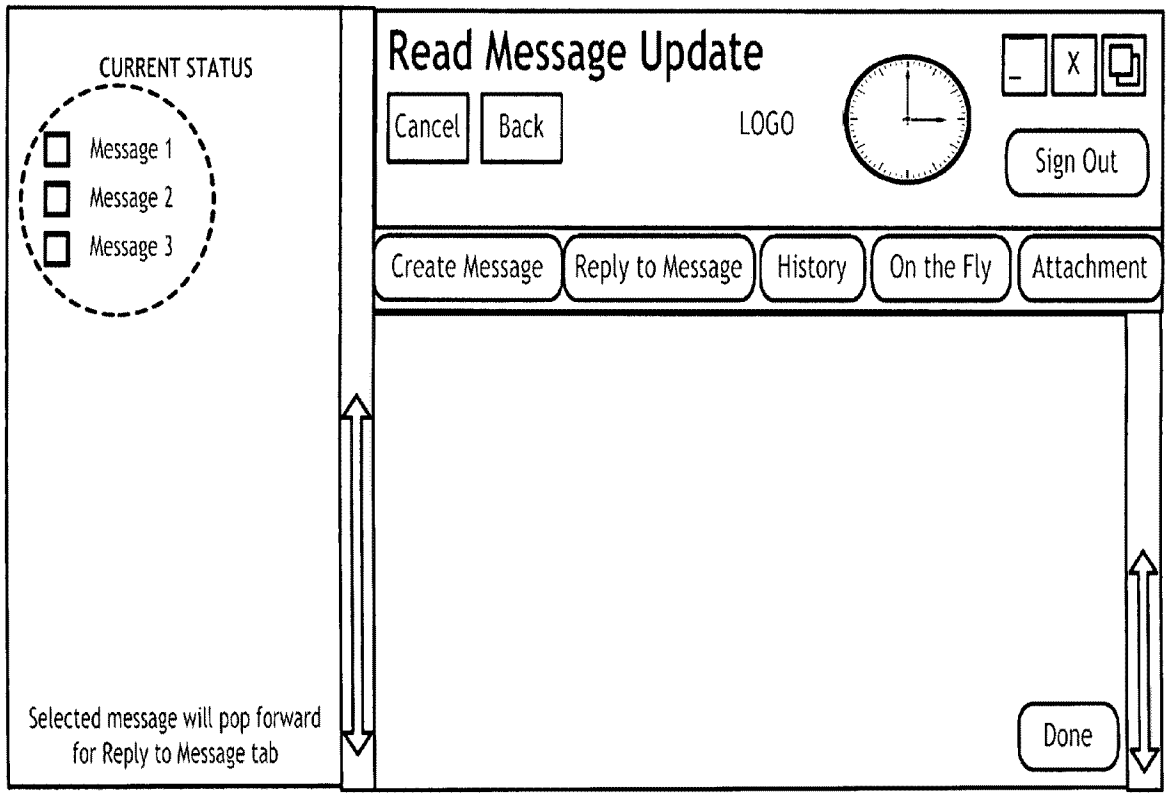
FIG. 61 illustrates an exemplary Read Message Update dashboard dialog screen useful in some preferred embodiments of the present invention.
Figure 62:
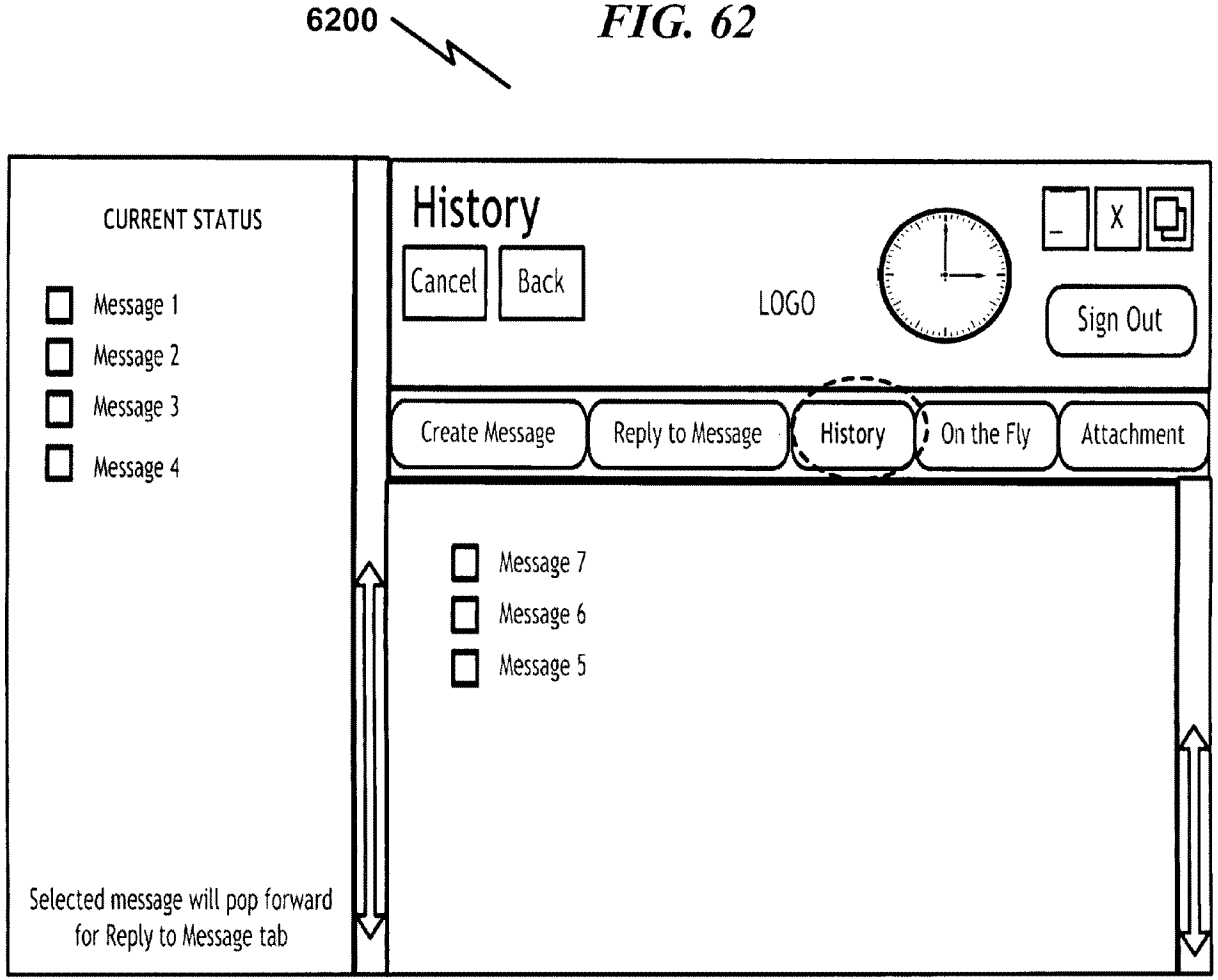
FIG. 62 illustrates an exemplary History dashboard dialog screen useful in some preferred embodiments of the present invention.
Figure 63:
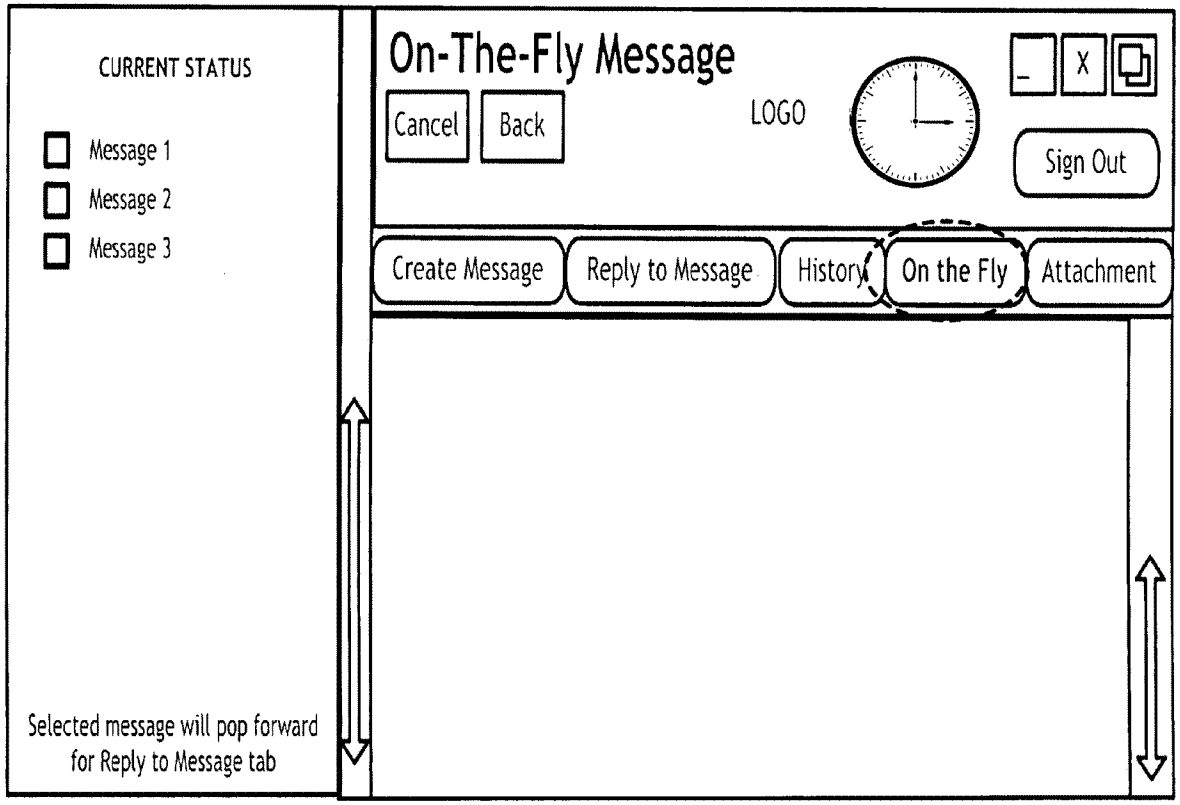
FIG. 63 illustrates an exemplary On-The-Fly Message dashboard dialog screen useful in some preferred embodiments of the present invention.

As generally illustrated in FIG. 24 (2400), the process flow for the message originator method can be generally described in terms of a flowchart comprising the following steps:

(1) A login dialog process is executed to validate the user login credentials (2401);

(2) If the login process is unsuccessful, then the message originator process terminates and control is passed to step (10) with the system locked to prevent further login access attempts (2402);

(3) A case branch is executed based on input from a main dialog menu screen (as generally illustrated by FIG. 54 (5400)), selecting one of a number of message management functions (2403);

(4) If the menu selection is message severity, a message severity selection dialog (as generally illustrated by FIG. 55 (5500) and FIG. 56 (5600)) is presented in which the message originator selects from a fixed list of available message severities (2404);

(5) If the menu selection is message urgency, a message urgency selection dialog (as generally illustrated by FIG. 57 (5700) and FIG. 58 (5800)) is presented in which the message originator selects from a fixed list of available message urgencies (2405);

(6) If the menu selection is Log Off/Sign Out, control returns to step (1) (2406);

(7) Upon completion of steps (4) and/or (5) the message originator is prompted via dialogs either to enter (FIG. 59 (5900)) or modify (FIG. 60 (6000)) message text for transmission (2407);

(8) If the message originator has not selected SEND for message transmission, control passes to step (7), or alternatively if the message transmission is abandoned/cancelled, control passes to step (3) (2408);

(9) Once the message originator has requested that the message be sent, the message is sentfor transport to the message recipient (2409); and

(10) The message originator method terminates processing and returns to step (3) (2410).

One skilled in the art will recognize that these method steps may be individually eliminated, augmented, modified, and/or rearranged without limiting the teachings of the present invention.

Preferred Embodiment Details

While the above description provides general information regarding implementation, some preferred embodiments will incorporate the following implementation steps:

User inputs name and password at the login screen.

Information is sent to the Certificate Server where it is validated.

The Certificate Server then processes the request and verifies whether the requestor is qualified to receive a certificate.

If validated, a private key is created and issued to the requestor.

If both conditions are found to be valid the user is then logged into the messaging system. Note: All certificate transactions are stored in the certificate database for the audit trail.

Once the certificate process is completed, the server will apply a policy which tells the system what to do with the request. This validates the access level that the requestor is presented with after login.

If the request is rejected, the user will be given two (2) additional attempts to input their username and password.

After three unsuccessful attempts, the requestor will be notified that their request has been denied and present the requestor with information on how to contact the certified administrator for assistance and the requestor will be locked out of the system.

License Validation Server

When a user logs into the system, the License Server will validate which services the user has available for use (This is applied through a group policy defined at the time of installation, based on the individual user' s job duties. (The License Server also holds the license log files of the clients' product and feature use.) The License Server is the second validation step before access to the message system is granted.

If the license validation for the username and password is rejected, as an example; the license has expired, the user will be locked out of the system until the Certified Administrator rectifies the trouble. Once the level of access is validated, the user will be granted access to the messaging system.

Create Message (5400)

The Dashboard displays the Current Status of existing messages in the left-hand window and allows for the creation and/or reply to a message (providing that the auto-forward timer has not expired). To create the message, select the Create Message tab from the Menu Dashboard, which will provide the present user with a variety of system driven menus, some exemplary embodiments of which are described below.

Severity (5500, 5600)

The user may be presented with a Severity Menu where the appropriate Severity for the message is selected. Note: The BACK button can be used to return to the previous menu. The CANCEL button can be used to cancel the message.

Urgency (5700,5800)

The user may be presented with an Urgency Menu where the appropriate Urgency for the message is selected.

Message Creation Details (5500, 5600, 5700, 5800, 5900)

Once the Severity and Urgency are selected, the user may then create the message. The system may present the user with the following system driven menus, reference the previously described menu Dashboard. The general information flow of this menu Dashboard is as follows:

Originator enters their Name.

The text message is entered in the available box.

Once the message is complete, and has been reviewed, SEND is selected to transmit the message.

In many preferred embodiments the messages are limited to a maximum of 125 words for Originator and each subsequent reply area. The originator's encrypted message is then sent to designated recipients and the message will appear in the Current Status window to the left of the dashboard and may be optionally highlighted in its severity state color.

When multiple messages exist in the current status section, by hovering the mouse over the message, a 'snapshot' of the message in notation form showing the originator and message title may optionally appear. Additional information is potentially available to be displayed and is configurable by the client.

Message Originator/Recipient Login Validation Process (2500)

Figure 25:
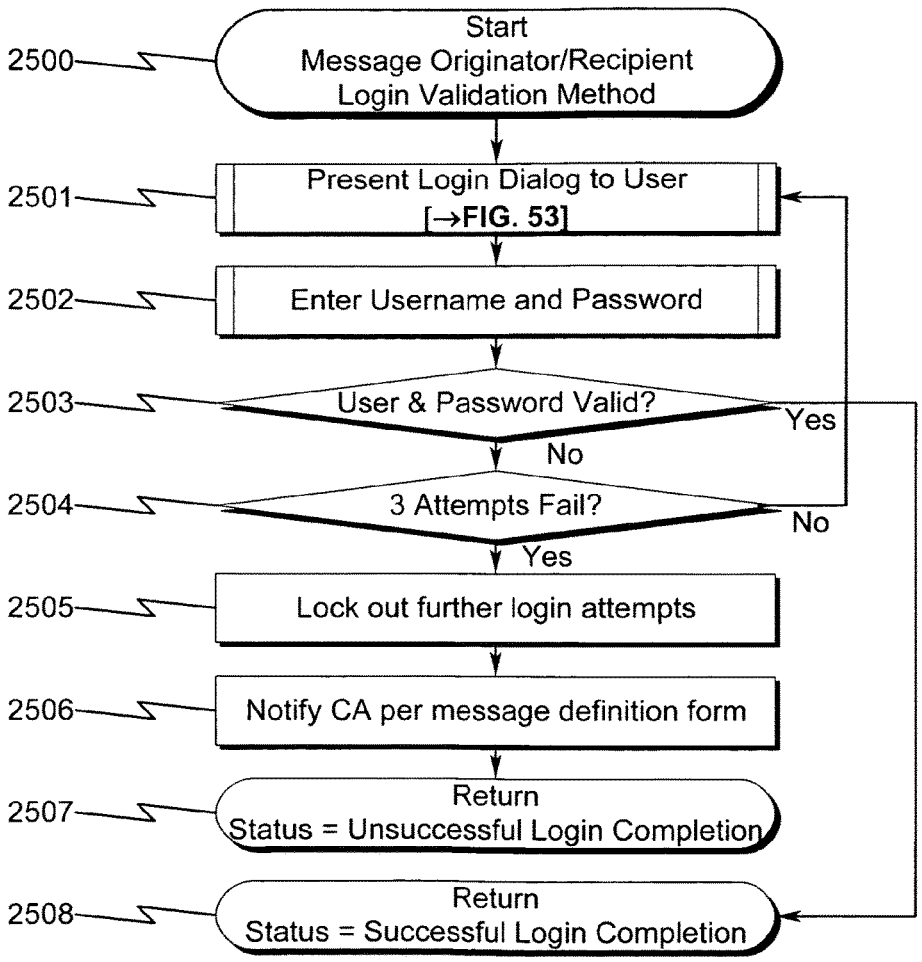
FIG. 25 illustrates an exemplary Message Originator/Recipient Login Validation Method used in some preferred embodiments of the present invention.
Figure 53:
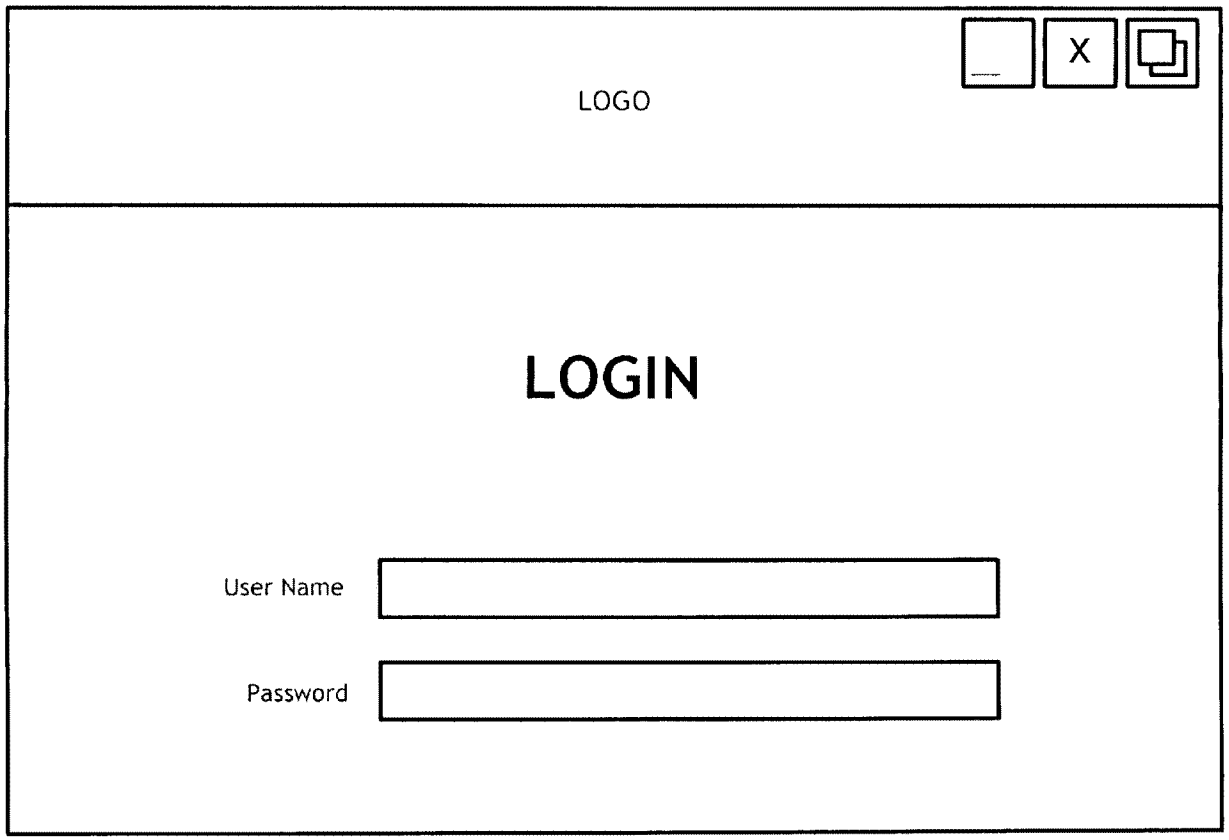
FIG. 53 illustrates an exemplary user login screen useful in some preferred embodiments of the present invention.

While the login validation process (2401) generally illustrated in FIG. 24 (2400) may be implemented in many ways, one preferred exemplary embodiment is generally illustrated in FIG. 25 (2500), and comprises the following method steps:

(1) A login dialog (as generally illustrated by FIG. 53 (5300)) is presented to the user for data entry (2501);

(2) The message originator/recipient is prompted to enter a username and password (2502);

(3) If the entered username and associated password are valid, control is passed to step (8) (2503);

(4) If there are less than three failed login attempts, control is passed to step (1) (2504);

(5) Further login attempts are blocked (2505);

(6) Notification is presented to the Certified Administrator (CA) to indicate an attempted security breach (2506);

(7) An unsuccessful return completion status is indicated and control is returned to the calling process (2407); and (8) A successful return completion status is indicated and control is returned to the calling process (2508).

One skilled in the art will recognize that these method steps may be individually eliminated, augmented, modified, and/or rearranged without limiting the teachings of the present invention.

Message Transmission Protocol (2600)

Overview

Figure 26:
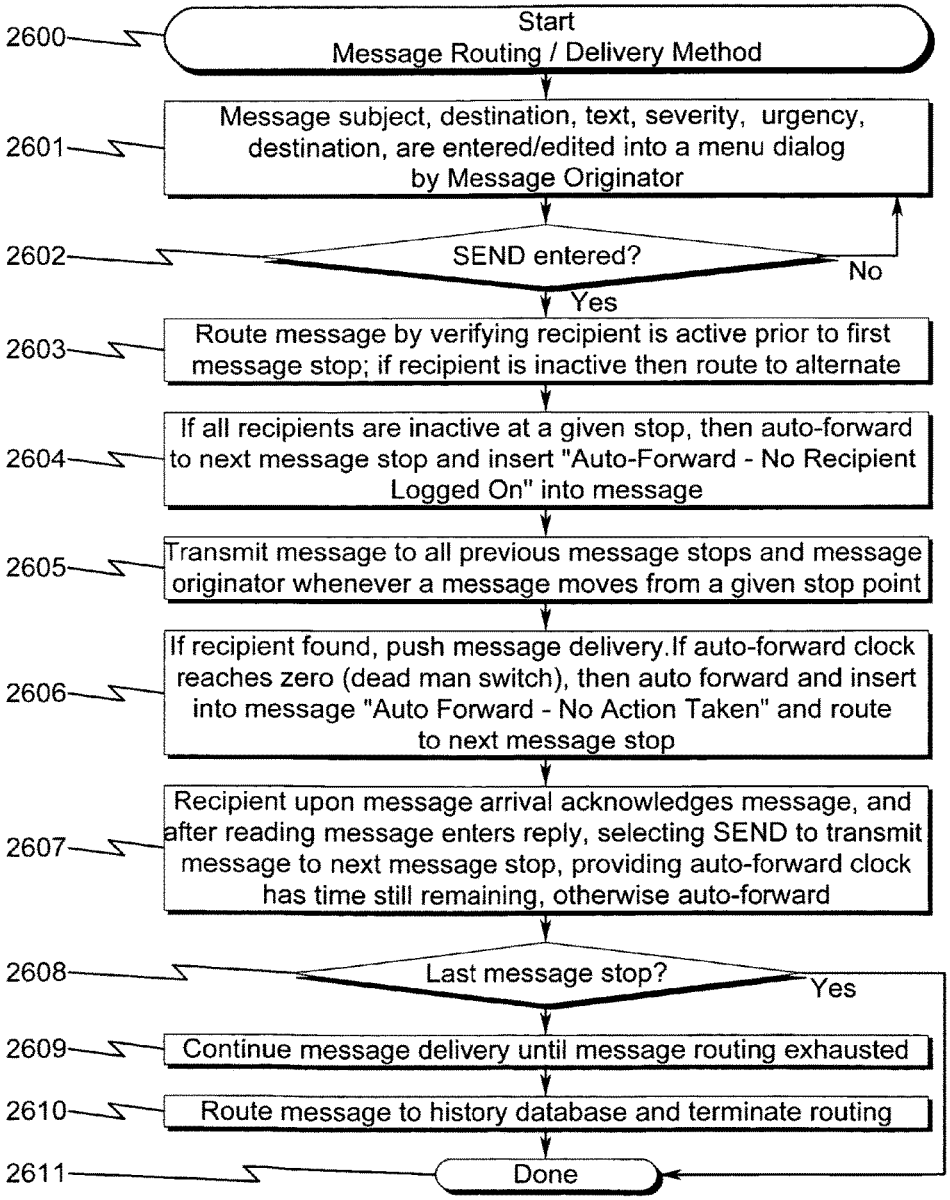
FIG. 26 illustrates an exemplary Message Routing/Delivery Method used in some preferred embodiments of the present invention.

A generalized overview of the message transmission protocol and associated routing methodology is generally illustrated in the flowchart of FIG. 26 (2600) and will now be discussed in detail.

General Requirements

While many methodologies may be associated with the message transmission protocol, several are anticipated as preferred. Generally speaking, as part of the message definition development, the client management may make a determination as to the encryption level for specific Severity and Urgency associations. That information in conjunction with a Message Definition Form may be passed along to the CA's for Create System Message for user menu driven messages. The actual algorithms that may be deployed are application specific, and may be changed out on a very frequent basis such as every 12 hours to provide for higher levels of message security. In addition to this provision for message security, it is anticipated that a minimum level of system availability and reliability can be maintained using a Global Quad redundant Server Architecture Network in SAS70 minimum facilities.

Routing Algorithm

After the message originator completes the message and selects SEND, the message is encrypted at the Specified Encryption Level and sent to the communication server, where in a parallel form, the message is routed to the first message stop, and optionally to a Client Message Archive database. The general preferred transmission protocol acts as follows:

The Routing Algorithm involves the distributed server's verification of the Primary Recipient being logged on, and if that is false, the First Alternate, until that message stops recipient list is exhausted.

The standard dead man switch is employed and the message is Auto Forwarded to the next Recipient and where the First Recipient would have entered their response to the message the system will auto insert "Auto Forward No—User/Recipient was Logged On."

The same procedure will be followed for each successive message stop in the message chain.

If the client has a dead man provision for other routing "Only in the Event", it will be executed, otherwise the message is terminated once it arrives at the final message stop.

The message is sent to a Message Archive Database for that particular client, where the last two or more copies are actively maintained until the message reaches its final destination, at which time only the last/final message stop copy is kept.

This completes the section from user SEND through encryption, to first message stop recipient, and archive.

Conditions for Forwarding

Within this transmission protocol context there are three (3) currently anticipated conditions for a person to be considered "Not Logged On":

The first condition is that they simply have not logged on yet.

The second condition is that the system, per client defined protocol, has had the User logged off due to non-use, to help control computer integrity/security and prevent unauthorized access.

The third condition is that the user was logged on but there is no file suggesting that they logged off or were disconnected by the server due to inactivity. In this case the communications server will send a notification to the client specified person notifying them that there appears to be a technical anomaly with that particular user.

While this transmission protocol is anticipated as optimal, one skilled in the art will recognize that many variations are possible based on site and application specific customer requirements.

On-The-Fly Messaging (2700, 2800, 2900)

While the present invention may utilize the CA and associated Message Definition Forms to create a formalized and structured message delivery system/method, the present invention in some preferred embodiments also anticipates the use of on-the-fly messaging, in which messages are delivered to a recipient list in a deterministic fashion that is specifically structured at the time the message is created. This permits impromptu (on-the-fly) message creation and delivery in response to any number of unforeseeable environmental and situational conditions.

Top Level On-The-Fly Messaging Method (2700)

Figure 27:
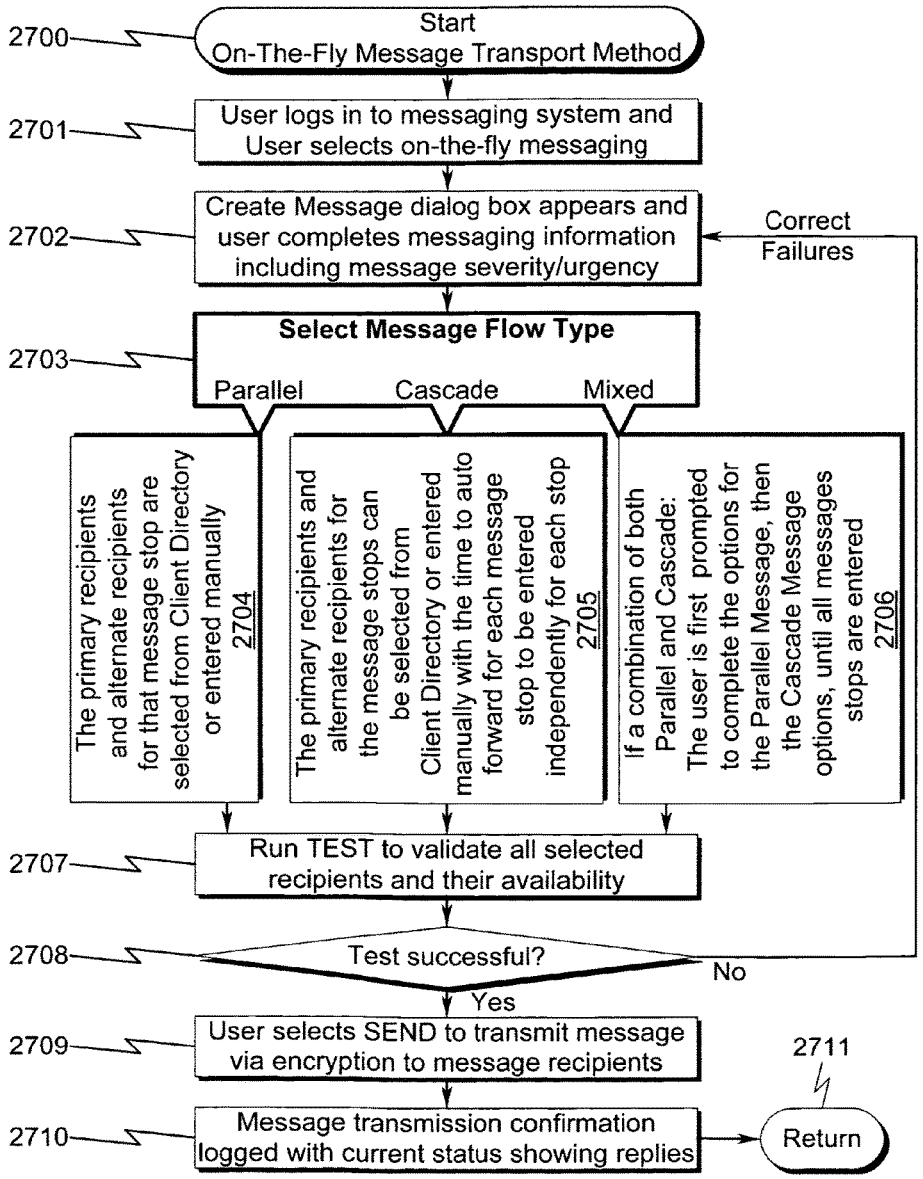
FIG. 27 illustrates an exemplary On-The-Fly Message Transport Method used in some preferred embodiments of the present invention.

As depicted in the flowchart of FIG. 27 (2700), the method associated with this embodiment variant generally comprises the following steps:

(1) The CA or User logs in to the messaging system using the authentication mechanisms discussed previously and selects on-the-fly messaging from the dialog box dashboard interface (2701);

(2) The CA/User selects the Create Message dialog box and completes the messaging information including message severity/urgency codes (2702);

(3) The user will be given the option of parallel (broadcast) and/or cascade (serial sequential) message delivery (2703);

(4) If Parallel Messaging is selected, the primary recipients and alternate recipients for that message stop can be selected from Client Directory or entered manually. Once the message has been created the user will proceed to TEST (See below) (2704);

(5) If Cascade Messaging is selected, the primary recipients and alternate recipients for the message stops can be selected from Client Directory or entered manually. The time to auto forward for each message stop can be entered for each stop. Once the message has been created the user will proceed to TEST (See below) (2705);

(6) If a combination of both Parallel and Cascade: The user will first be prompted to complete the options for the Parallel Message, then the Cascade Message options, until all messages stops are entered (2706);

(7) Test runs an internal validation algorithm to validate that all selected recipients are valid and available/online with the test results displayed for inspection and review (2707);

(8) If the TEST is unsuccessful, control is returned to step (2) for correction of recipient failures (2708);

(9) The CA/User selects SEND to transmit the message to the target message recipients (2709);

(10) Confirmation that the message has been sent is a unique message identifier number with its priority relevant color appearing in the Current Status section on the dashboard. Message replies will be noted by a change in the color of that message in the Current Status section indicating the message has been updated with a reply, if the message is one that requires a reply. If there is no reply the CA/User message transmission activities are complete (2710); and

(11) Control is returned to the main dialog box messaging dashboard (2711).

One skilled in the art will recognize that these method steps may be individually eliminated, augmented, modified, and/or rearranged without limiting the teachings of the present invention.

Detailed on-the-Fly Messaging Method (2800, 2900)

Figure 28:
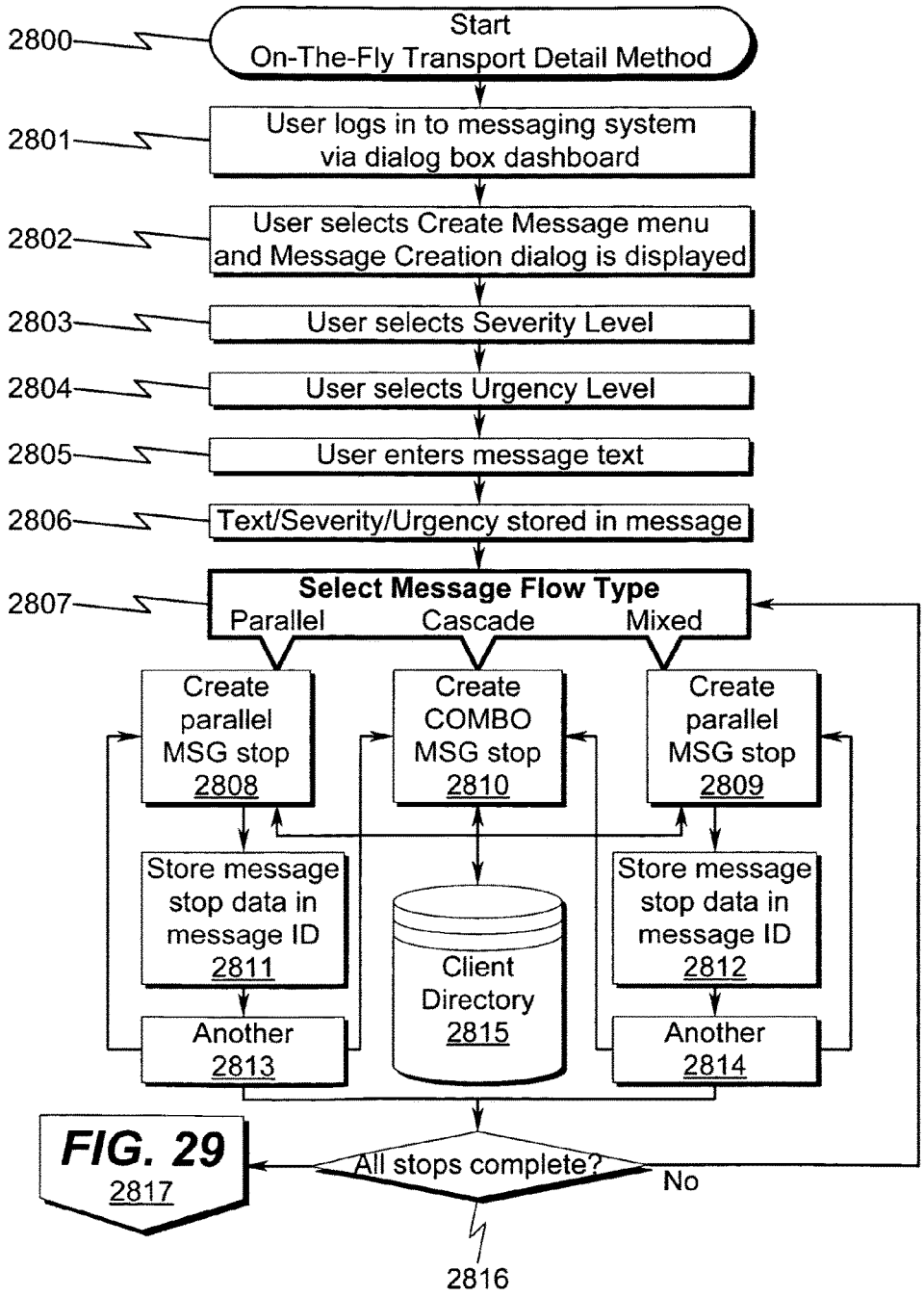
FIG. 28 illustrates an exemplary On-The-Fly Transport Detail Method used in some preferred embodiments of the present invention.
Figure 29:
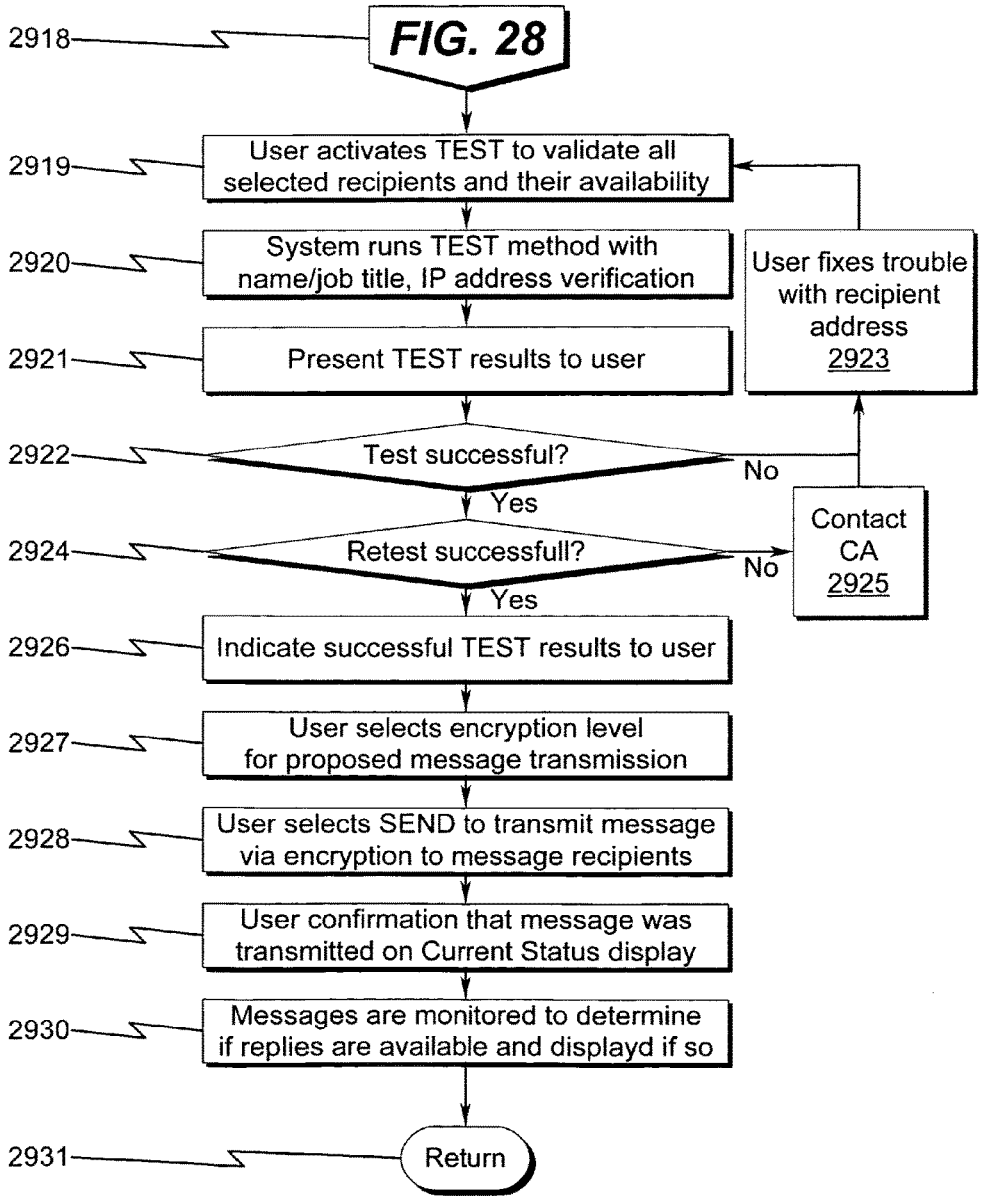
FIG. 29 illustrates an exemplary On-The-Fly Transport Detail Method used in some preferred embodiments of the present invention.

One skilled in the art will recognize that many variations of the on-the-fly messaging method may be possible using the present invention. One example of a more robust embodiment of this teaching is illustrated in FIG. 28 (2800) and FIG. 29 (2900) that in combination expand on the general teachings of the method illustrated in FIG. 27 (2700). One skilled in the art will recognize that other potential implementations are possible within the scope of the claimed invention.

Message File Attachments (3000)

Figure 64:
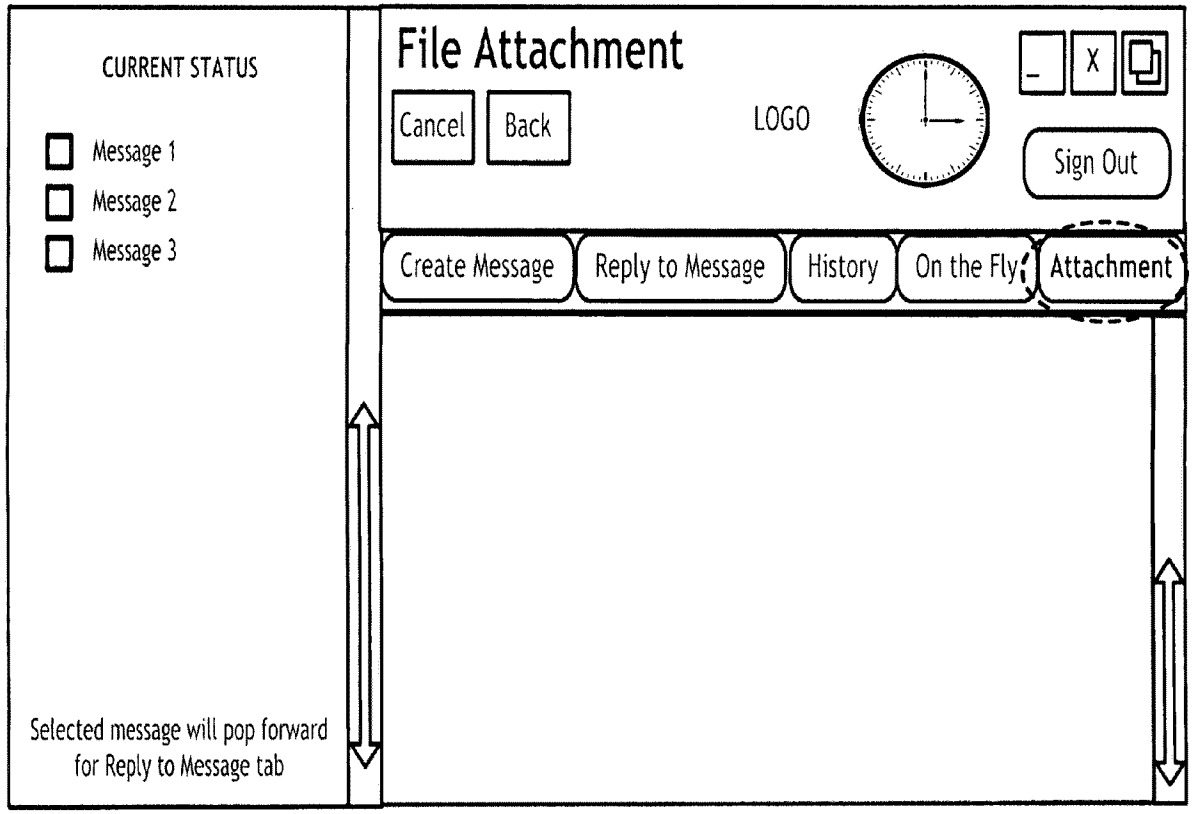
FIG. 64 illustrates an exemplary File Attachment dashboard dialog screen useful in some preferred embodiments of the present invention.

The present invention anticipates that messages may incorporate file attachments under some situations. These attachments may include pictures, video, text and/or document files and other forms of digital data. As generally illustrated in FIG. 64 (6400) and other message system dialogs illustrated herein, the attachment function can be incorporated into these menus in a variety of ways.

The user selects the Attachment tab from the system menu dashboard, then uploads from the dropdown menu, to attach a file or picture. The CA may select the Create Message tab, Attachment tab from the drop down menu, and upload file/picture from the Attachment drop-down menu. The rest of this functionality will generally be accomplished on the client's computer separate from the message system dashboard.

Figure 30:
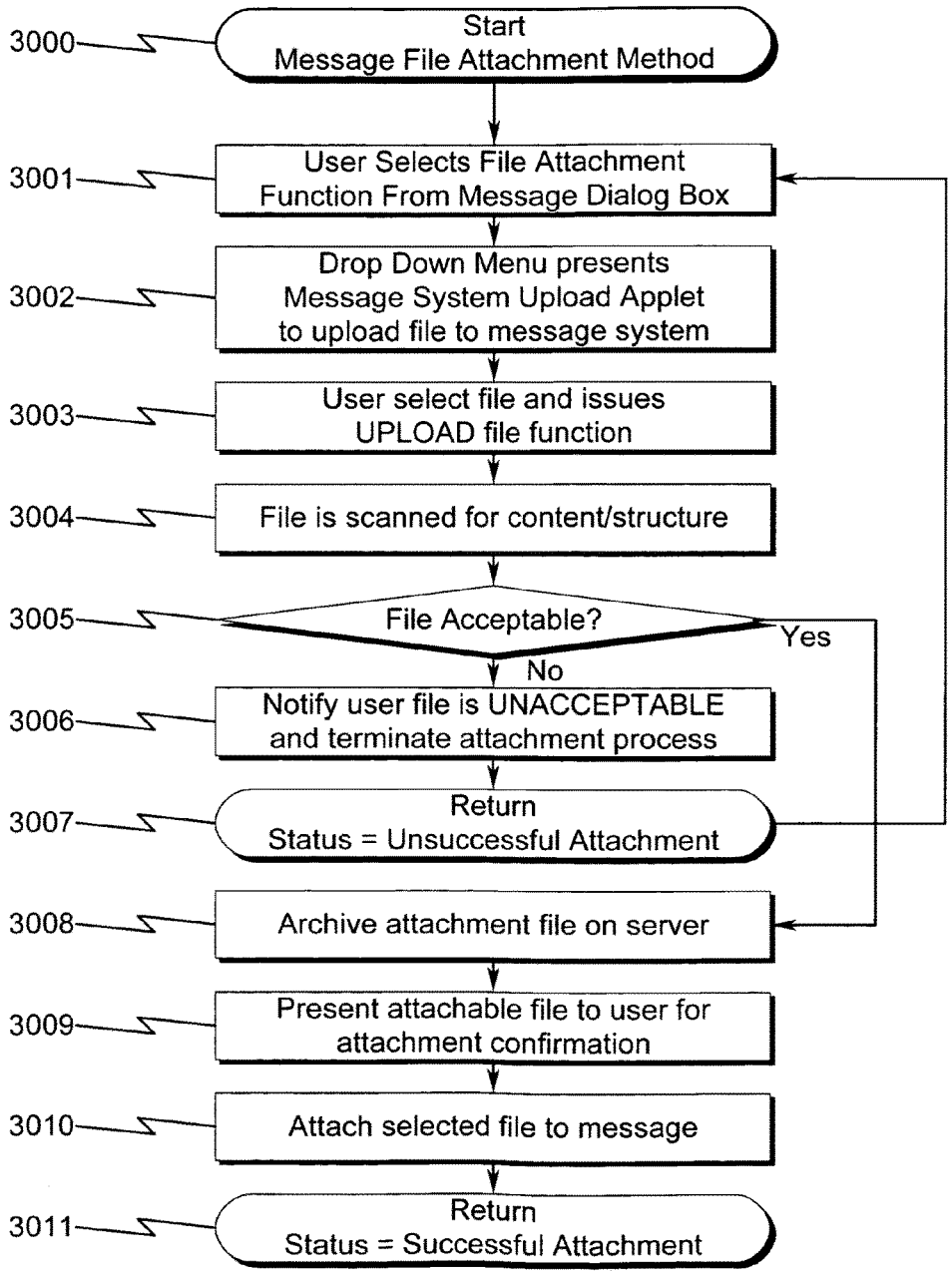
FIG. 30 illustrates an exemplary Message File Attachment Method used in some preferred embodiments of the present invention.

An exemplary method associated with this file attachment functionality is generally illustrated in FIG. 30 (3000) wherein the method incorporates the following steps:

(1) From the client's computer chooses the Message System Attachment Function from the message dialog box (3001);

(2) The drop down menu presents a message system upload applet to upload the file to the message system (3002);

(3) The user chooses the file/picture they wish to upload and issues the UPLOAD file function (Y303);

(4) The file is scanned for infections. The upload will be to the message system upload secure server where the file/picture will be scanned for infections. If an infection is found and its removal is possible without destroying the file/picture, the infection will be removed. Once the file or picture has been scanned, a notification will appear on the user's dashboard to indicate whether the file or picture is/is not available for use (3004);

(5) If the file is acceptable, control passes to step (8) (3005);

(6) The user is notified that the file is UNACCEPTABLE and the file attachment process is terminated (3006);

(7) An unsuccessful return completion status is indicated and control is returned step (1) (3007);

(8) The file attachment is archived to the messaging server; in the event that a file or picture is available for use, the user will have the option of sending another file/picture or canceling the operation (3008);

(9) The user will be presented with a listing of available files or pictures that can be attached to the message or viewed on screen, outside of the client dashboard, but only if the file or picture is found to be usable will the user be able to select the file or picture to be included with the message (3009);

(10) The selected file or picture link(s) on the stored message server (where it is archived for future reference) will then be attached to message and forwarded as requested (3010); and

(11) A successful return completion status is indicated, and control is returned to step (1) with [he] *the* recipient then able to access the attachment on screen at its destination presentation interface (3011).

One skilled in the art will recognize that these method steps may be individually eliminated, augmented, modified, and/or rearranged without limiting the teachings of the present invention.

Anonymous Interrogator of Message (AIM) Scanner (3100)

The present invention anticipates integrated scanning of messages during data entry to check for threats to life and/or property that may require immediate attention. Any time the Severity or Urgency Selection of ANONYMOUS is chosen from any level of messaging menu, an Anonymous Interrogator of Message (AIM) scanning and review subsystem may be activated. The sole purpose of this Anonymous Interrogator of Message program is necessitated due to the threats that may be directed to or against the client personnel, facilities, or other client property, or activities.

The Anonymous Interrogator of Message is a proactive discovery of insider threats and is designed to read in real time as a message is being composed. The Anonymous Interrogator of Message scans messages, but is initially thought to be optimally limited to ONLY interrogation of Anonymous messages.

The Anonymous Interrogator of Message scans Anonymous Messages for behavior, certain words or certain phrases, to identify a client computer location and allow client directed response in an attempt to intercept an employee before he or she becomes a danger to them or company or society. The system was developed to assist clients with the earliest internal and external terrorist threat identification.

Initially, the Anonymous Interrogator of Message will scan only the anonymous Messages generated by a client, but may be expanded if a client chooses. But the very existence of such a program is sure to unnerve some client employees. If they—the client management choose to make this information public within the enterprise. The real-time scans work only on internal anonymous messages in the client's message system, not the client's computer network and or system. By monitoring for "anomalies" and predicting extreme behavior based on words and phrases, catastrophes can be prevented.

This is how the Anonymous Interrogator of Message detection engines works. As soon as anyone chooses the Anonymous Severity or Urgency, from the Menu, the message system will start the program interrogator. This program interrogator will look for in real-time as the message is being entered those words and or phrases that the client has chosen to have encoded into the program that they have deemed as dangerous or terrorist-centered in nature.

The Anonymous Interrogator of Message is contained within the system framework of some preferred embodiments of the present invention, but all words or phrases are developed by and are included at the request of the client.

But the issue is not the scanning technology itself; it's how the information is used and whether it ultimately helps at all. Since there is no real data publicly available to substantiate that any of this technology is preventing terrorist attacks or strengthening the client from within, there is no definitive proof that as of today that this type of program interrogator has really thwarted a threat. However, it can be definitively stated that this technology will provide the ability to react in as close to real-time as possible to the client system where the threat is being generated, and therefore in a best case scenario provide the opportunity to intercept the threatening originator as the message is being generated.

Figure 31:
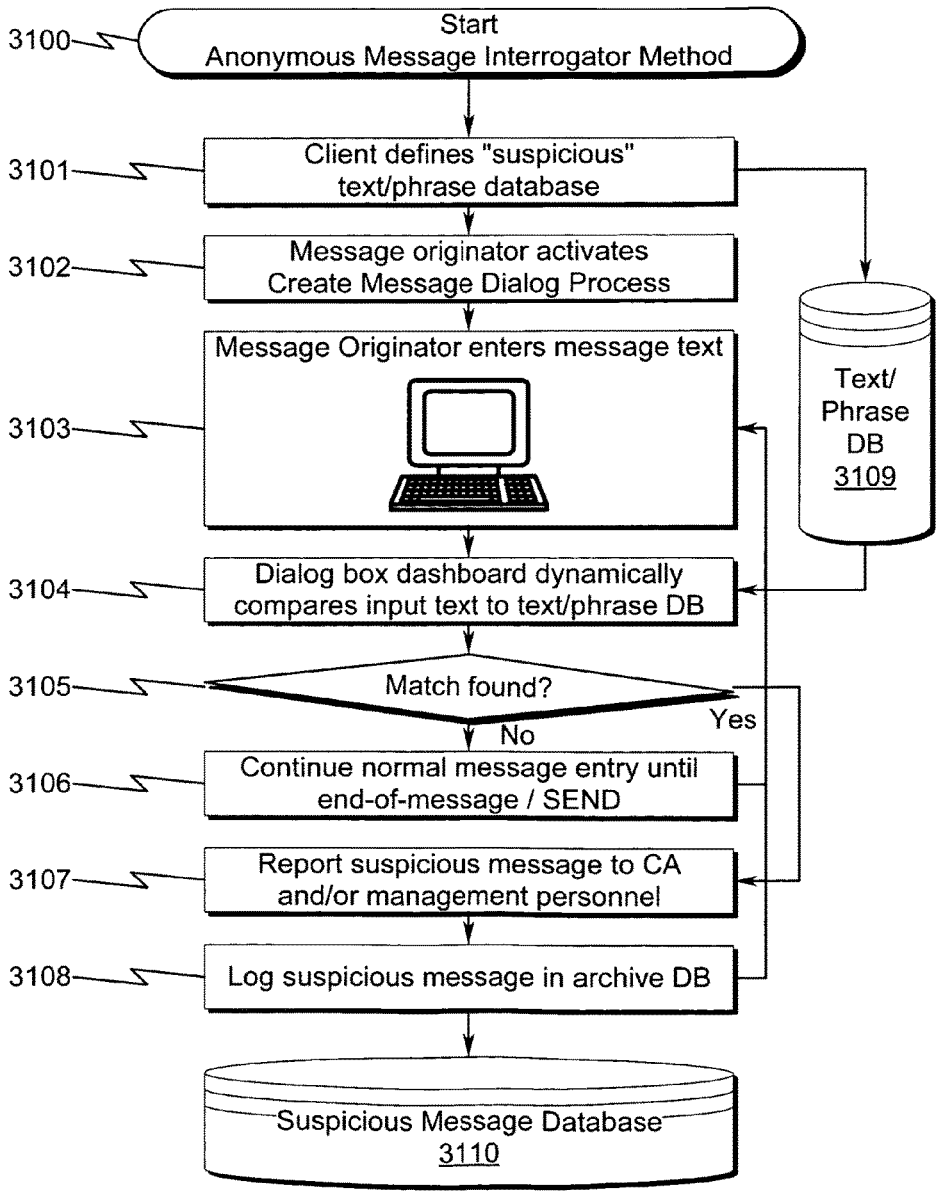
FIG. 31 illustrates an Anonymous Message Interrogator Method used in some preferred embodiments of the present invention.

A generalized method associated with the AIM process is illustrated in the flowchart of FIG. 31 (3100), wherein the method comprises the steps of:

(1) The client defines "suspicious" text/phrase combinations (3109) in a text/phrase database (3101);

(2) The message originator activates the Create Message dialog dashboard process (3102);

(3) The message originator enters message text via the message entry interface (3103);

(4) The dialog box dashboard process dynamically compares message originator input to the text/phrase database (3109) using a variety of matching algorithms that may include direct word matching and/or context sensitive text/phrase constructions (3104);

(5) If a text/phrase match is found, control is passed to step (7) (3105);

(6) Otherwise, message originator message entry continues as normal until and end-of-message or SEND is entered by the message originator with control passing to step (3) (3106);

(7) The suspicious message text/phrase match is reported to the CA and/or management personnel (3107); and (8) The suspicious message text/phrase match is logged to an archive suspicious message database (3110) for later analysis and/or review and control passes to step (3) (3108).

One skilled in the art will recognize that these method steps may be individually eliminated, augmented, modified, and/or rearranged without limiting the teachings of the present invention.

New Message Arrival and Reply

The processing of new message arrivals and optional user replies will now be discussed. Generally speaking, a given user must be logged into the system to receive and reply to messages.

Upon receipt of a new message the entire dashboard will flash in the alternating colors of the Severity of the message as well as make an alert sound upon arrival.

The dashboard will continue to flash in the alternating colors of the Severity of the message and background color and continue to play the alert tones until the message receipt has been acknowledged by clicking on the dashboard.

The new incoming message will appear in the Current Status column at the top position and will flash in the Severity of the message color and background color at a rate of two times per second, and will continue to do so until the auto forward timer has reached zero. At this point the message will be auto forwarded to the next message stop and the message will now go into the steady-state and stop flashing. The user will no longer have the ability to reply to message.

If the user wishes to examine any message located under the current status section he only needs to hover the mouse over the message and an abbreviated amount of information will be displayed including the time remaining till auto forward.

From the user dashboard select the Reply to Message tab and then click the message you wish to reply to in the Current Status section of the dashboard. Note: The clock at the top of the current status section will now change to display the countdown until auto forward information for the selected message. As can be seen on the dashboard picture the selected message will be displayed in the Original Message Here box.

In the Enter Reply Here box the user may enter their reply while keeping an eye on the auto forward countdown clock and word count remaining. Note: When the auto forward countdown clock reaches zero the message will auto forward to the next message stop and the system will terminate all reply to message functionalities and the message will auto-forward to the next recipient with a notation: Auto Forwarded—No Action Taken.

When the user is satisfied with their reply they hit the SEND button to forward the message to the next recipient. Once the message has been successfully sent to the next recipient(s), it will appear in the Current Status window with the steady-state color of the severity confirming delivery of the message to the next recipient(s).

Message Auto-Forwarding (3200)

Figure 32:
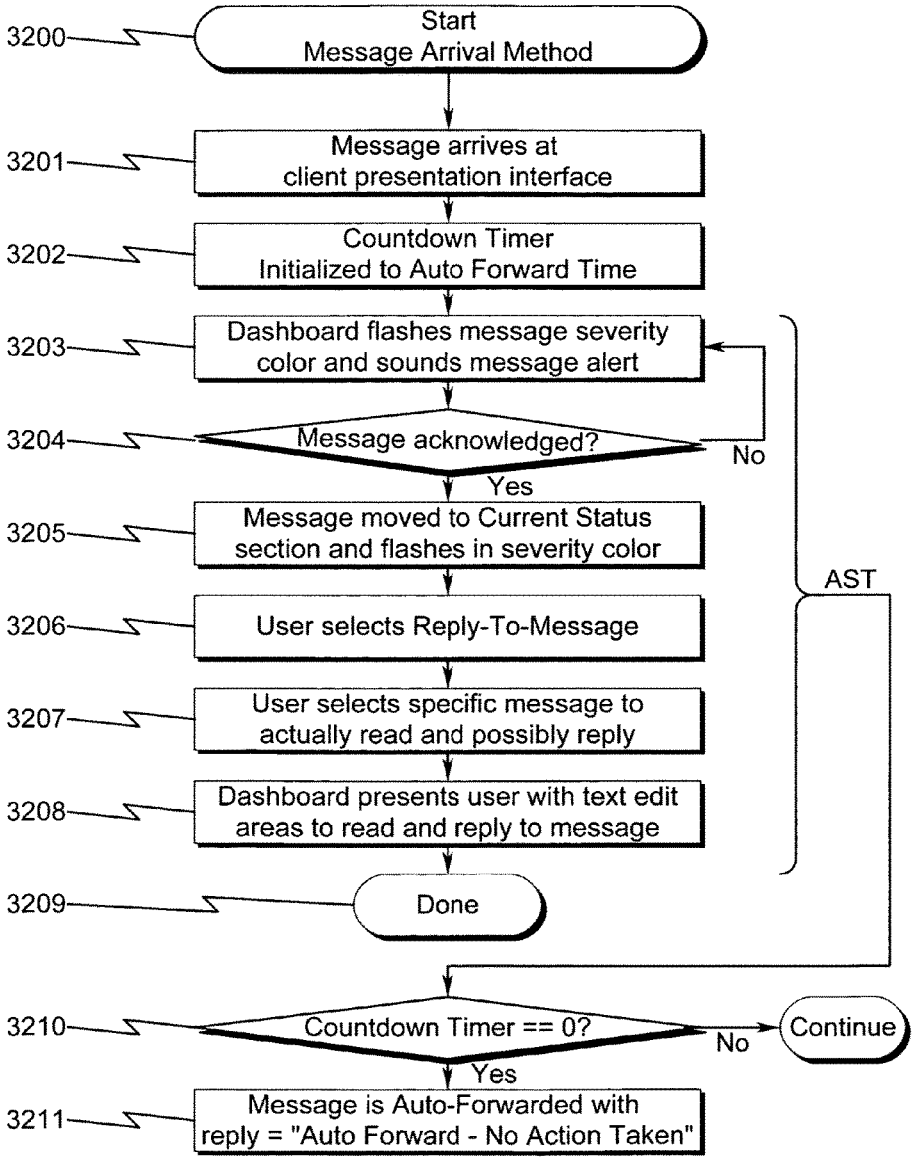
FIG. 32 illustrates an exemplary Message Arrival Method used in some preferred embodiments of the present invention.

An important feature of the present invention messaging system is that of "auto-forwarding on non-response" by a message recipient. Generally speaking, non-response from a message recipient causes the message to be auto-forwarded to the next individual recipient in the chain of designated recipients. The methodology behind this behavior can be best understood using the flowchart of FIG. 32 (3200), wherein the method steps comprise:

(1) The message arrives at a client presentation interface (3201);

(2) A countdown timer is initialized with an Auto-Forward Time value that represents the amount of time the message recipient has to acknowledge and respond to the message, the timer is started, and an asynchronous system trap (AST) is configured to proceed to step (10) if the countdown timer reaches zero (3202);

(3) The client presentation message dialog box dashboard flashes with the message severity color code and audibly sounds an incoming message alert (3203);

(4) If the message is not acknowledged, control passes to step (3) (3204);

(5) The message is moved to the Current Status section of the client presentation interface dashboard dialog box and flashes in the message severity code (3205);

(6) The user selects the Reply To Message option from the client presentation interface dashboard dialog box (3206);

(7) The user selects the specific message to actually read and possibly reply (3207);

(8) The client presentation interface dashboard dialog box presents the user with text edit areas to read and reply to the message (3208);

(9) The countdown timer is stopped, the AST is released, and the message arrival method terminates (3209);

(10) An AST constantly monitors steps (3)-(8) to determine if the countdown timer has not expired, and continues if the AST has not been triggered by a countdown timer value of zero (3210); and

(11) If the AST detects a countdown timer value of zero, the message is automatically forwarded to the next recipient with a message reply of "Auto Forwarded—No Action Taken" sent to the message originator and all previous upstream message recipients (3211).

One skilled in the art will recognize that these method steps may be individually eliminated, augmented, modified, and/or rearranged without limiting the teachings of the present invention.

API Plug-in Modules (3300)

While the disclosed messaging system/method is very robust as to the intended purpose of reliably delivering messages to a variety of message recipients, the present invention anticipates that a wide variety of add-on software modules will be utilized in a spectrum of invention embodiments and applications. This anticipated expansion of system/method functionality is depicted generally in FIG. 33 (3300).

Figure 33:
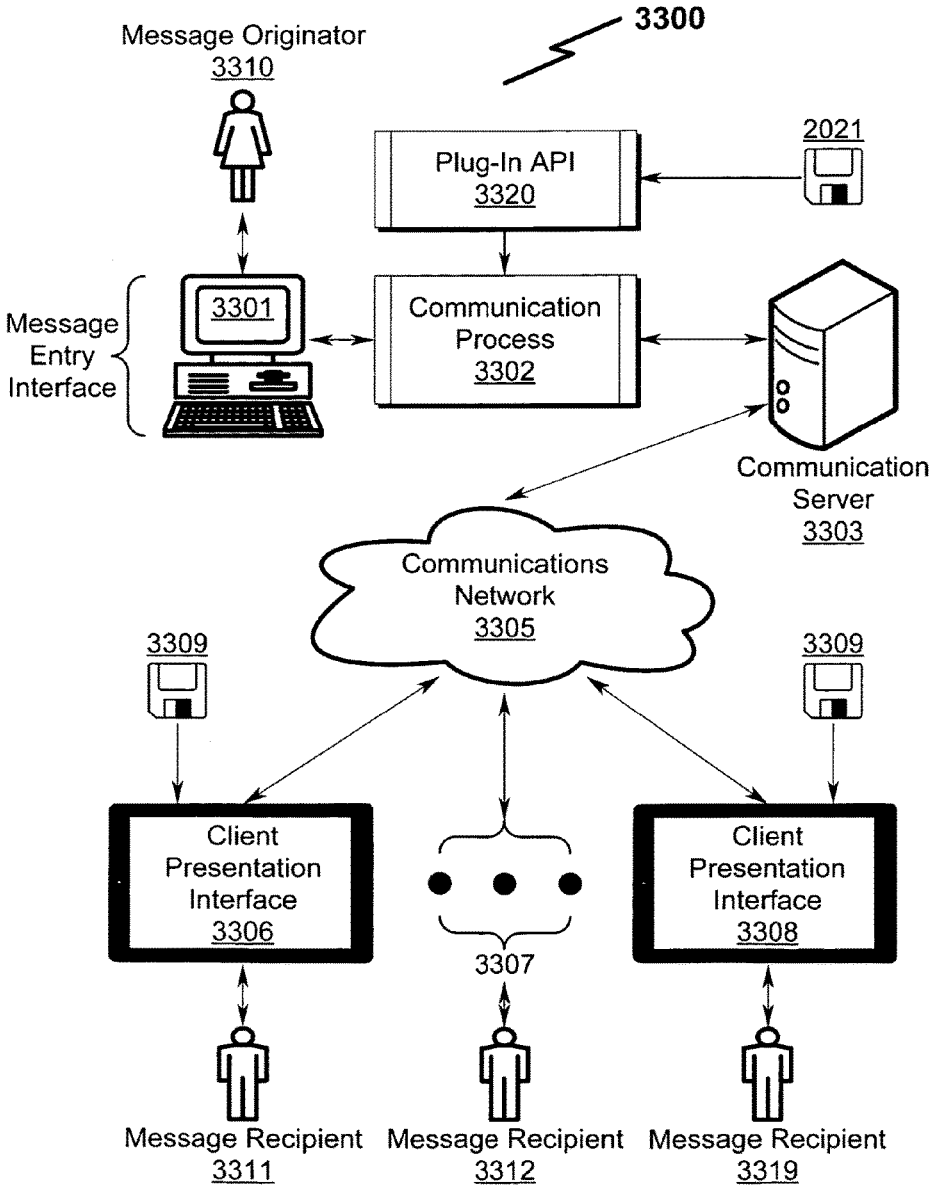
FIG. 33 illustrates an exemplary software plug-in API system architecture used in some preferred embodiments of the present invention.

Referencing FIG. 33 (3300), the mechanism anticipated to be utilized in this context is that of Application Program Interface (API) plug-in software modules (3320) that interface with and become a part of the communications process (3302) and which are installed via the use of computer readable media (3321). This API plug-in support may incorporate the use of software and/or hardware additions to the basic system/method. Some of the currently anticipated options will now be discussed.

Hardware Plug-in Modules (3400)

Figure 34:
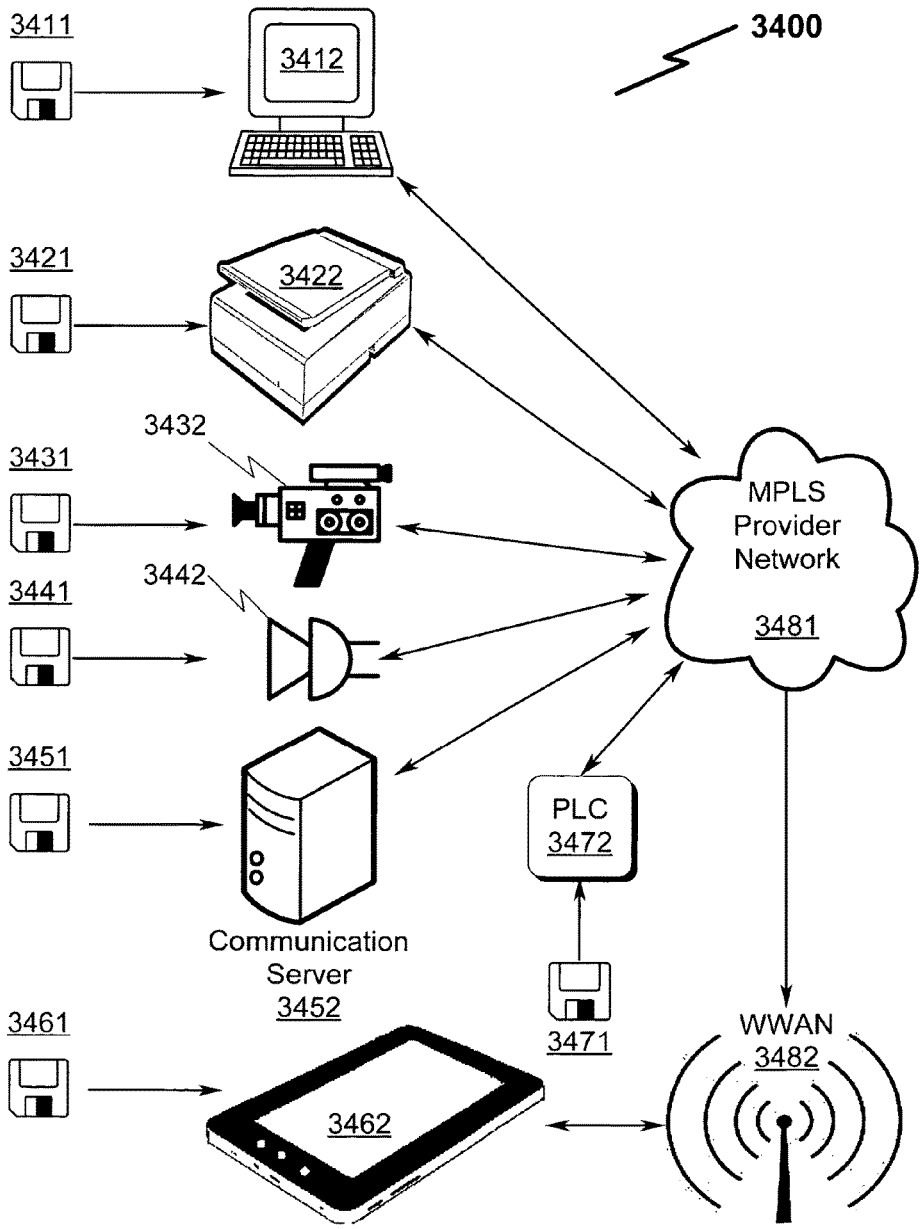
FIG. 34 illustrates an exemplary hardware plug-in API system architecture used in some preferred embodiments of the present invention.

As generally illustrated in FIG. 34 (3400), the present invention anticipates incorporation of a wide variety of hardware devices and their associated API plug-in software, including but not limited to data input terminals (3411, 3412), scanners (3421, 3422), still/video cameras (3431, 3432), audio input/output (3441, 3442), communications servers (3451, 3452), and portable/mobile devices such as tablets and/or smartphones/mobile devices (3461, 3462) that may operate over a variety of communication networks (3481) and be wireless (3482).

Secure Scanner Plug-in Modules (3500)

Figure 35:
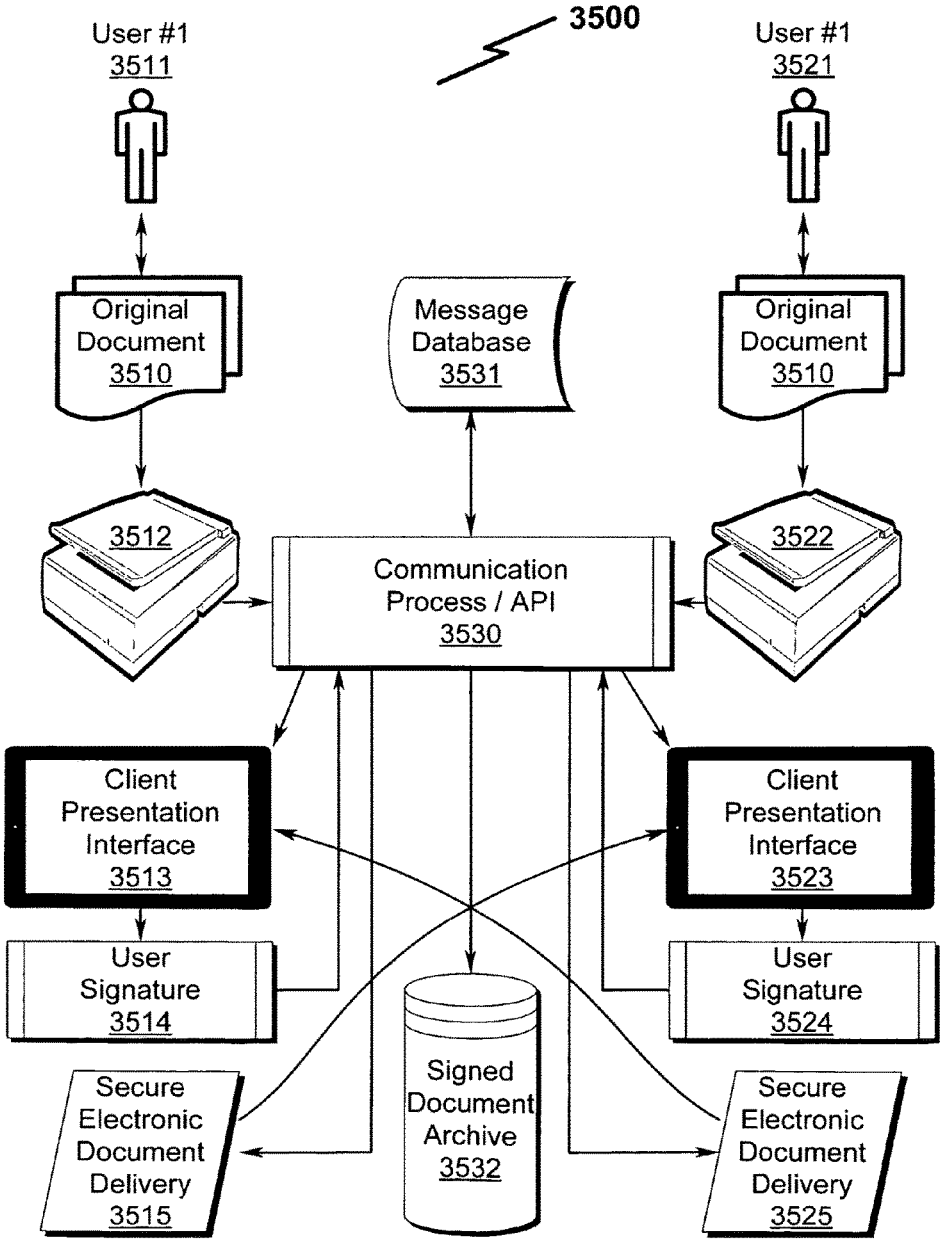
FIG. 35 illustrates an exemplary secure scanner hardware architecture used in some preferred embodiments of the present invention.
Figure 36:
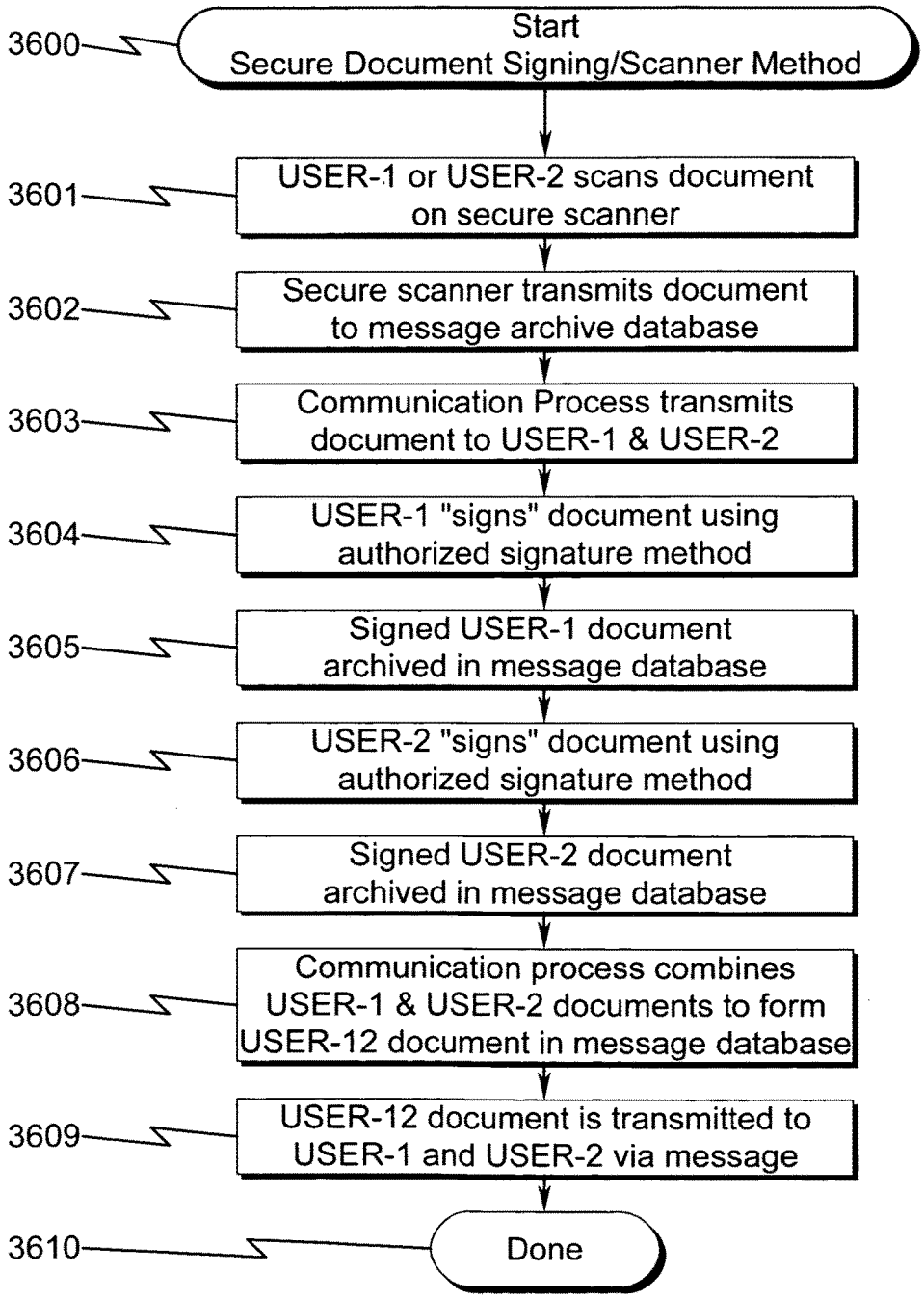
FIG. 36 illustrates an exemplary secure scanner method used in some preferred embodiments of the present invention.

As generally illustrated in FIG. 34 (3400), the present invention anticipates incorporation of a scanner (3421, 3422) within the context of the messaging system. A typical implementation of this secure scanner plug-in is illustrated in FIG. 35 (3500).

This is anticipated as a purpose built stand-alone imaging system containing a flatbed scanner and touch screen monitor to display the dashboard connected to a computer housed in a tamper-proof enclosure. The connection to the Internet is hardwired and tamper resistant and constantly monitored. In commercial applications the unit is fixed to either a wall or the floor or both to prevent its movement. Any attempt to gain entry to the unit will trigger a message that is sent to the local authorities and will cause the system to become inoperative requiring an on-site reset.

The purpose of this secure scanner subsystem is to allow the scanning of documents and transmission of documents under the messaging system. It will provide a secure, real-time, transmission of encrypted documents from the originator to the recipient in minutes, as compared to the current prior art secure document transmission methods utilizing priority packaging, overnight mail, or private courier services.

This system provides complete integrity and security of all documents. The system provides the necessary legal constraints for bi-directional transmission of documents with signatures. The recipient will receive an original scanned document whose integrity is digitally signed and can be tracked from creation to reception with time in seconds to one ten thousandth accuracy.

The use of secure scanner applications are not limited to businesses where scanning and sending of documents is the normal course of business or having the units placed in commercially accessible locations for use by the general public.

The amount of space necessary for scanning a document will be designed and built to meet the client's requirements for use. Items necessary for use in a business environment of the secure scanner are relatively few and include operational power, Internet connection, the documents to be scanned, and the ability to select the recipient from the message recipient database. If the recipient is not in the database then the recipients' information may be manually entered. Items necessary for use in a commercial environment of the secure scanner are relatively few and include operational power, internet connection, a credit card, the documents, and as a minimum: the e-mail or IP address of the recipient.

In order to support secure document transmission with in situations where a single document is to be signed securely by two individuals, the document is securely scanned into the messaging system and transmitted to both parties, with each party signing the document separately. Then the signed original documents are transmitted to the opposing party for review and acceptance, in addition to archival of the documents within the messaging system infrastructure.

An example of this methodology can be seen in FIG. 35 (3500), wherein an initial user (3511) prepares/procures a document (3510) for signing and scans this using a secure scanner (3512) that then interacts with the communication process and/or its scanner API (3530) to store the document within a message database (3531). A second user (3521) with corresponding scanner (3522) may also perform similar operations to load one or more documents (3520) onto the message database (3531) via the API (3530).

The document(s) (3510, 3520) are then presented on the client presentation interfaces (3513, 3523) for user signature (3514, 3524) and the signed documents are then securely delivered electronically (3515, 3525) to the opposing party using the communication process/scanner API (3530) after being stored in a signed document archive (3532). Document signatures (3514, 3524) can be accomplished via video/still pictures (FIG. 34 (3432)), audio confirmation (FIG. 34 (3442)), secure server encryption authentication keys (FIG. 34 (3452)), tablet interfaces (FIG. 34 (3462)), and/or other biometric authentication interfaces.

Secure Document Signing/Scanner Method/(300)

The secure document scanner application generally illustrated in FIG. 35 (3500) may have associated with it a corresponding secure document signing/scanner method comprising the following method steps:

(1) One or both of USER-1 or USER-2 scans a document on a secure scanner (3601);
(2) The secure scanner transmits the document to a message archive database (3602);
(3) The communication process transmits the stored document to USER-1 and USER-2 simultaneously (3603);
(4) USER-1 "signs" the document using any authorized signature method, including but not limited to picture identification, voiceprint identification, handwriting sample, encryption key, password, etc. (3604);
(5) The signed USER-1 document is archived in the message database (3605);
(6) USER-2 "signs" the document using any authorized signature method, including but not limited to picture identification, voiceprint identification, handwriting sample, encryption key, password, etc. (3606);
(7) The signed USER-2 document is archived in the message database (3607);
(8) The communications process combines the USER-1 and USER-2 documents to form a combined USER-12 document on the message server (3608);
(9) The USER-12 document is transmitted to USER-1 and USER-2 via message by the communications process to verify two-party signature of both USER-1 and USER-2 (3609); and
(10) The secure document signing/scanner method terminates (3610).

One skilled in the art will recognize that these method steps may be individually eliminated, augmented, modified, and/or rearranged without limiting the teachings of the present invention.

PLC Plug-in Modules (3700)

A programmable logic controller (PLC) or programmable controller is a digital computer used for the automation of electromechanical processes, such as control of machinery on factory assembly lines, amusement rides, or light fixtures. PLCs are used in many industries. Unlike general-purpose computers, the PLC is designed for multiple inputs and outputs, extended temperature ranges, immunity to electrical noise, and resistance to vibration and impact. Programs to control machine operation are typically stored in battery-backed-up or non-volatile memory. A PLC is an example of a hard real-time system since output results must be produced in response to input conditions within a bounded time or unintended operation will result.

PLCs have built in communications ports, usually 9-pin RS-232, but optionally EIA-485 or Ethernet. Modbus, BACnet or DF1 is usually included as one of the communications protocols. Other options include various field busses such as DeviceNet or Profibus. One skilled in the art will recognize that there are other communications protocols that may be commonly used in industry within the scope of this teaching.

Most modern PLCs can communicate over a network to another system such as computers running a Supervisory Control and Data Acquisition (SCADA) system or web browser. PLCs used in larger I/O systems may have peer-to-peer (P2P) communication between processors. This allows separate parts of a complex process to have individual control while allowing the subsystems to co-ordinate over the communication link. These communication links are also often used for HMI devices such as keypads or PC-type workstations.

Figure 37:
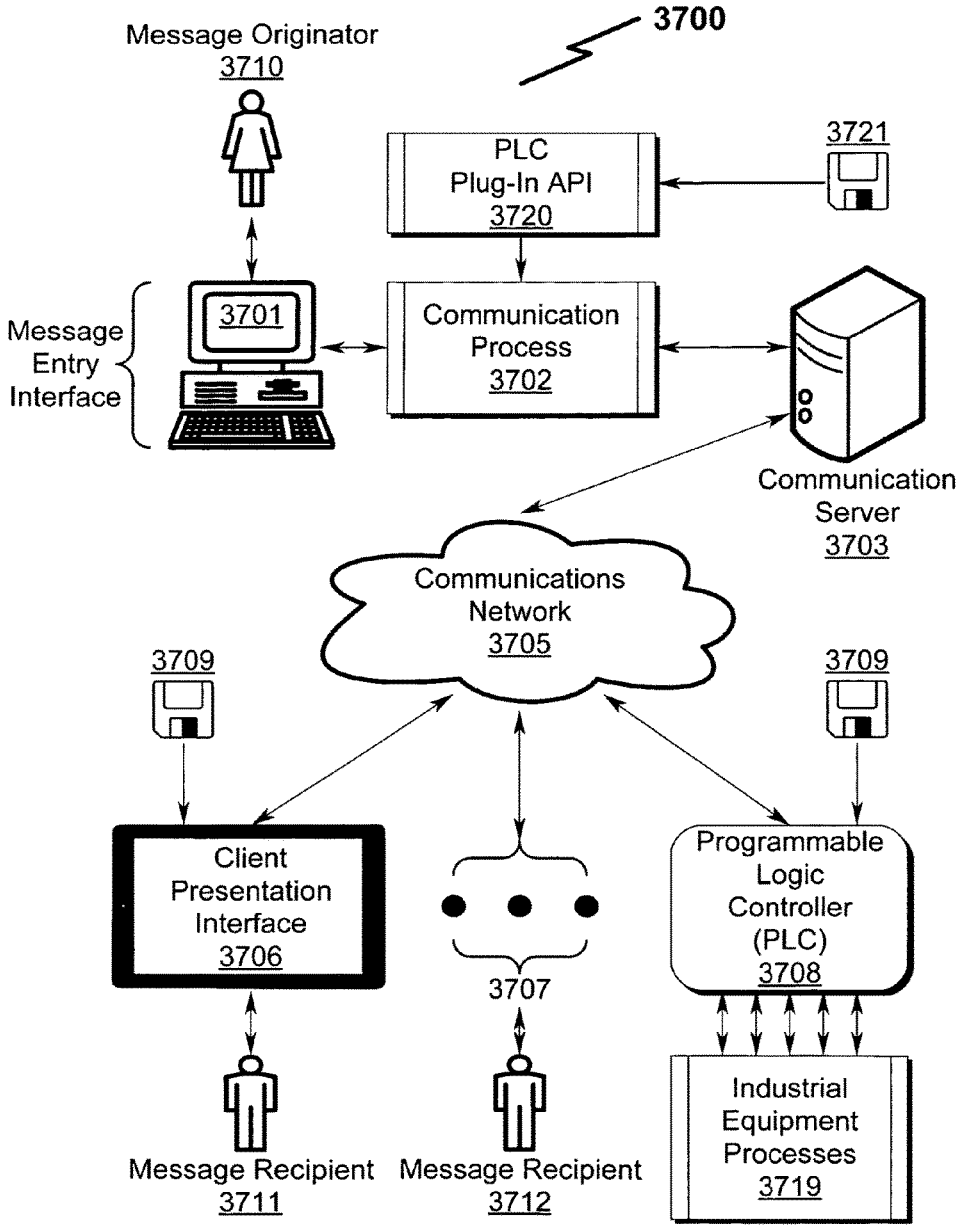
FIG. 37 illustrates an exemplary system embodiment employing a PLC plug-in API.

As generally illustrated in FIG. 37 (3700), the present invention anticipates that some API interface (3720) (and associated non-transitory computer readable medium (3721)) may be provide for PLC control within the messaging system, possibly with the use of an additional license or other authentication access mechanism. With this context, the machine PLC will be tab accessible by those with the proper credentials from the message dashboard. The use of a centralized command listing wherein predefined decisions are stored in a message definition format will simplify the process of selection for the user in situations where the PLC (3708) (with its associated non-transitory computer readable medium containing control software (3709) and associated industrial equipment processes (3719)) must be controlled within the messaging framework.

The authorized user can then make a selection of the appropriate machine and PLC control codes based on the severity and urgency to send a message. A notification verifies the message was sent to the right machines and/or PLC's in the right order and designated timeframe. Authorized clients that have machines/PLCs with communications capabilities tied to a networked can use the messaging system to allow communications to/from PLCs when necessary.

Depending upon the magnitude and scope of the event there well may be different machine codes and PLC commands sent in parallel to different machines and PLC's. This provides real-time updates and responses, for the Command Director originating the message, by machine and PLC. Due to the real-time informational feedback it is possible for the message originator to make efficient, informed decisions based on the information to discontinue a particular command set and/or send another command set. The use of this information would be of critical value during the event as well as during the post event investigations and will be pivotal in the development of better command and control structures to be used in the future. The abilities of the messaging system to be utilized in these circumstances allow scalability for future expansion of the messaging system to control a wide variety of disasters and other serious situations in which intelligent and immediate machine control may result in reduced property and/or life loss.

Licensing Plug-in Modules (3800)

Figure 38:
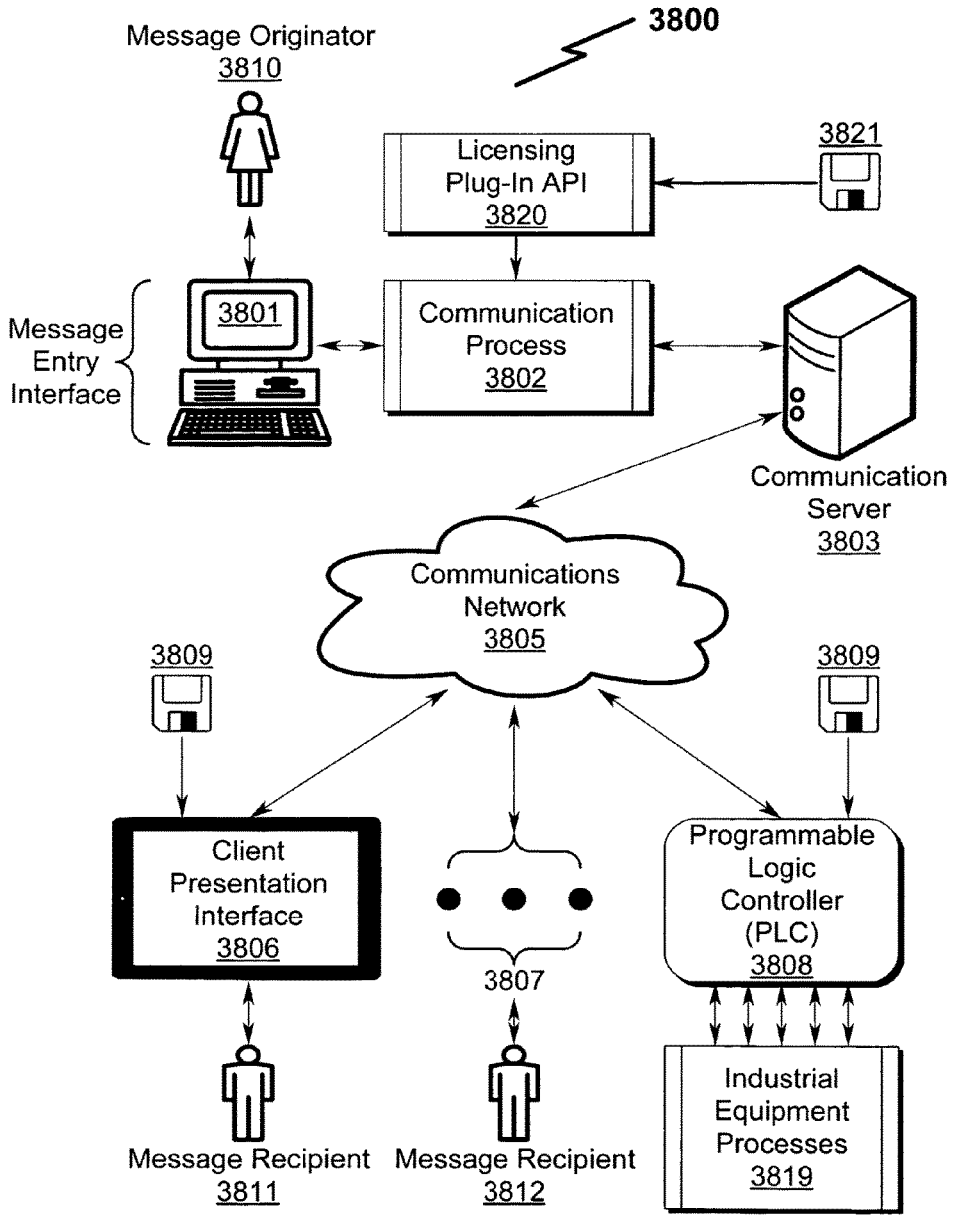
FIG. 38 illustrates an exemplary system embodiment employing a licensing plug-in API.

The present invention anticipates that a variety of licensing plug-in API modules may be added to the basic communication process as depicted in FIG. 38 (3800), with the API (3820) optionally comprising computer readable media for license keys and other license specific enablement information. Included within this scope is the use of security tokens and the like to enable access to specific messaging functions and/or specific PLC (3808) controls.

Voice Recognition Interface

The present invention anticipates that the use of voice recognition software within the context of the messaging system. As generally illustrated in FIG. 34 (3442), the use of audio input as an auxiliary data stream is anticipated by the API plug-in structure of the messaging system/method. While this voice recognition API may support disabled users, the system can also be utilized by non-impaired individuals.

People with disabilities can benefit from the use of speech recognition programs. Individuals who have physical limitations ranging from mild repetitive stress injuries to involved disabilities that preclude the use of conventional computer input devices. Speech recognition is also a benefit to the deaf for the creation of voicemail to text, relay services, and closed-captioned telephony. Individuals with learning disabilities who have problems with thought-to-paper communications can benefit from the use of this type of software.

While many speech recognition applications are available, the present invention anticipates a commercial software package such as DRAGON NATURALLYSPEAKING®/DICTATE® brands of speech recognition software would be suitable for this use. This application is a speech recognition software package developed and sold by Nuance Communications for GUI-based personal computers, including 32-bit and 64-bit systems and a variety of operating systems.

DRAGON NATURALLYSPEAKING® brand of speech recognition software utilizes a minimal user interface. The software has three primary areas of functionality: dictation, text-to-speech and command input. The user is able to dictate and have speech transcribed as written text, have a document synthesized as an audio stream, or issue commands that are recognized as such by the message System Program. In addition voice profiles can be accessed through different computers in a networked environment, although the audio hardware and configuration must be identical on both machines. The present invention anticipates that these commercial software packages can be integrated into the user messaging interface to permit dictation, text-to-speech, and a variety of command inputs to be driven audibly without the need for a tactile human messaging interface.

Mobile Devices and Multiprotocol Label Switching (MPLS) (3900)

The present invention anticipates the use of mobile devices as the hardware platform from which message are originated and on which messages are received. Within this context, the use of Multiprotocol Label Switching (MPLS) is specifically anticipated as an optimal communication methodology for data transmission to/from the mobile devices. Multiprotocol Label Switching (MPLS) is a mechanism in high-performance telecommunication networks that directs data from one network node to the next based on short path labels rather than long network addresses, avoiding complex lookups in a routing table. The labels identify virtual links (paths) between distant nodes rather than endpoints. MPLS can encapsulate packets of various network protocols. MPLS supports a range of access technologies, including T1/E1, ATM, Frame Relay and DSL.

Use of Mobile Broadband to Connect to the Internet

Figure 39:
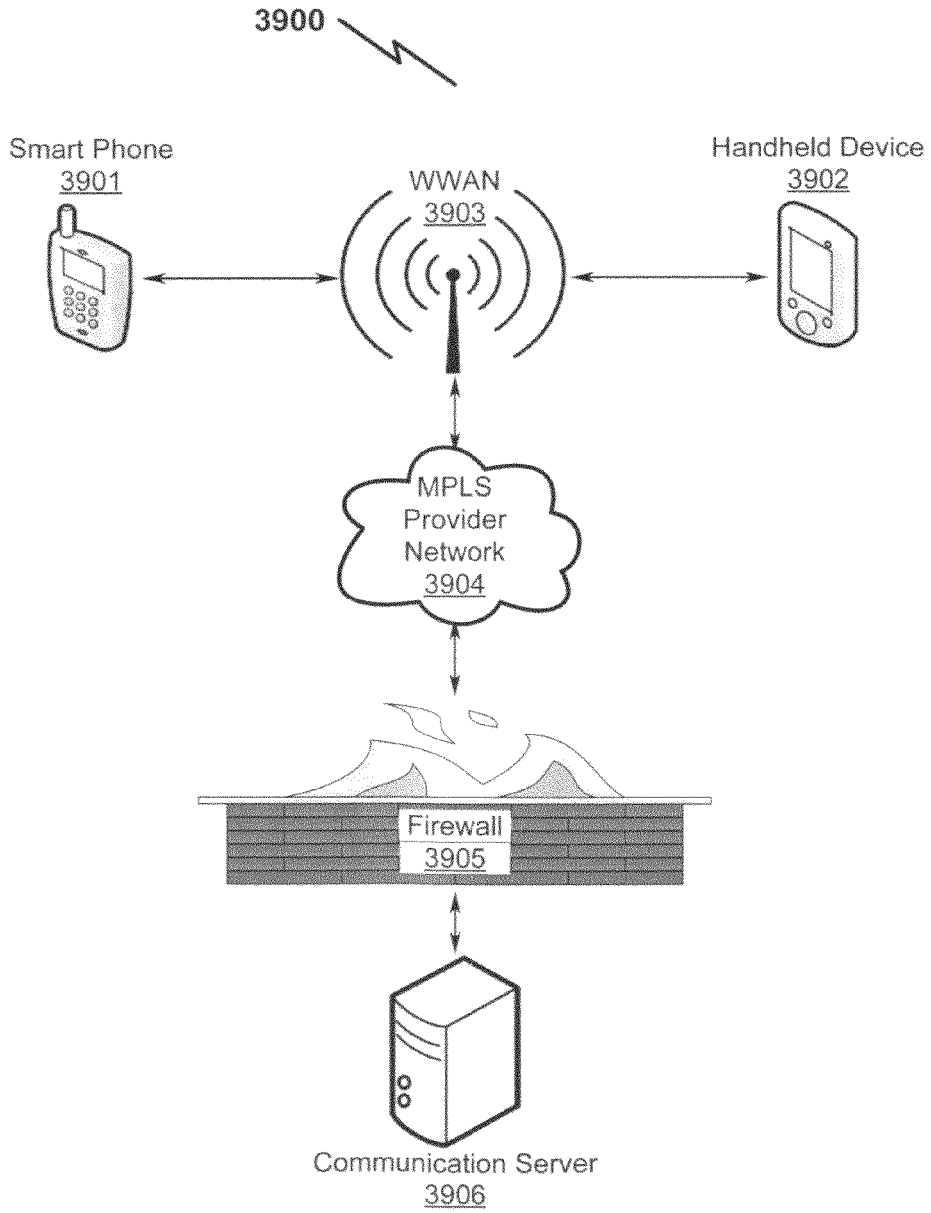
FIG. 39 illustrates the user of mobile devices and Multiprotocol Label Switching (MPLS) within the context of the present invention.

As generally illustrated in FIG. 39 (3900), mobile devices (3901, 3902) include smart devices such as: tablet computers, smartphones, mobile devices, notebooks, etc. Mobile broadband technology, also called wireless wide area network (WWAN) technology (3903), provides mobile Internet connectivity. Use of mobile broadband generally requires a data card and a data plan with a mobile broadband provider. After procurement of a smart device and data plan, the Subscriber Identity Module (SIM) and the mobile broadband service for the SIM is activated by the mobile services provider.

Messaging System and Mobile Applet

Mobile Application Definition—Also called mobile apps, this is a term used to describe Internet applications that run on smartphones and other mobile devices. Mobile applications grant users access to Internet services more commonly accessed on desktop or notebook computers. For the purposes of the present invention the mobile app is the mobile-based messaging System client.

Mobile System Log on (4000)

Figure 40:
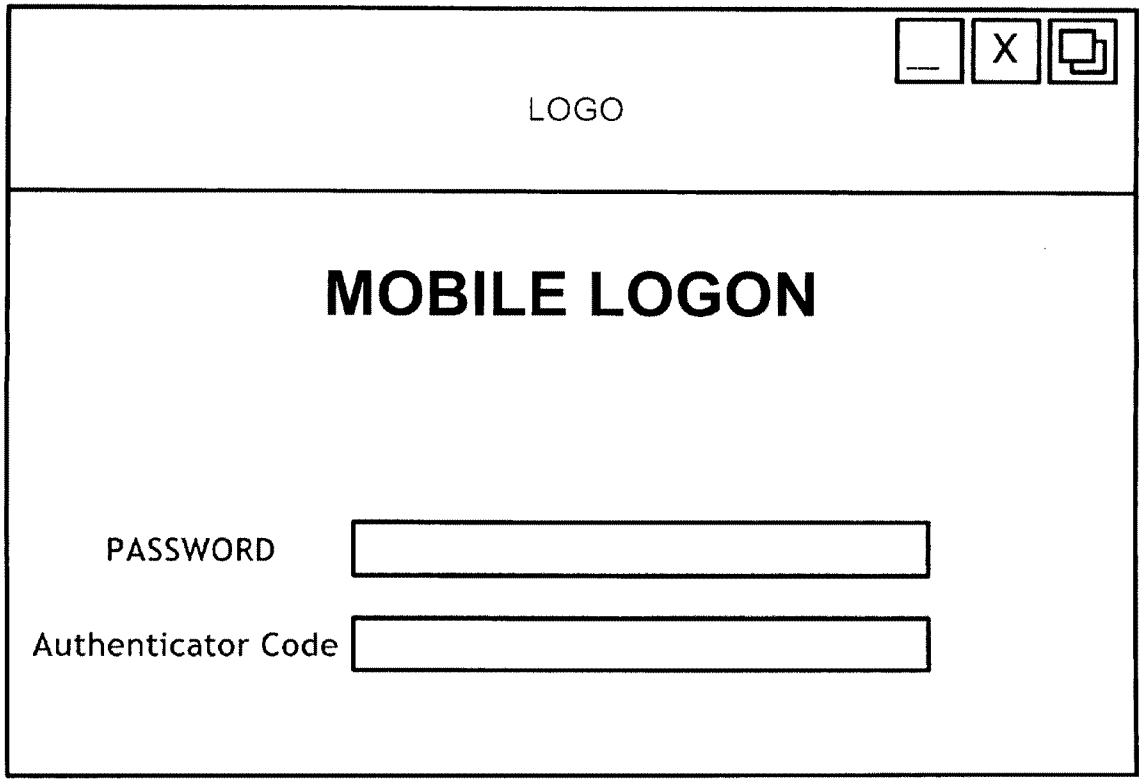
FIG. 40 illustrates an exemplary mobile login application dialog used in some preferred embodiments of the present invention.

The Mobile System user will be presented with the logon screen as generally illustrated in FIG. 40 (4000). In this instance the authenticator code can be generated via the watch FOB and or use of a mobile application authenticator code generator. The mobile application user will enter password and authenticator code and will generally be limited to three attempts to logon. If the user is unsuccessful after the third attempt they will be locked out from a further attempt and will need to contact the certified administrator (CA) for assistance.

A CA will use the same warning code protocol. See warning code protocol for additional information. Upon successful logon, the user/CA will be able to utilize any services for which they are licensed. They will be presented with either the user or CA mobile user dashboard.

Messaging System Using Mobile Application

The messaging system mobile applet will allow a user/CA (hereafter referred to simply as user) access to various services within the messaging application for which they are properly licensed (message on the fly, attachment, interactive checklist, machine controls, etc.) on any mobile device. Certain application functionalities may be limited due to size and scope of use and viewing on a mobile device.

Technical Process

The Mobile Applet will provide the ability to communicate on the WWAN which is displayed in FIG. 39 (3900). Once the WWAN's connection to the MPLS is made the mobile application functionality will be appropriately scaled for use on a mobile device. The user of the smartphone or mobile device will have to determine what data/files to display based on the screen size of the smart phone or mobile device. The standard user will need to update their administration files to show their contact priority preferences, i.e. desktop first, notebook second, mobile device, etc. The system may select contacts based on the selected preferences. As in all cases, if a user is not online or available the message will simply look for the next alternate. In the event where there is no alternate available, the message will auto forward to the next recipient in the chain.

The mobile system application will provide the CA with the same abilities to create a message, modify a message, or create a user message, reply to a message, select contact preferences and/or read a message. The mobile system application is not necessarily intended as a replacement for a desktop computer but may be scaled for use and viewing on the mobile device.

System/Method Variations

The present invention anticipates a wide variety of system/method variations in the basic theme of construction. The examples presented previously do not represent the entire scope of possible usages. They are meant to cite a few of the almost limitless possibilities. Some preferred system/method embodiments include the following:

An embodiment wherein the message is classified based on a customizable hierarchy level.

An embodiment wherein the message is classified based on a hierarchy level.

An embodiment wherein the message is classified based on a hierarchy level, the hierarchy level comprising one or more customizable hierarchy status markers.

An embodiment wherein the message is classified based on a customizable hierarchy level, the hierarchy level comprising one or more customizable hierarchy status markers.

An embodiment wherein the message is classified based on severity level.

An embodiment wherein the message is classified based on severity level, the severity level further comprising SEVERE, SERIOUS, MODERATE, MINOR, and/or ANONYMOUS levels.

An embodiment wherein the message is classified based on urgency level.

An embodiment wherein the message is classified based on urgency level, the urgency level further comprising IMMEDIATE, URGENT, NEED SOON, INFORMATIONAL ONLY, and/or ANONYMOUS levels.

An embodiment wherein the message is classified based on a specific menu selection from the source user interface.

An embodiment wherein the message is classified based on a specific menu selection from the source user interface, the message classification further comprising LIFE CRITICAL/MISSION CRITICAL, CRITICAL, URGENT, CORRECTIVE ACTION/AUDIT, CONTINUOUS IMPROVEMENT/SUGGESTION, INFORMATION TRANSFER, and/or ANONYMOUS REPORTING.

An embodiment wherein the message is encrypted by the source messaging client process.

An embodiment wherein the message is encrypted when stored on the message database.

An embodiment wherein the message is decrypted by the target messaging client process.

An embodiment wherein the predetermined time is set individually for each of the target system interfaces.

An embodiment wherein the predetermined time is based on calendar-based information.

An embodiment wherein the transmission of the message to the target system interface is sequentially prioritized via use of a hierarchical target message thread.

An embodiment wherein the source messaging client process receives conditional branching requirements for the target system interface via the source messaging system interface.

An embodiment wherein the message host process further comprises anticipatory message queuing wherein the message is sent to the target system interface and the next target system interface addressed by a hierarchical target message address list with information indicating that the next target system interface is to wait to process the message until instructed to do so by the message host process.

An embodiment wherein the target system interface is polled to determine if it is online/available, and if not, the target system interface is skipped and the next target system interface addressed by a hierarchical target message address list is utilized as the new target for delivery of the message.

One skilled in the art will recognize that other embodiments are possible based on combinations of elements taught within the above invention description.

Generalized Computer Usable Medium

As generally illustrated in FIG. 1 (0100), the system embodiments of the present invention can incorporate a variety of computer readable media (0105) that comprise non-transitory computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention.

CONCLUSION

A messaging system and method with dead man switching providing for hierarchical delivery of messages based on selected message hierarchy levels with controlled delivery/response timing is disclosed. The system and method incorporates a messaging host that communicates with a messaging source client that creates and prioritizes a message and targets address(es) for the message. This message is then transmitted to the target address(es) using a hierarchical transmission thread having set limits on response times for each address within the thread. Reception of the message by each target(s) produces visual and/or auditory notification at the target(s). Messages are automatically forwarded to remaining target(s) within the thread upon expiration of a timer should the target(s) fail to respond to the message within a predetermined time. Failure of the target(s) to respond to the message(s) is reported bi-directionally along the thread and forwarded to remaining target(s) in the thread.

The invention claimed is:

1. A non-transitory computer usable medium having computer-readable program code comprising a messaging method wherein said method controls a messaging system comprising:

(a) a communications server having—
  1) message database;
  2) message file server;
  3) message host process operating on said file server; and
  4) a non-transitory computer readable medium in communication with a processor executing computer instructions to perform said message host process;

(b) a remote source message system interface stored in memory for data entry and generation of messages on the communication server;

(c) source messaging client process residing on the communication server and monitoring status of acceptance/reading by target;

(d) a non-transitory computer readable medium in communication with a processor executing computer instructions to perform said source messaging client process;

(e) a remote target messaging system interface stored in memory for receiving, displaying and replying to said message data;

(f) target messaging client process residing on the communication server; and (g) a non-transitory computer readable medium in communication with a processor executing computer instructions to perform said target messaging client process;

wherein, said source messaging client process receives the messages and message severity/urgency classifications from a source user via said source messaging system;

said source messaging system transmits said messages and said message severity/urgency classifications to said message host process for storage on said message database via said message file server;

said message host process transmits said message and said message severity/urgency classification to said target system interface via a communications medium for display by said target system interface under control of said target message process;

said target message process responds to said message host process if said message is examined on said target system interface by a user;

said message host process initiates a dead man messaging process that waits a predetermined amount of time for said response to said message by said user and if said predetermined time is exceeded, said message is updated and forwarded to another target system interface for inspection by another user; and said message host process reports to said source message process the status of said message to each of said target systems;

with said method comprising the steps of:

(1) logging onto the communication server by a message originator through the message entry interface (2) Entering data into a message entry interface by a message originator and creating a message within the communication server;

(3) entering a message severity/urgency classification data from said messaging source interface for message residing on communications server;

(4) transmitting said message said message severity/urgency classification to said message host and storing the message on said message database via said communications server;

(5) traversing a hierarchical target message thread to determine the targets for said message;

(6) selecting the next message target within said hierarchical message thread;

(7) determining if said hierarchical message thread is exhausted, and if so, proceeding to step (11);

(8) transmitting said message within the communications server to the currently selected remote target system interface within said hierarchical message thread;

(9) determining if said message has been read by said currently selected remote target system interface within said hierarchical message thread, and if so, proceeding to step (12);

(10) determining if a target response timer has expired, and if not, proceeding to said step (9);

(11) transmitting said message to said currently selected remote target system interface within said hierarchical message thread;

(12) reporting to said source messaging interface that message reception has failed and proceeding to said step (6);

(13) reporting to said source messaging interface that said message has been received and returning any optional user comment; and

(14) optionally entering comments on said message and/or passing through said message to said current or another hierarchical message thread.

2. The non-transitory computer usable medium of claim 1 wherein said message is classified based on a hierarchy level.

3. The non-transitory computer usable medium of claim 1 wherein said message is classified based on a customizable hierarchy level.

4. The non-transitory computer usable medium of claim 1 wherein said message is classified based on a hierarchy level, said hierarchy level comprising one or more customizable hierarchy status markers.

5. The non-transitory computer usable medium of claim 1 wherein said message is classified based on a customizable hierarchy level, said hierarchy level comprising one or more customizable hierarchy status markers.

6. The non-transitory computer usable medium of claim 1 wherein said message is classified based on severity level.

7. The non-transitory computer usable medium of claim 1 wherein said message is classified based on severity level, said severity level further comprising SEVERE, SERIOUS, MODERATE, MINOR, and/or ANONYMOUS levels.

8. The non-transitory computer usable medium of claim 1 wherein said message is classified based on urgency level.

9. The non-transitory computer usable medium of claim 1 wherein said message is classified based on urgency level, said urgency level further comprising IMMEDIATE, URGENT, NEED SOON, INFORMATIONAL ONLY, and/or ANONYMOUS levels.

10. The non-transitory computer usable medium of claim 1 wherein said message is classified based on a specific menu selection from said source user interface.

11. The non-transitory computer usable medium of claim 1 wherein said message is classified based on a specific menu selection from said source user interface, said message classification further comprising LIFE CRITICAL/MISSION CRITICAL, CRITICAL, URGENT, CORRECTIVE ACTION/AUDIT, CONTINUOUS IMPROVEMENT/SUGGESTION, INFORMATION TRANSFER, and/or ANONYMOUS REPORTING.

12. The non-transitory computer usable medium of claim 1 wherein said message is encrypted by said source messaging client process.

13. The non-transitory computer usable medium of claim 1 wherein said message is encrypted when stored on said message database.

14. The non-transitory computer usable medium of claim 1 wherein said message is decrypted by said target messaging client process.

15. The non-transitory computer usable medium of claim 1 wherein said predetermined time is set individually for each of said target system interfaces.

16. The non-transitory computer usable medium of claim 1 wherein said predetermined time is based on calendar-based information.

17. The non-transitory computer usable medium of claim 1 wherein the transmission of said message to said target system interface is sequentially prioritized via use of a hierarchical target message thread.

18. The non-transitory computer usable medium of claim 1 wherein said source messaging client process receives conditional branching requirements for said target system interface via said source messaging system interface.

19. The non-transitory computer usable medium of claim 1 wherein said message host process further comprises anticipatory message queuing wherein said message is sent to said target system interface and the next target system interface addressed by a hierarchical target message address list with information indicating that said next target system interface is to wait to process said message until instructed to do so by said message host process.

20. The non-transitory computer usable medium of claim 1 wherein said target system interface is polled to determine if it is online/available, and if not, said target system interface is skipped and the next target system interface addressed by a hierarchical target message address list is utilized as the new target for delivery of said message.

21. A messaging system comprising:

(a) a communications server having—

1) a message database;

2) a message file server;

3) a message host process operating on said file server; and 4) a non-transitory computer readable medium in communication with a processor executing computer instructions to perform said message host process;

(b) a remote source message system interface stored in memory for data entry and generation of messages on the communication server;

(c) source messaging client process residing on the communication server and monitoring status of acceptance/reading by target;

(d) a non-transitory computer readable medium in communication with a processor executing computer instructions to perform said source messaging client process;

(e) a remote target messaging system interface stored in memory for receiving, displaying and replying to said message;

(f) target messaging client process residing on the communication server; and (g) non-transitory computer readable medium in communication with a processor executing computer instructions to perform said target messaging client process;

wherein, said source messaging client process receives the messages and message severity/urgency classifications from a source user via said source messaging system;

said source messaging system transmits said messages and said message severity/urgency classifications to said message host process for storage on said message database via said message file server;

said message host process transmits said message and said message severity/urgency classification to said target system interface via a communications medium for display by said target system interface under control of said target message process;

said target message process responds to said message host process if said message is examined on said target system interface by a target user;

said message host process initiating a dead man messaging method that waits a predetermined amount of time for said response to said message by said target user and if said predetermined time is exceeded, said message is updated and forwarded to another target system interface for inspection by another target user; and said message host process reports to said source message process the status of said message to each of said target systems with said messaging system utilizing a processor to perform the steps of:

(1) logging onto the communication server by a message originator through the message entry interface (2) entering data into a message entry interface by a message originator and creating a message within the communication server;

(3) entering a message severity/urgency classification data from said messaging source interface for message residing on communications server;

(4) transmitting said message said message severity/urgency classification to said message host and storing the message on said message database via said communications server;

(5) traversing a hierarchical target message thread to determine the targets for said message;

(6) selecting the next message target within said hierarchical message thread;

(7) determining if said hierarchical message thread is exhausted, and if so, proceeding to step (11);

(8) transmitting said message within the communications server to the currently selected remote target system interface within said hierarchical message thread;

(9) determining if said message has been read by said currently selected remote target system interface within said hierarchical message thread, and if so, proceeding to step (12);

(10) determining if a target response timer has expired, and if not, proceeding to said step (9);

(11) transmitting said message to said currently selected remote target system interface within said hierarchical message thread;

(12) reporting to said source messaging interface that message reception has failed and proceeding to said step (6);

(13) reporting to said source messaging interface that said message has been received and returning any optional user comment; and

(14) optionally entering comments on said message and/or passing through said message to said current or another hierarchical message thread.

22. The messaging system of claim 21 wherein said message is classified based on a customizable hierarchy level.

23. The messaging system of claim 21 wherein said message is classified based on a hierarchy level.

24. The messaging system of claim 21 wherein said message is classified based on a hierarchy level, said hierarchy level comprising one or more customizable hierarchy status markers.

25. The messaging system of claim 21 wherein said message is classified based on a customizable hierarchy level, said hierarchy level comprising one or more customizable hierarchy status markers.

26. The messaging system of claim 21 wherein said message is classified based on severity level.

27. The messaging system of claim 21 wherein said message is classified based on severity level, said severity level further comprising SEVERE, SERIOUS, MODERATE, MINOR, and/or ANONYMOUS levels.

28. The messaging system of claim 21 wherein said message is classified based on urgency level.

29. The messaging system of claim 21 wherein said message is classified based on urgency level, said urgency level further comprising IMMEDIATE, URGENT, NEED SOON, INFORMATIONAL ONLY, and/or ANONYMOUS levels.

30. The messaging system of claim 21 wherein said message is classified based on a specific menu selection from said source user interface.

31. The messaging system of claim 21 wherein said message is classified based on a specific menu selection from said source user interface, said message classification further comprising LIFE CRITICAL/MISSION CRITICAL, CRITICAL, URGENT, CORRECTIVE ACTION/AUDIT, CONTINUOUS IMPROVEMENT/SUGGESTION, INFORMATION TRANSFER, and/or ANONYMOUS REPORTING.

32. The messaging system of claim 21 wherein said message is encrypted by said source messaging client process.

33. The messaging system of claim 21 wherein said message is encrypted when stored on said message database.

34. The messaging system of claim 21 wherein said message is decrypted by said target messaging client process.

35. The messaging system of claim 21 wherein said predetermined time is set individually for each of said target system interfaces.

36. The messaging system of claim 21 wherein said predetermined time is based on calendar-based information.

37. The messaging system of claim 21 wherein the transmission of said message to said target system interface is sequentially prioritized via use of a hierarchical target message thread.

38. The messaging system of claim 21 wherein said source messaging client process receives conditional branching requirements for said target system interface via said source messaging system interface.

39. The messaging system of claim 21 wherein said message host process further comprises anticipatory message queuing wherein said message is sent to said target system interface and the next target system interface addressed by a hierarchical target message address list with information indicating that said next target system interface is to wait to process said message until instructed to do so by said message host process.

40. The messaging system of claim 21 wherein said target system interface is polled to determine if it is online/available, and if not, said target system interface is skipped and the next target system interface addressed by a hierarchical target message address list is utilized as the new target for delivery of said message.

41. A messaging method wherein said method controls a messaging system comprising:

(a) a communications server having—

1) a message database;

2) a message file server;

3) a message host process operating on said file server; and 4) a non-transitory computer readable medium in communication with a processor executing computer instructions to perform said message host process;

(b) a remote source message system interface stored in memory for data entry and generation of messages on the communication server;

(c) source messaging client process residing on the communication server and monitoring status of acceptance/reading by target;

(d) non-transitory computer readable medium in communication with a processor executing computer instructions to perform said source messaging client process;

(e) a remote target messaging system interface stored in memory for receiving, displaying and replying to said message data;

(f) target messaging client process residing on the communication server; and (g) non-transitory computer readable medium in communication with a processor executing computer instructions to perform said target messaging client process;

wherein, said source messaging client process receives the messages and message severity/urgency classifications from a source user via said source messaging system;

said source messaging system transmits said messages and said message severity/urgency classifications to said message host process for storage on said message database via said message file server;

said message host process transmits said message and said message severity/urgency classification to said target system interface via a communications medium for display by said target system interface under control of said target message process;

said target message process responds to said message host process if said message is examined on said target system interface by a user;

said message host process initiating a dead man messaging method that waits a predetermined amount of time for said response to said message by said user and if said predetermined time is exceeded, said message is updated and forwarded to another target system interface for inspection by another user; and said message host process reports to said source message process the status of said message to each of said target systems;

with said method comprising the steps of:

(1) logging onto the communication server by a message originator through the message entry interface (2) entering data into a message entry interface by a message originator and creating a message within the communication server;

(3) entering a message severity/urgency classification data from said messaging source interface for message residing on communications server;

(4) transmitting said message said message severity/urgency classification to said message host and storing the message on said message database via said communication server;

(5) traversing a hierarchical target message thread to determine the targets for said message;

(6) selecting the next message target within said hierarchical message thread;

(7) determining if said hierarchical message thread is exhausted, and if so, proceeding to step (11);

(8) transmitting said message within the communications server to the currently selected remote target system interface within said hierarchical message thread;

(9) determining if said message has been read by said currently selected remote target system interface within said hierarchical message thread, and if so, proceeding to step (12);

(10) determining if a target response timer has expired, and if not, proceeding to said step (9);

(11) transmitting said message to said currently selected remote target system interface within said hierarchical message thread;

(12) reporting to said source messaging interface that message reception has failed and proceeding to said step (6);

(13) reporting to said source messaging interface that said message has been received and returning any optional user comment; and

(14) optionally entering comments on said message and/or passing through said message to said current or another hierarchical message thread.

42. The messaging method of claim 41 wherein said message is classified based on a hierarchy level.

43. The messaging method of claim 41 wherein said message is classified based on a customizable hierarchy level.

44. The messaging method of claim 41 wherein said message is classified based on a customizable hierarchy level, said hierarchy level comprising one or more customizable hierarchy status markers.

45. The messaging method of claim 41 wherein said message is classified based on a hierarchy level, said hierarchy level comprising one or more customizable hierarchy status markers.

46. The messaging method of claim 41 wherein said message is classified based on severity level.

47. The messaging method of claim 41 wherein said message is classified based on severity level, said severity level further comprising SEVERE, SERIOUS, MODERATE, MINOR, and/or ANONYMOUS levels.

48. The messaging method of claim 41 wherein said message is classified based on urgency level.

49. The messaging method of claim 41 wherein said message is classified based on urgency level, said urgency level further comprising IMMEDIATE, URGENT, NEED SOON, INFORMATIONAL ONLY, and/or ANONYMOUS levels.

50. The messaging method of claim 41 wherein said message is classified based on a specific menu selection from said source user interface.

51. The messaging method of claim 41 wherein said message is classified based on a specific menu selection from said source user interface, said message classification further comprising LIFE CRITICAL/MISSION CRITICAL, CRITICAL, URGENT, CORRECTIVE ACTION/AUDIT, CONTINUOUS IMPROVEMENT/SUGGESTION, INFORMATION TRANSFER, and/or ANONYMOUS REPORTING.

52. The messaging method of claim 41 wherein said message is encrypted by said source messaging client process.

53. The messaging method of claim 41 wherein said message is encrypted when stored on said message database.

54. The messaging method of claim 41 wherein said message is decrypted by said target messaging client process.

55. The messaging method of claim 41 wherein said predetermined time is set individually for each of said target system interfaces.

56. The messaging method of claim 41 wherein said predetermined time is based on calendar-based information.

57. The messaging method of claim 41 wherein the transmission of said message to said target system interface is sequentially prioritized via use of a hierarchical target message thread.

58. The messaging method of claim 41 wherein said source messaging client process receives conditional branching requirements for said target system interface via said source messaging system interface.

59. The messaging method of claim 41, wherein said message host process further comprises anticipatory message queuing wherein said message is sent to said target system interface and the next target system interface addressed by a hierarchical target message address list with information indicating that said next target system interface is to wait to process said message until instructed to do so by said message host process.

60. The messaging method of claim 41 wherein said target system interface is polled to determine if it is online/available, and if not, said target system interface is skipped and the next target system interface addressed by a hierarchical target message address list is utilized as the new target for delivery of said message.

61. A non-transitory computer usable medium having computer-readable program code comprising a messaging method wherein said method controls a messaging system comprising:

(a) a communications server having—
  1) a message database;
  2) a message file server;
  3) a message host process operating on said file server; and
  4) a non-transitory computer readable medium in communication with a processor executing computer instructions to perform said message host process;

(b) a remote source message system interface stored in memory for data entry and generation of messages on the communication server;

(c) a source messaging client process residing on the communication server and monitoring status of acceptance/reading by target;

(d) a non-transitory computer readable medium in communication with a processor executing computer instructions to perform said source messaging client process;

(e) a remote target messaging system interface stored in memory for receiving, displaying and replying to said message data;

(f) a target messaging client process residing on the communication server; and (g) a non-transitory computer readable medium in communication with a processor executing computer instructions to perform said target messaging client process;

wherein, said source messaging client process receives the messages and message severity/urgency classifications from a source user via said source messaging system;

said source messaging system transmits said messages and said message severity/urgency classifications to said message host process for storage on said message database via said message file server;

said message host process transmits said message and said message severity/urgency classification to said target system interface via a communications medium for display by said target system interface under control of said target message process;

said target message process responds to said message host process if said message is examined on said target system interface by a user;

said message host process initiating a dead man messaging method that waits a predetermined amount of time for said response to said message by said user and if said predetermined time is exceeded, said message is retransmitted to another target system interface for inspection by another user; and said message host process reports to said source message process the status of attempts to deliver said message to each of said target systems;

with said method comprising the steps of:

(1) logging onto the communication server by a message originator through the message entry interface (2) entering data into a message entry interface by a message originator and creating a message within the communication server;

(3) entering a message severity/urgency classification data from said messaging source interface for message residing on communications server;

(4) transmitting said message said message severity/urgency classification to said message host and storing the message on said message database via said file server;

(5) traversing a hierarchical target message thread to determine the targets for said message;

(6) selecting the next message target within said hierarchical message thread;

(7) determining if said hierarchical message thread is exhausted, and if so, proceeding to step (10);

(8) transmitting said message within the communications server to the currently selected remote target system interface within said hierarchical message thread;

(9) determining if said message has been read by said currently selected remote target system interface within said hierarchical message thread, and if so, proceeding to step (12);

(10) determining if a target response timer has expired, and if not, proceeding to said step (9);

(11) transmitting said message to said currently selected remote target system interface within said hierarchical message thread;

(12) reporting to said source messaging interface that message reception has failed and proceeding to said step (6);

(13) reporting to said source messaging interface that said message has been received and returning any optional user comment; and

(14) optionally entering comments on said message and/or passing through said message to said current or another hierarchical message thread.

62. The non-transitory computer usable medium of claim 61 wherein said message is classified based on a hierarchy level.

63. The non-transitory computer usable medium of claim 61 wherein said message is classified based on a customizable hierarchy level.

64. The non-transitory computer usable medium of claim 61 wherein said message is classified based on a hierarchy level, said hierarchy level comprising one or more customizable hierarchy status markers.

65. The non-transitory computer usable medium of claim 61 wherein said message is classified based on a customizable hierarchy level, said hierarchy level comprising one or more customizable hierarchy status markers.

66. The non-transitory computer usable medium of claim 61 wherein said message is classified based on severity level.

67. The non-transitory computer usable medium of claim 61 wherein said message is classified based on severity level, said severity level further comprising SEVERE, SERIOUS, MODERATE, MINOR, and/or ANONYMOUS levels.

68. The non-transitory computer usable medium of claim 61 wherein said message is classified based on urgency level.

69. The non-transitory computer usable medium of claim 61 wherein said message is classified based on urgency level, said urgency level further comprising IMMEDIATE, URGENT, NEED SOON, INFORMATIONAL ONLY, and/or ANONYMOUS levels.

70. The non-transitory computer usable medium of claim 61 wherein said message is classified based on a specific menu selection from said source user interface.

71. The non-transitory computer usable medium of claim 61 wherein said message is classified based on a specific menu selection from said source user interface, said message classification further comprising LIFE CRITICAL/MISSION CRITICAL, CRITICAL, URGENT, CORRECTIVE ACTION/AUDIT, CONTINUOUS IMPROVEMENT/SUGGESTION, INFORMATION TRANSFER, and/or ANONYMOUS REPORTING.

72. The non-transitory computer usable medium of claim 61 wherein said message is encrypted by said source messaging client process.

73. The non-transitory computer usable medium of claim 61 wherein said message is encrypted when stored on said message database.

74. The non-transitory computer usable medium of claim 61 wherein said message is decrypted by said target messaging client process.

75. The non-transitory computer usable medium of claim 61 wherein said predetermined time is set individually for each of said target system interfaces.

76. The non-transitory computer usable medium of claim 61 wherein said predetermined time is based on calendar-based information.

77. The non-transitory computer usable medium of claim 61 wherein the transmission of said message to said target system interface is sequentially prioritized via use of a hierarchical target message thread.

78. The non-transitory computer usable medium of claim 61 wherein said source messaging client process receives conditional branching requirements for said target system interface via said source messaging system interface.

79. The non-transitory computer usable medium of claim 61 wherein said message host process further comprises anticipatory message queuing wherein said message is sent to said target system interface and the next target system interface addressed by a hierarchical target message address list with information indicating that said next target system interface is to wait to process said message until instructed to do so by said message host process.

80. The non-transitory computer usable medium of claim 61 wherein said target system interface is polled to determine if it is online/available, and if not, said target system interface is skipped and the next target system interface addressed by a hierarchical target message address list is utilized as the new target for delivery of said message.

*81. The non-transitory computer usable medium of claim 1 wherein the human interface is selected from visual, audible, speech, and tactile.*

*82. The non-transitory computer usable medium of claim 1 wherein the messaging processor host is selected from personal computers, file servers, mobile telephones, mobile devices, computer-operated telephones, and PLCs.*

*83. The non-transitory computer usable medium of claim 1 wherein the source is selected from personal computers, file servers, mobile telephones, mobile devices, computer-operated telephones, and PLCs.*

*84. The non-transitory computer usable medium of claim 1 wherein the target is selected from personal computers, file servers, mobile telephones, mobile devices, computer-operated telephones, and PLCs.*

*85. The non-transitory computer usable medium of claim 1 wherein said message is classified based on a hierarchy level, said hierarchy level comprising one or more fixed hierarchy status markers.*

*86. The non-transitory computer usable medium of claim 1 wherein said message is classified based on a hierarchy level, said hierarchy level comprising one or more individually customizable hierarchy status markers.*

*87. The non-transitory computer usable medium of claim 1 wherein said message is classified based on severity level, wherein said severity level is customizable.*

*88. The non-transitory computer usable medium of claim 1 wherein said message is classified based on urgency level, wherein said urgency level is customizable.*

*89. The non-transitory computer usable medium of claim 1 wherein the encryption algorithm is selectable.*

*90. The non-transitory computer usable medium of claim 1 wherein the military grade encryption algorithm is selected from 64-bit, 128 bit, 256 bit, 512 bit, 1024 bit, 2048 bit, and 4096 bit.*

*91. The non-transitory computer usable medium of claim 1 wherein said message is secured at the target interface through software to prevent message reproduction.*

*92. The non-transitory computer usable medium of claim 1 wherein target system interface availability is determined by ancillary polling.*

*93. The non-transitory computer usable medium of claim 1 wherein the response time value associated with each leg of the hierarchical message transmission thread may be individually set.*

*94. The non-transitory computer usable medium of claim 1 wherein said message is "fire and forget" wherein once a message is transmitted, its content cannot be modified and its target destination delivery hierarchy cannot be modified.*

*95. The non-transitory computer usable medium of claim 1 wherein said message host and file server are geographically diverse.*

*96. The non-transitory computer usable medium of claim 1 wherein said target message system anticipates an incoming message and queues the target system for an activation message to process the incoming message.*

*97. The non-transitory computer usable medium of claim 1 wherein multiple target message systems simultaneously anticipate an incoming message and queues the target systems for an activation message to process the incoming message.*

*98. The non-transitory computer usable medium of claim 1 wherein said message routing is based on calendar information selected from time of the day, day of the week, seasonal events, holidays, vacations schedules, meetings, and appointments.*

*99. The non-transitory computer usable medium of claim 1 wherein said message routing is determined by a decision matrix with the inputs selected from calendars, external-real-time events and programmable logic unit inputs.*

*100. The non-transitory computer usable medium of claim 1 wherein an Anonymous Interrogator of Message Scanner real-time scans messages for behavior, pre-determined words and pre-determined phrases to identify a potential threat and threat location within the message system.*

*101. The messaging system of claim 21 wherein the human interface is selected from visual, audible, speech, and tactile.*

*102. The messaging system of claim 21 wherein the messaging processor host is selected from personal computers, file servers, mobile telephones, mobile devices, computer-operated telephones, and PLCs.*

*103. The messaging system of claim 21 wherein the source is selected from personal computers, file servers, mobile telephones, mobile devices, computer-operated telephones, and PLCs.*

*104. The messaging system of claim 21 wherein the target is selected from personal computers, file servers, mobile telephones, mobile devices, computer-operated telephones, and PLCs.*

*105. The messaging system of claim 21 wherein said message is classified based on a hierarchy level, said hierarchy level comprising one or more fixed hierarchy status markers.*

*106. The messaging system of claim 21 wherein said message is classified based on a hierarchy level, said hierarchy level comprising one or more individually customizable hierarchy status markers.*

*107. The messaging system of claim 21 wherein said message is classified based on severity level, wherein said severity level is customizable.*

*108. The messaging system of claim 21 wherein said message is classified based on urgency, wherein said urgency level is customizable.*

*109. The messaging system of claim 21 wherein the encryption algorithm is selectable.*

*110. The non-transitory computer usable medium of claim 21 wherein the military grade encryption algorithm is selected from 64-bit, 128 bit, 256 bit, 512 bit, 1024 bit, 2048 bit, and 4096 bit.*

*111. The messaging system of claim 21 wherein said message is secured at the target interface through software to prevent message reproduction.*

*112. The messaging system of claim 21 wherein target system interface availability is determined by ancillary polling.*

*113. The messaging system of claim 21 wherein the response time value associated with each leg of the hierarchical message transmission thread may be individually set.*

*114. The messaging system of claim 21 wherein said message is "fire and forget" wherein once a message is transmitted, its content cannot be modified and its target destination delivery hierarchy cannot be modified.*

*115. The messaging system of claim 21 wherein said message host and file server are geographically diverse.*

*116. The messaging system of claim 21 wherein said target message system anticipates an incoming message and queues the target system for an activation message to process the incoming message.*

*117. The messaging system of claim 21 wherein multiple target message systems simultaneously anticipate an incoming message and queues the target systems for an activation message to process the incoming message.*

*118. The messaging system of claim 21 wherein said message routing is based on calendar information selected from time of the day, day of the week, seasonal events, holidays, vacations schedules, meetings, and appointments.*

*119. The messaging system of claim 21 wherein said message routing is determined by a decision matrix with the inputs selected from calendars, external-real-time events and programmable logic unit inputs.*

*120. The messaging system of claim 21 wherein an Anonymous Interrogator of Message Scanner real-time scans messages for behavior, pre-determined words and pre-determined phrases to identify a potential threat and threat location within the message system.*

*121. The messaging method of claim 41 wherein the human interface is selected from visual, audible, speech, and tactile.*

*122. The messaging method of claim 41 wherein the messaging processor host is selected from personal computers, file servers, mobile telephones, mobile devices, computer-operated telephones, and PLCs.*

*123. The messaging method of claim 41 wherein the source is selected from personal computers, file servers, mobile telephones, mobile devices, computer-operated telephones, and PLCs.*

*124. The messaging method of claim 41 wherein the target is selected from personal computers, file servers, mobile telephones, mobile devices, computer-operated telephones, and PLCs.*

*125. The messaging method of claim 41 wherein said message is classified based on a hierarchy level, said hierarchy level comprising one or more fixed hierarchy status markers.*

*126. The messaging method of claim 41 wherein said message is classified based on a hierarchy level, said hierarchy level comprising one or more individually customizable hierarchy status markers.*

*127. The messaging method of claim 41 wherein said message is classified based on severity level, wherein said severity level is customizable.*

*128. The messaging method of claim 41 wherein said message is classified based on urgency level, wherein said urgency level is customizable.*

*129. The messaging method of claim 41 wherein the encryption algorithm is selectable.*

*130. The non-transitory computer usable medium of claim 41 wherein the military grade encryption algorithm is selected from 64-bit, 128 bit, 256 bit, 512 bit, 1024 bit, 2048 bit, and 4096 bit.*

*131. The messaging method of claim 41 wherein said message is secured at the target interface through software to prevent message reproduction.*

*132. The messaging method of claim 41 wherein target system interface availability is determined by ancillary polling.*

*133. The messaging method of claim 41 wherein the response time value associated with each leg of the hierarchical message transmission thread may be individually set.*

*134. The messaging method of claim 41 wherein said message is "fire and forget" wherein once a message is transmitted, its content cannot be modified and its target destination delivery hierarchy cannot be modified.*

*135. The messaging method of claim 41 wherein said message host and file server are geographically diverse.*

*136. The messaging method of claim 41 wherein said target message system anticipates an incoming message and queues the target system for an activation message to process the incoming message.*

*137. The messaging method of claim 41 wherein multiple target message systems simultaneously anticipate an incoming message and queues the target systems for an activation message to process the incoming message.*

*138. The messaging method of claim 41 wherein said message routing is based on calendar information selected from time of the day, day of the week, seasonal events, holidays, vacations schedules, meetings, and appointments.*

*139. The messaging method of claim 41 wherein said message routing is determined by a decision matrix with the inputs selected from calendars, external-real-time events and programmable logic unit inputs.*

*140. The messaging method of claim 41 wherein an Anonymous Interrogator of Message Scanner real-time scans messages for behavior, pre-determined words and pre-determined phrases to identify a potential threat and threat location within the message system.*

*141. The non-transitory computer usable medium of claim 61 wherein the human interface is selected from visual, audible, speech, and tactile.*

*142. The non-transitory computer usable medium of claim 61 wherein the messaging processor host is selected from personal computers, file servers, mobile telephones, mobile devices, computer-operated telephones, and PLCs.*

*143. The non-transitory computer usable medium of claim 61 wherein the source is selected from personal computers, file servers, mobile telephones, mobile devices, computer-operated telephones, and PLCs.*

*144. The non-transitory computer usable medium of claim 61 wherein the target is selected from personal computers, file servers, mobile telephones, mobile devices, computer-operated telephones, and PLCs.*

*145. The non-transitory computer usable medium of claim 61 wherein said message is classified based on a hierarchy level, said hierarchy level comprising one or more fixed hierarchy status markers.*

*146. The non-transitory computer usable medium of claim 61 wherein said message is classified based on a hierarchy level, said hierarchy level comprising one or more individually customizable hierarchy status markers.*

*147. The non-transitory computer usable medium of claim 61 wherein said message is classified based on severity level, wherein said severity level is customizable.*

*148. The non-transitory computer usable medium of claim 61 wherein said message is classified based on urgency level, wherein said urgency level is customizable.*

*149. The non-transitory computer usable medium of claim 61 wherein the encryption algorithm is selectable.*

*150. The non-transitory computer usable medium of claim 61 wherein the military grade encryption algorithm is selected from 64-bit, 128 bit, 256 bit, 512 bit, 1024 bit, 2048 bit, and 4096 bit.*

*151. The non-transitory computer usable medium of claim 61 wherein said message is secured at the target interface through software to prevent message reproduction.*

*152. The non-transitory computer usable medium of claim 61 wherein target system interface availability is determined by ancillary polling.*

*153. The non-transitory computer usable medium of claim 61 wherein the response time value associated with each leg of the hierarchical message transmission thread may be individually set.*

*154. The non-transitory computer usable medium of claim 61 wherein said message is "fire and forget" wherein once a message is transmitted, its content cannot be modified and its target destination delivery hierarchy cannot be modified.*

*155. The non-transitory computer usable medium of claim 61 wherein said message host and file server are geographically diverse.*

*156. The non-transitory computer usable medium of claim 61 wherein said target message system anticipates an incoming message and queues the target system for an activation message to process the incoming message.*

*157. The non-transitory computer usable medium of claim 61 wherein multiple target message systems simultaneously anticipate an incoming message and queues the target systems for an activation message to process the incoming message.*

*158. The non-transitory computer usable medium of claim 61 wherein said message routing is based on calendar information selected from time of the day, day of the week, seasonal events, holidays, vacations schedules, meetings, and appointments.*

*159. The non-transitory computer usable medium of claim 61 wherein said message routing is determined by a decision matrix with the inputs selected from calendars, external-real-time events and programmable logic unit inputs.*

*160. The non-transitory computer usable medium of claim 61 wherein an Anonymous Interrogator of Message Scanner real-time scans messages for behavior, pre-determined words and pre-determined phrases to identify a potential threat and threat location within the message system.*

*161. A messaging system comprising:*

*(a) a communications server having—*

*1) a message database;*

*2) a message file server;*

*3) a message host process operating on said file server; and*

*4) a non-transitory computer readable medium in communication with a processor executing computer instructions to perform said message host process;*

*(b) a remote source message system interface stored in memory for data entry and generation of messages on the communication server;*

*(c) source messaging client process residing on the communication server and monitoring status of acceptance/reading by target;*

*(d) a non-transitory computer readable medium in communication with a processor executing computer instructions to perform said source messaging client process;*

*(e) a remote target messaging system interface stored in memory for receiving, displaying and replying to said message;*

*(f) target messaging client process residing on the communication server; and*

*(g) non-transitory computer readable medium in communication with a processor executing computer instructions to perform said target messaging client process;*

*wherein,*

*said source messaging client process receives the messages and message severity/urgency classifications from a source user via said source messaging system;*

*said source messaging system transmits said messages and said message severity/urgency classifications to said message host process for storage on said message database via said message file server;*

*said message host process transmits said message and said message severity/urgency classification to said target system interface via a communications medium for display by said target system interface under control of said target message process;*

*said target message process responds to said message host process if said message is examined on said target system interface by a target user;*

*said message host process initiating a dead man messaging method that waits a predetermined amount of time for said response to said message by said target user and if said predetermined time is exceeded, said message is updated and forwarded to another target system interface for inspection by another target user;*

*said message host process initiating a dead man messaging method that monitors the communication between remote target messaging system and the message host and if monitoring detects a loss in communication, said message is updated and forwarded to another target system interface for inspection by another target user;*

*said message host process monitors availability conditions of said remote target messaging system to detect if said remote target messaging system is logged on, said remote target messaging system has been logged off for non-use; and if there is an anomaly with said remote target messaging system; and*

*said message host process reports to said source message process the status of said message to each of said target systems*

*with said messaging system utilizing a processor to perform the steps of:*

*(1) logging onto the communication server by a message originator through the message entry interface*

*(2) entering data into a message entry interface by a message originator and creating a message within the communication server;*

*(3) entering a message severity/urgency classification data from said messaging source interface for message residing on communications server;*

*(4) transmitting said message said message severity/urgency classification to said message host and storing the message on said message database via said communications server;*

*(5) detecting said remote target messaging system availability through polling of the said hierarchical target message thread and if so, proceeding to step (7);*

*(6) modifying said hierarchical target message thread removing said remote target messaging system if unavailable and proceeding to step (4);*

*(7) traversing a hierarchical target message thread to determine the targets for said message;*

*(8) selecting the next message target within said hierarchical message thread;*

*(9) determining if said hierarchical message thread is exhausted, and if so, proceeding to step (14);*

*(10) transmitting said message within the communications server to the currently selected remote target system interface within said hierarchical message thread;*

*(11) determining if said message has been read by said currently selected remote target system interface within said hierarchical message thread, and if so, proceeding to step (15);*

*(12) determining if a target response timer has expired, and if not, proceeding to said step (11);*

*(13) determining if a remote target messaging system is in communication with a message host and if so, proceeding to said step (8);*

*(14) transmitting said message to said currently selected remote target system interface within said hierarchical message thread;*

*(15) reporting to said source messaging interface that message reception has failed and proceeding to said step (8);*

*(16) reporting to said source messaging interface that said message has been received and returning any optional user comment; and*

*(17) optionally entering comments on said message and/or passing through said message to said current or another hierarchical message thread.*

*162. The non-transitory computer usable medium of claim 161 wherein the human interface is selected from visual, audible, speech, and tactile.*

*163. The non-transitory computer usable medium of claim 161 wherein the messaging processor host is selected from personal computers, file servers, mobile telephones, mobile devices, computer-operated telephones, and PLCs.*

*164. The non-transitory computer usable medium of claim 161 wherein the source is selected from personal computers, file servers, mobile telephones, mobile devices, computer-operated telephones, and PLCs.*

*165. The non-transitory computer usable medium of claim 161 wherein the target is selected from personal computers, file servers, mobile telephones, mobile devices, computer-operated telephones, and PLCs.*

*166. The non-transitory computer usable medium of claim 161 wherein said message is classified based on a hierarchy level, said hierarchy level comprising one or more fixed hierarchy status markers.*

*167. The non-transitory computer usable medium of claim 161 wherein said message is classified based on a hierarchy level, said hierarchy level comprising one or more individually customizable hierarchy status markers.*

*168. The non-transitory computer usable medium of claim 161 wherein said message is classified based on severity level, wherein said severity level is customizable.*

*169. The non-transitory computer usable medium of claim 161 wherein said message is classified based on urgency level, wherein said urgency level is customizable.*

*170. The non-transitory computer usable medium of claim 161 wherein the encryption algorithm is selectable.*

*171. The non-transitory computer usable medium of claim 161 wherein the military grade encryption algorithm is selected from 64-bit, 128 bit, 256 bit, 512 bit, 1024, 2048, and 4096.*

*172. The non-transitory computer usable medium of claim 161 wherein said message is secured at the target interface through software to prevent message reproduction.*

*173. The non-transitory computer usable medium of claim 161 wherein target system interface availability is determined by ancillary polling.*

*174. The non-transitory computer usable medium of claim 161 wherein the response time value associated with each leg of the hierarchical message transmission thread may be individually set.*

*175. The non-transitory computer usable medium of claim 161 wherein said message is "fire and forget" wherein once a message is transmitted, its content cannot be modified and its target destination delivery hierarchy cannot be modified.*

*176. The non-transitory computer usable medium of claim 161 wherein said message host and file server are geographically diverse.*

*177. The non-transitory computer usable medium of claim 161 wherein said target message system anticipates an incoming message and queues the target system for an activation message to process the incoming message.*

*178. The non-transitory computer usable medium of claim 161 wherein multiple target message systems simultaneously anticipate an incoming message and queues the target systems for an activation message to process the incoming message.*

*179. The non-transitory computer usable medium of claim 161 wherein said message routing is based on calendar information selected from time of the day, day of the week, seasonal events, holidays, vacations schedules, meetings, and appointments.*

*180. The non-transitory computer usable medium of claim 81 wherein said message routing is determined by a decision matrix with the inputs selected from calendars, external-real-time events and programmable logic unit inputs.*

*181. The non-transitory computer usable medium of claim 161 wherein an Anonymous Interrogator of Message Scanner real-time scans Anonymous messages for behavior, pre-determined words and pre-determined phrases to identify a potential threat and threat location within the message system.*

* * * * *